United States Patent
Williams et al.

(10) Patent No.: US 11,288,583 B2
(45) Date of Patent: Mar. 29, 2022

(54) REMEDYING DEFECTIVE KNOWLEDGE OF A KNOWLEDGE DATABASE

(71) Applicant: entigenlogic LLC, Schaumburg, IL (US)

(72) Inventors: Frank John Williams, Rossmoor, CA (US); David Ralph Lazzara, Huntington Beach, CA (US); Donald Joseph Wurzel, Savannah, GA (US); Paige Kristen Thompson, Huntington Beach, CA (US); Stephen Emerson Sundberg, Chicago, IL (US); Ameeta Vasant Reed, Deerfield, IL (US); Stephen Chen, Wheaton, IL (US); Dennis Arlen Roberson, Chapin, SC (US); Thomas James MacTavish, Inverness, IL (US); Karl Olaf Knutson, Palatine, IL (US); Jessy Thomas, Palatine, IL (US); David Michael Corns, II, Elgin, IL (US); Andrew Chu, St. Charles, IL (US); Theodore Mazurkiewicz, Lake Zurich, IL (US); Gary W. Grube, Barrington Hills, IL (US)

(73) Assignee: entigenlogic LLC, Schaumburg, IL (US)

( * ) Notice: Subject to any disclaimer, the term of this patent is extended or adjusted under 35 U.S.C. 154(b) by 208 days.

(21) Appl. No.: 16/598,142

(22) Filed: Oct. 10, 2019

(65) Prior Publication Data
US 2020/0134481 A1    Apr. 30, 2020

Related U.S. Application Data

(60) Provisional application No. 62/752,399, filed on Oct. 30, 2018.

(51) Int. Cl.
*G06F 40/242* (2020.01)
*G06N 5/02* (2006.01)
(Continued)

(52) U.S. Cl.
CPC ......... *G06N 5/022* (2013.01); *G06F 16/9035* (2019.01); *G06F 40/242* (2020.01); *G06F 40/247* (2020.01); *G06F 40/289* (2020.01)

(58) Field of Classification Search
CPC ........ G06N 5/022; G06N 7/005; G06N 20/00; G06F 40/242; G06F 40/247; G06F 40/289; G06F 16/9035; G06F 16/215
See application file for complete search history.

(56) References Cited

U.S. PATENT DOCUMENTS

| 6,175,834 | B1 * | 1/2001 | Cai | G06F 40/53 |
| | | | | 707/803 |
| 9,645,999 | B1 * | 5/2017 | Ciulla | G06F 16/35 |

(Continued)

*Primary Examiner* — Abdelali Serrou
(74) *Attorney, Agent, or Firm* — Gary W. Grube

(57) ABSTRACT

A method includes detecting a defective entigen group within a knowledge database. The defective entigen group includes entigens and one or more entigen relationships between at least some of the entigens. The defective entigen group represents knowledge of a topic. The method further includes obtaining corrective content for the topic based on the defective entigen group and generating a corrective entigen group based on the corrective content. The method further includes updating the defective entigen group utilizing the corrective entigen group to produce a curated entigen group.

15 Claims, 60 Drawing Sheets

(51) Int. Cl.
  *G06F 16/9035* (2019.01)
  *G06F 40/247* (2020.01)
  *G06F 40/289* (2020.01)

(56) References Cited

U.S. PATENT DOCUMENTS

| | | |
|---|---|---|
| 2003/0097251 A1 | 5/2003 | Yamada |
| 2008/0208569 A1 | 8/2008 | Simpson |
| 2011/0238408 A1* | 9/2011 | Larcheveque ........ G06F 40/284 704/9 |
| 2016/0012818 A1* | 1/2016 | Faizakof ............... G06F 16/285 704/245 |
| 2016/0019885 A1* | 1/2016 | Romano ............... G06F 40/109 704/9 |
| 2016/0147979 A1 | 5/2016 | Kato |
| 2018/0060305 A1* | 3/2018 | Deleris ................. G06F 16/367 |
| 2018/0081871 A1* | 3/2018 | Williams ................ G06F 16/31 |
| 2018/0150552 A1* | 5/2018 | Wang .................. G06F 16/3344 |
| 2020/0034732 A1* | 1/2020 | Freed ..................... G06N 3/006 |

* cited by examiner synonym words table 570

| textual words 572 | identigen 538 | | entigens 520 |
| --- | --- | --- | --- |
| | meaning ID 538 | instance ID 540 | |
| car | 50 | 001 | e1000 |
| automobile | 50 | 002 | e1000 |
| auto | 50 | 003 | e1000 |
| bil (Swedish) | 50 | 004 | e1000 |
| carro (Spanish) | 50 | 005 | e1000 |
| bil (Danish) | 50 | 006 | e1000 |

FIG. 7C polysemous words table 576

| textual words 572 | identigen 518 | | entigens 520 |
| --- | --- | --- | --- |
| | meaning ID 538 | instance ID 540 | |
| duck (bird) | 116937 | 001 | e2000 |
| duck (fabric) | 116938 | 001 | e2001 |
| duck (to submerge) | 112195 | 056 | e2002 |
| duck (to elude) | 010654 | 051 | e2003 |

FIG. 7D words table 580

| textual words 572 | identigen (IDN) 518 | | | entigens (ENI) 520 |
|---|---|---|---|---|
| | meaning ID 538 | instance ID 540 | type ID 542 | |
| pilot (flyer) | 150 | 001 | itenym (item) | e717 |
| pilot (to fly) | 291 | 001 | actenym (action) | e4320 |
| Tom (person) | 457 | 001 | itenym (item) | e61 |
| Tom (male animal) | 648 | 001 | itenym (item) | e930 |
| tall (attribute - height) | 823 | 001 | attrenym (attribute) | e90 |
| tall (attribute - unlikely) | 399 | 001 | attrenym (attribute) | e729 |

⇒ apply rules to identigens of word strings to validate

| pilot (to fly) | Tom (male an) | IDN 291.001 | IDN 648.001 | ✗ |
| pilot (flyer) | Tom (male an) | IDN 150.001 | IDN 648.001 | ✗ |
| pilot (to fly) | Tom (person) | IDN 291.001 | IDN 457.001 | ✗ |
| pilot (flyer) | Tom (person) | IDN 150.001 | IDN 457.001 | ✓ |

| tall (attribute - height) | Tom (male an) | IDN 823.001 | IDN 648.001 | ✓ |
| tall (attribute - unlikely) | Tom (male an) | IDN 399.001 | IDN 648.001 | ✗ |
| tall (attribute - height) | Tom (person) | IDN 823.001 | IDN 457.001 | ✓ |
| tall (attribute - unlikely) | Tom (person) | IDN 399.001 | IDN 457.001 | ✗ |

⇒ list valid groupings groupings table 584

| grouping ID 586 | word strings 588 | identigens (IDN) 518 | | | entigens (ENI) 520 | | |
|---|---|---|---|---|---|---|---|
| 3001 | pilot Tom | IDN 150.001 | IDN 457.001 | | e717 | e61 | |
| 3040 | tall Tom | IDN 823.001 | IDN 648.001 | | e90 | e930 | |
| 3041 | tall Tom | IDN 823.001 | IDN 457.001 | | e90 | e61 | |
| 3070 | tall pilot Tom | IDN 823.001 | IDN 150.001 | IDN 457.001 | e90 | e717 | e61 |

FIG. 7E groupings table 620

| grouping (GRP) ID 586 | word strings 588 | IF string 622 | | THEN string 624 | |
|---|---|---|---|---|---|
| | | IDN string 626 | ENI 628 | IDN string 626 | ENI 628 |
| 5493 | If someone has a tumor, then someone is sick. | someone has | 12aa | someone sick | 12js |
| | | tumor has | 06aa | | |
| 5494 | If someone is sick, then someone is possibly sad. | someone sick | 12js | someone sad | 12ja | new knowledge inference 630

| 5495 | If someone has a tumor, then someone is possibly sad. | someone has | 12aa | someone sad | 12ja |
|---|---|---|---|---|---|
| | | tumor has | 06aa | possibly sad | 05b |

FIG. 8B

REMEDYING DEFECTIVE KNOWLEDGE OF A KNOWLEDGE DATABASE

CROSS REFERENCE TO RELATED PATENTS

The present U.S. Utility patent application claims priority pursuant to 35 U.S.C. § 119(e) to U.S. Provisional Application No. 62/752,399, entitled "IDENTIFYING BEST PRACTICES BASED ON PLANNING AND OUTCOME CONTENT," filed Oct. 30, 2018, which is hereby incorporated herein by reference in its entirety and made part of the present U.S. Utility patent application for all purposes.

STATEMENT REGARDING FEDERALLY SPONSORED RESEARCH OR DEVELOPMENT

NOT APPLICABLE

INCORPORATION-BY-REFERENCE OF MATERIAL SUBMITTED ON A COMPACT DISC

NOT APPLICABLE

BACKGROUND OF THE INVENTION

Technical Field of the Invention

This invention relates to computing systems and more particularly to generating data representations of data and analyzing the data utilizing the data representations.

Description of Related Art

It is known that data is stored in information systems, such as files containing text. It is often difficult to produce useful information from this stored data due to many factors. The factors include the volume of available data, accuracy of the data, and variances in how text is interpreted to express knowledge. For example, many languages and regional dialects utilize the same or similar words to represent different concepts.

Computers are known to utilize pattern recognition techniques and apply statistical reasoning to process text to express an interpretation in an attempt to overcome ambiguities inherent in words. One pattern recognition technique includes matching a word pattern of a query to a word pattern of the stored data to find an explicit textual answer. Another pattern recognition technique classifies words into major grammatical types such as functional words, nouns, adjectives, verbs and adverbs. Grammar based techniques then utilize these grammatical types to study how words should be distributed within a string of words to form a properly constructed grammatical sentence where each word is forced to support a grammatical operation without necessarily identifying what the word is actually trying to describe.

BRIEF DESCRIPTION OF THE SEVERAL VIEWS OF THE DRAWING(S)

FIG. 7C is a diagram of an embodiment of a synonym words table within a computing system in accordance with the present invention;

FIG. 7D is a diagram of an embodiment of a polysemous words table within a computing system in accordance with the present invention;

FIG. 7E is a diagram of an embodiment of transforming words into groupings within a computing system in accordance with the present invention;

FIG. 8B is a diagram of an embodiment of a groupings table within a computing system in accordance with the present invention;

DETAILED DESCRIPTION OF THE INVENTION

Figure 1:
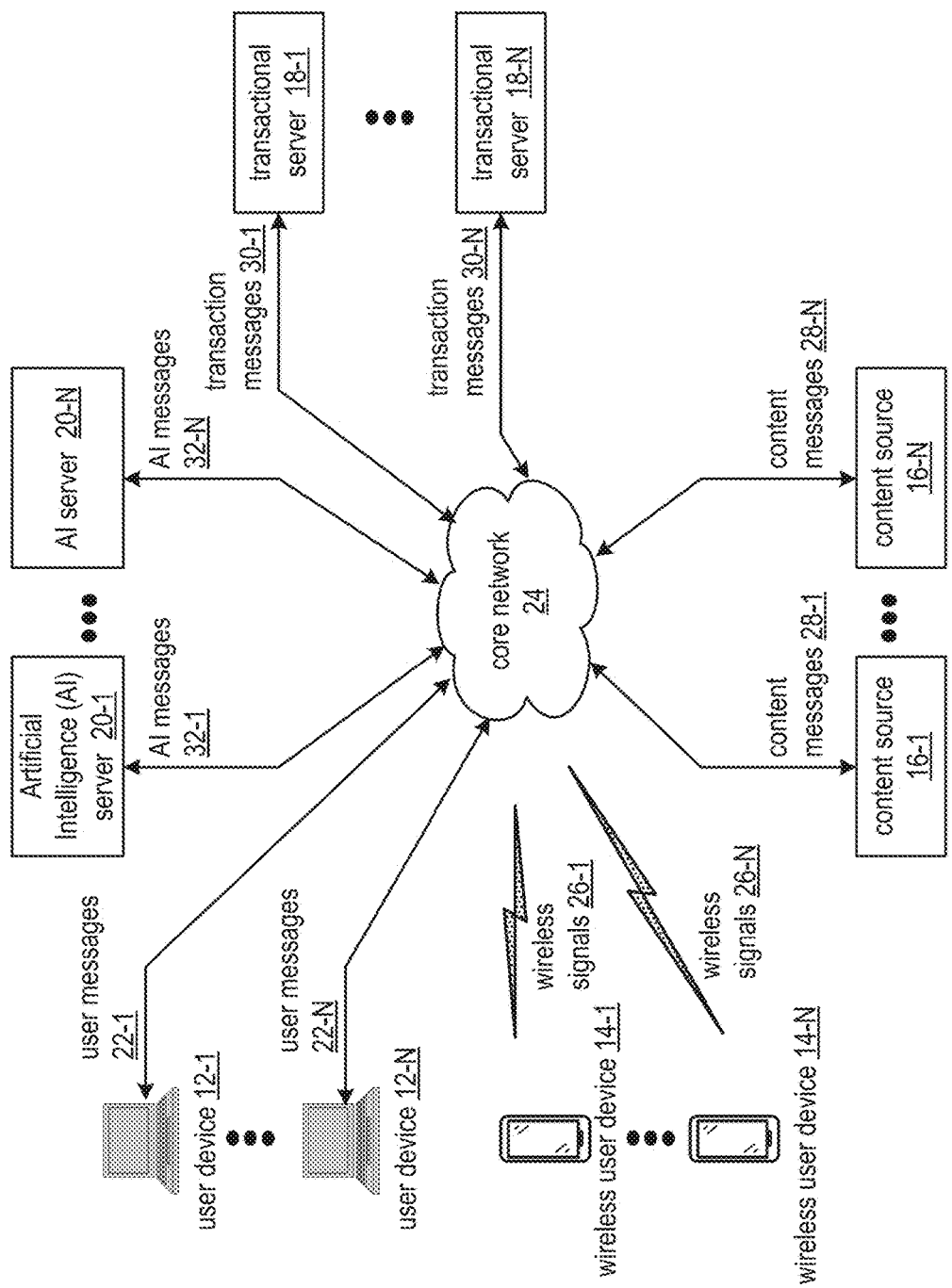
FIG. 1 is a schematic block diagram of an embodiment of a computing system in accordance with the present invention.

FIG. 1 is a schematic block diagram of an embodiment of a computing system 10 that includes a plurality of user devices 12-1 through 12-N, a plurality of wireless user devices 14-1 through 14-N, a plurality of content sources 16-1 through 16-N, a plurality of transactional servers 18-1 through 18-N, a plurality of artificial intelligence (AI) servers 20-1 through 20-N, and a core network 24. The core network 24 includes at least one of the Internet, a public radio access network (RAN), and any private network. Hereafter, the computing system 10 may be interchangeably referred to as a data network, a data communication network, a system, a communication system, and a data communication system. Hereafter, the user device and the wireless user device may be interchangeably referred to as user devices, and each of the transactional servers and the AI servers may be interchangeably referred to as servers.

Each user device, wireless user device, transactional server, and AI server includes a computing device that includes a computing core. In general, a computing device is any electronic device that can communicate data, process data, and/or store data. A further generality of a computing device is that it includes one or more of a central processing unit (CPU), a memory system, a sensor (e.g., internal or external), user input/output interfaces, peripheral device interfaces, communication elements, and an interconnecting bus structure.

As further specific examples, each of the computing devices may be a portable computing device and/or a fixed computing device. A portable computing device may be an embedded controller, a smart sensor, a smart pill, a social networking device, a gaming device, a cell phone, a smart phone, a robot, a personal digital assistant, a digital music player, a digital video player, a laptop computer, a handheld computer, a tablet, a video game controller, an engine controller, a vehicular controller, an aircraft controller, a maritime vessel controller, and/or any other portable device that includes a computing core. A fixed computing device may be security camera, a sensor device, a household appliance, a machine, a robot, an embedded controller, a personal computer (PC), a computer server, a cable set-top box, a satellite receiver, a television set, a printer, a fax machine, home entertainment equipment, a camera controller, a video game console, a critical infrastructure controller, and/or any type of home or office computing equipment that includes a computing core. An embodiment of the various servers is discussed in greater detail with reference to FIG. 2. An embodiment of the various devices is discussed in greater detail with reference to FIG. 3.

Each of the content sources 16-1 through 16-N includes any source of content, where the content includes one or more of data files, a data stream, a tech stream, a text file, an audio stream, an audio file, a video stream, a video file, etc. Examples of the content sources include a weather service, a multi-language online dictionary, a fact server, a big data storage system, the Internet, social media systems, an email server, a news server, a schedule server, a traffic monitor, a security camera system, audio monitoring equipment, an information server, a service provider, a data aggregator, and airline traffic server, a shipping and logistics server, a banking server, a financial transaction server, etc. Alternatively, or in addition to, one or more of the various user devices may provide content. For example, a wireless user device may provide content (e.g., issued as a content message) when the wireless user device is able to capture data (e.g., text input, sensor input, etc.).

Generally, an embodiment of this invention presents solutions where the computing system 10 supports the generation and utilization of knowledge extracted from content. For example, the AI servers 20-1 through 20-N ingest content from the content sources 16-1 through 16-N by receiving, via the core network 24 content messages 28-1 through 28-N as AI messages 32-1 through 32-N, extract the knowledge from the ingested content, and interact with the various user devices to utilize the extracted knowledge by facilitating the issuing, via the core network 24, user messages 22-1 through 22-N to the user devices 12-1 through 12-N and wireless signals 26-1 through 26-N to the wireless user devices 14-1 through 14-N.

Each content message 28-1 through 28-N includes a content request (e.g., requesting content related to a topic, content type, content timing, one or more domains, etc.) or a content response, where the content response includes real-time or static content such as one or more of dictionary information, facts, non-facts, weather information, sensor data, news information, blog information, social media content, user daily activity schedules, traffic conditions, community event schedules, school schedules, user schedules airline records, shipping records, logistics records, banking records, census information, global financial history information, etc. Each AI message 32-1 through 32-N includes one or more of content messages, user messages (e.g., a query request, a query response that includes an answer to a query request), and transaction messages (e.g., transaction information, requests and responses related to transactions). Each user message 22-1 through 22-N includes one or more of a query request, a query response, a trigger request, a trigger response, a content collection, control information, software information, configuration information, security information, routing information, addressing information, presence information, analytics information, protocol information, all types of media, sensor data, statistical data, user data, error messages, etc.

When utilizing a wireless signal capability of the core network 24, each of the wireless user devices 14-1 through 14-N encodes/decodes data and/or information messages (e.g., user messages such as user messages 22-1 through 22-N) in accordance with one or more wireless standards for local wireless data signals (e.g., Wi-Fi, Bluetooth, ZigBee) and/or for wide area wireless data signals (e.g., 2G, 3G, 4G, 5G, satellite, point-to-point, etc.) to produce wireless signals 26-1 through 26-N. Having encoded/decoded the data and/or information messages, the wireless user devices 14-1 through 14-N and/receive the wireless signals to/from the wireless capability of the core network 24.

As another example of the generation and utilization of knowledge, the transactional servers 18-1 through 18-N communicate, via the core network 24, transaction messages 30-1 through 30-N as further AI messages 32-1 through 32-N to facilitate ingesting of transactional type content (e.g., real-time crypto currency transaction information) and to facilitate handling of utilization of the knowledge by one or more of the transactional servers (e.g., for a transactional function) in addition to the utilization of the knowledge by the various user devices. Each transaction message 30-1 through 30-N includes one or more of a query request, a query response, a trigger request, a trigger response, a content message, and transactional information, where the transactional information may include one or more of consumer purchasing history, crypto currency ledgers, stock market trade information, other investment transaction information, etc.

In another specific example of operation of the generation and utilization of knowledge extracted from the content, the user device 12-1 issues a user message 22-1 to the AI server 20-1, where the user message 22-1 includes a query request and where the query request includes a question related to a first domain of knowledge. The issuing includes generating the user message 22-1 based on the query request (e.g., the question), selecting the AI server 20-1 based on the first domain of knowledge, and sending, via the core network 24, the user message 22-1 as a further AI message 32-1 to the AI server 20-1. Having received the AI message 32-1, the AI server 20-1 analyzes the question within the first domain, generates further knowledge, generates a preliminary answer, generates a quality level indicator of the preliminary answer, and determines to gather further content when the quality level indicator is below a minimum quality threshold level.

When gathering the further content, the AI server 20-1 issues, via the core network 24, a still further AI message 32-1 as a further content message 28-1 to the content source 16-1, where the content message 28-1 includes a content request for more content associated with the first domain of knowledge and in particular the question. Alternatively, or in addition to, the AI server 20-1 issues the content request to another AI server to facilitate a response within a domain associated with the other AI server. Further alternatively, or in addition to, the AI server 20-1 issues the content request to one or more of the various user devices to facilitate a response from a subject matter expert.

Having received the content message 28-1, the contents or 16-1 issues, via the core network 24, a still further content message 28-1 to the AI server 20-1 as a yet further AI message 32-1, where the still further content message 28-1 includes requested content. The AI server 20-1 processes the received content to generate further knowledge. Having generated the further knowledge, the AI server 20-1 re-analyzes the question, generates still further knowledge, generates another preliminary answer, generates another quality level indicator of the other preliminary answer, and determines to issue a query response to the user device 12-1 when the quality level indicator is above the minimum quality threshold level. When issuing the query response, the AI server 20-1 generates an AI message 32-1 that includes another user message 22-1, where the other user message 22-1 includes the other preliminary answer as a query response including the answer to the question. Having generated the AI message 32-1, the AI server 20-1 sends, via the core network 24, the AI message 32-1 as the user message 22-1 to the user device 12-1 thus providing the answer to the original question of the query request.

Figure 2:
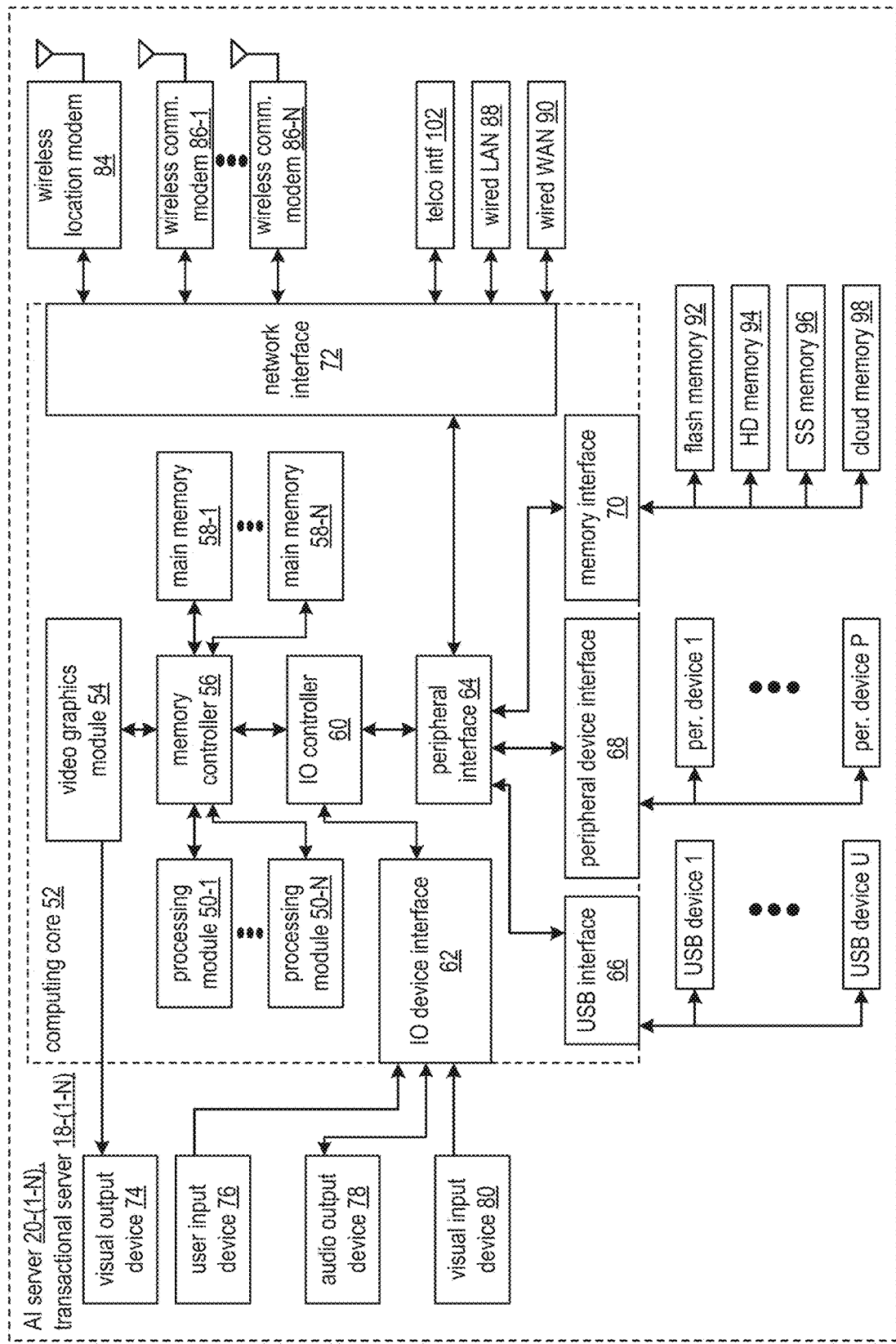
FIG. 2 is a schematic block diagram of an embodiment of various servers of a computing system in accordance with the present invention.

FIG. 2 is a schematic block diagram of an embodiment of the AI servers 20-1 through 20-N and the transactional servers 18-1 through 18-N of the computing system 10 of FIG. 1. The servers include a computing core 52, one or more visual output devices 74 (e.g., video graphics display, touchscreen, LED, etc.), one or more user input devices 76 (e.g., keypad, keyboard, touchscreen, voice to text, a push button, a microphone, a card reader, a door position switch, a biometric input device, etc.), one or more audio output devices 78 (e.g., speaker(s), headphone jack, a motor, etc.), and one or more visual input devices 80 (e.g., a still image camera, a video camera, photocell, etc.).

The servers further include one or more universal serial bus (USB) devices (USB devices 1-U), one or more peripheral devices (e.g., peripheral devices 1-P), one or more memory devices (e.g., one or more flash memory devices 92, one or more hard drive (HD) memories 94, and one or more solid state (SS) memory devices 96, and/or cloud memory 98). The servers further include one or more wireless location modems 84 (e.g., global positioning satellite (GPS), Wi-Fi, angle of arrival, time difference of arrival, signal strength, dedicated wireless location, etc.), one or more wireless communication modems 86-1 through 86-N (e.g., a cellular network transceiver, a wireless data network transceiver, a Wi-Fi transceiver, a Bluetooth transceiver, a 315 MHz transceiver, a zig bee transceiver, a 60 GHz transceiver, etc.), a telco interface 102 (e.g., to interface to a public switched telephone network), and a wired local area network (LAN) 88 (e.g., optical, electrical), and a wired wide area network (WAN) 90 (e.g., optical, electrical).

The computing core 52 includes a video graphics module 54, one or more processing modules 50-1 through 50-N (e.g., which may include one or more secure co-processors), a memory controller 56 and one or more main memories 58-1 through 58-N (e.g., RAM serving as local memory). The computing core 52 further includes one or more input/output (I/O) device interfaces 62, an input/output (I/O) controller 60, a peripheral interface 64, one or more USB interfaces 66, one or more network interfaces 72, one or more memory interfaces 70, and/or one or more peripheral device interfaces 68.

The processing modules may be a single processing device or a plurality of processing devices where the processing device may further be referred to as one or more of a "processing circuit", a "processor", and/or a "processing unit". Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions.

The processing module, module, processing circuit, and/or processing unit may be, or further include, memory and/or an integrated memory element, which may be a single memory device, a plurality of memory devices, and/or embedded circuitry of another processing module, module, processing circuit, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network).

Further note that if the processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, and/or processing unit executes, hard coded and/or operational instructions corresponding to at least some of the steps and/or functions illustrated in one or more of the Figures. Such a memory device or memory element can be included in an article of manufacture.

Each of the interfaces 62, 66, 68, 70, and 72 includes a combination of hardware (e.g., connectors, wiring, etc.) and may further include operational instructions stored on memory (e.g., driver software) that are executed by one or more of the processing modules 50-1 through 50-N and/or a processing circuit within the interface. Each of the interfaces couples to one or more components of the servers. For example, one of the IO device interfaces 62 couples to an audio output device 78. As another example, one of the memory interfaces 70 couples to flash memory 92 and another one of the memory interfaces 70 couples to cloud memory 98 (e.g., an on-line storage system and/or on-line backup system). In other embodiments, the servers may include more or less devices and modules than shown in this example embodiment of the servers.

Figure 3:
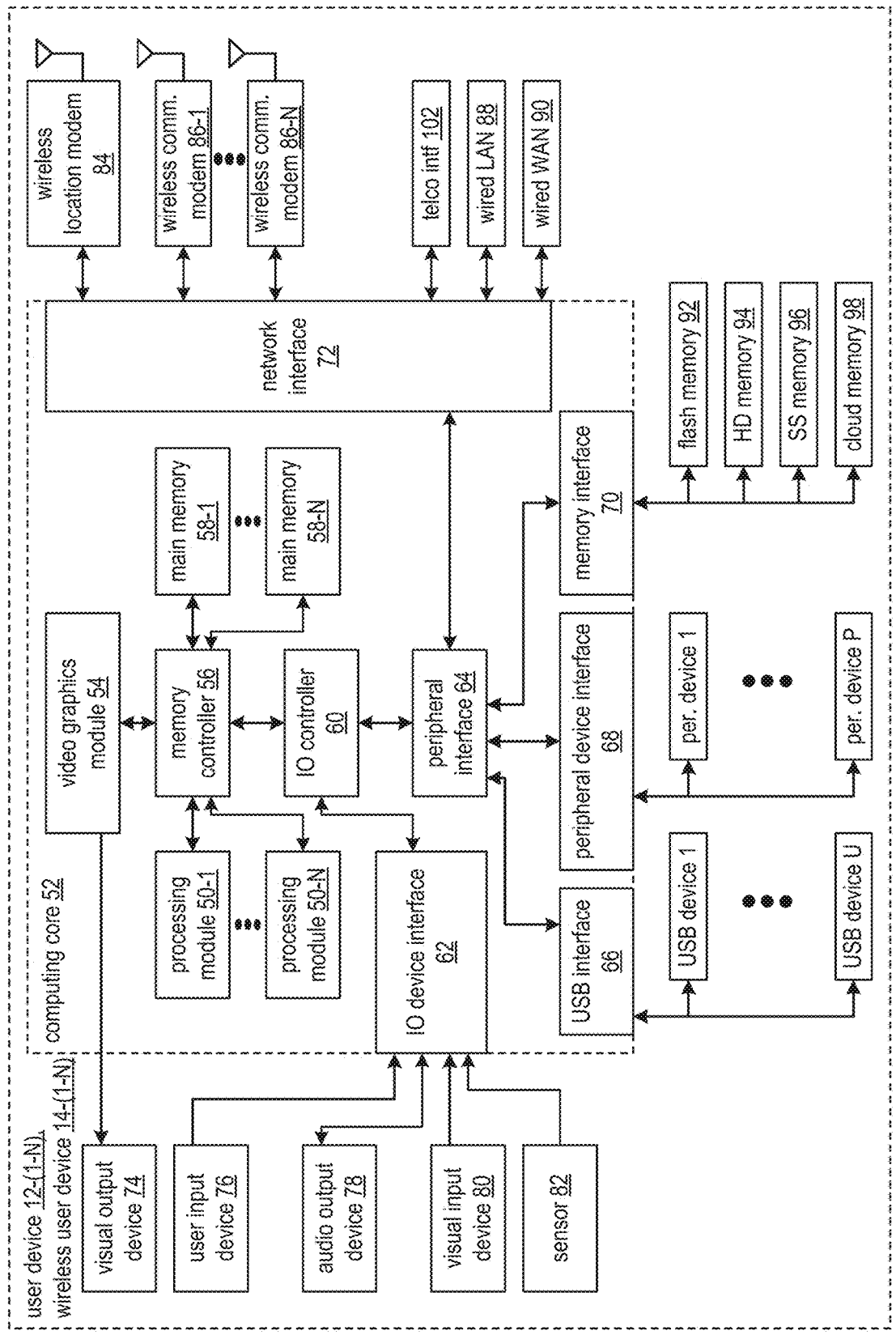
FIG. 3 is a schematic block diagram of an embodiment of various devices of a computing system in accordance with the present invention.

FIG. 3 is a schematic block diagram of an embodiment of the various devices of the computing system 10 of FIG. 1, including the user devices 12-1 through 12-N and the wireless user devices 14-1 through 14-N. The various devices include the visual output device 74 of FIG. 2, the user input device 76 of FIG. 2, the audio output device 78 of FIG. 2, the visual input device 80 of FIG. 2, and one or more sensors 82.

The sensor may implemented internally and/or externally to the device. Example sensors includes a still camera, a video camera, servo motors associated with a camera, a position detector, a smoke detector, a gas detector, a motion sensor, an accelerometer, velocity detector, a compass, a gyro, a temperature sensor, a pressure sensor, an altitude sensor, a humidity detector, a moisture detector, an imaging sensor, and a biometric sensor. Further examples of the sensor include an infrared sensor, an audio sensor, an ultrasonic sensor, a proximity detector, a magnetic field detector, a biomaterial detector, a radiation detector, a weight detector, a density detector, a chemical analysis detector, a fluid flow volume sensor, a DNA reader, a wind speed sensor, a wind direction sensor, and an object detection sensor.

Further examples of the sensor include an object identifier sensor, a motion recognition detector, a battery level detector, a room temperature sensor, a sound detector, a smoke detector, an intrusion detector, a motion detector, a door position sensor, a window position sensor, and a sunlight detector. Still further sensor examples include medical category sensors including: a pulse rate monitor, a heart rhythm monitor, a breathing detector, a blood pressure monitor, a blood glucose level detector, blood type, an electrocardiogram sensor, a body mass detector, an imaging sensor, a microphone, body temperature, etc.

The various devices further include the computing core 52 of FIG. 2, the one or more universal serial bus (USB) devices (USB devices 1-U) of FIG. 2, the one or more peripheral devices (e.g., peripheral devices 1-P) of FIG. 2, and the one or more memories of FIG. 2 (e.g., flash memories 92, HD memories 94, SS memories 96, and/or cloud memories 98). The various devices further include the one or more wireless location modems 84 of FIG. 2, the one or more wireless communication modems 86-1 through 86-N of FIG. 2, the telco interface 102 of FIG. 2, the wired local area network (LAN) 88 of FIG. 2, and the wired wide area network (WAN) 90 of FIG. 2. In other embodiments, the various devices may include more or less internal devices and modules than shown in this example embodiment of the various devices.

Figure 4A:
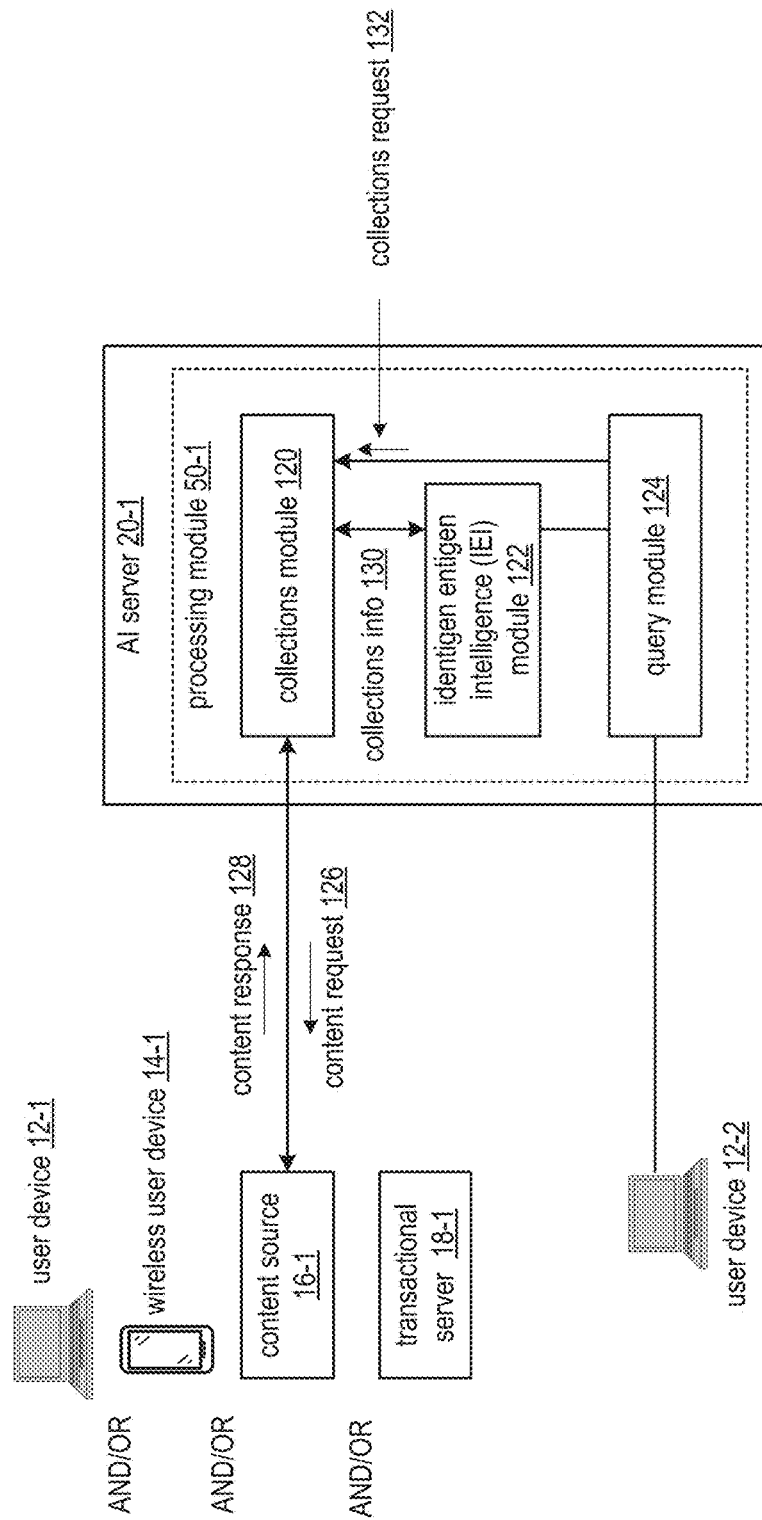
FIGS. 4A and 4B are schematic block diagrams of another embodiment of a computing system in accordance with the present invention.
Figure 4B:
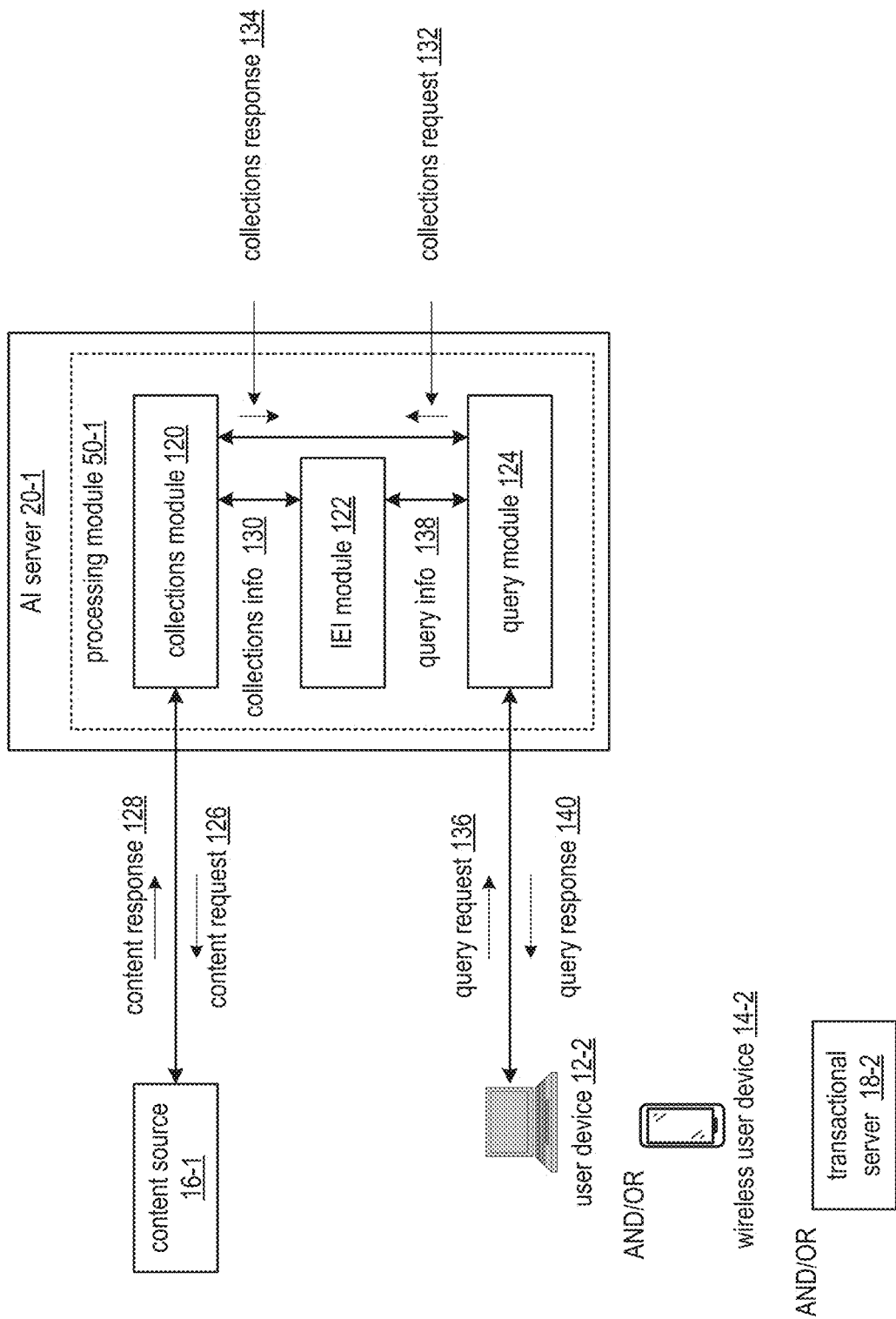

FIGS. 4A and 4B are schematic block diagrams of another embodiment of a computing system that includes one or more of the user device 12-1 of FIG. 1, the wireless user device 14-1 of FIG. 1, the content source 16-1 of FIG. 1, the transactional server 18-1 of FIG. 1, the user device 12-2 of FIG. 1, and the AI server 20-1 of FIG. 1. The AI server 20-1 includes the processing module 50-1 (e.g., associated with the servers) of FIG. 2, where the processing module 50-1 includes a collections module 120, an identigen entigen intelligence (IEI) module 122, and a query module 124. Alternatively, the collections module 120, the IEI module 122, and the query module 124 may be implemented by the processing module 50-1 (e.g., associated with the various user devices) of FIG. 3. The computing system functions to interpret content to produce a response to a query.

FIG. 4A illustrates an example of the interpreting of the content to produce the response to the query where the collections module 120 interprets (e.g., based on an interpretation approach such as rules) at least one of a collections request 132 from the query module 124 and a collections request within collections information 130 from the IEI module 122 to produce content request information (e.g., potential sources, content descriptors of desired content). Alternatively, or in addition to, the collections module 120 may facilitate gathering further content based on a plurality of collection requests from a plurality of devices of the computing system 10 of FIG. 1.

The collections request 132 is utilized to facilitate collection of content, where the content may be received in a real-time fashion once or at desired intervals, or in a static fashion from previous discrete time frames. For instance, the query module 124 issues the collections request 132 to facilitate collection of content as a background activity to support a long-term query (e.g., how many domestic airline flights over the next seven days include travelers between the age of 18 and 35 years old). The collections request 132 may include one or more of a requester identifier (ID), a content type (e.g., language, dialect, media type, topic, etc.), a content source indicator, security credentials (e.g., an authorization level, a password, a user ID, parameters utilized for encryption, etc.), a desired content quality level, trigger information (e.g., parameters under which to collect content based on a pre-event, an event (i.e., content quality level reaches a threshold to cause the trigger, trueness), or a timeframe), a desired format, and a desired timing associated with the content.

Having interpreted the collections request 132, the collections module 120 selects a source of content based on the content request information. The selecting includes one or more of identifying one or more potential sources based on the content request information, selecting the source of content from the potential sources utilizing a selection approach (e.g., favorable history, a favorable security level, favorable accessibility, favorable cost, favorable performance, etc.). For example, the collections module 120 selects the content source 16-1 when the content source 16-1 is known to provide a favorable content quality level for a domain associated with the collections request 132.

Having selected the source of content, the collections module 120 issues a content request 126 to the selected source of content. The issuing includes generating the content request 126 based on the content request information for the selected source of content and sending the content request 126 to the selected source of content. The content request 126 may include one or more of a content type indicator, a requester ID, security credentials for content access, and any other information associated with the collections request 132. For example, the collections module 120 sends the content request 126, via the core network 24 of FIG. 1, to the content source 16-1. Alternatively, or in addition to, the collections module 120 may send a similar content request 126 to one or more of the user device 12-1, the wireless user device 14-1, and the transactional server 18-1 to facilitate collecting of further content.

In response to the content request 126, the collections module 120 receives one or more content responses 128. The content response 128 includes one or more of content associated with the content source, a content source identifier, security credential processing information, and any other information pertaining to the desired content. Having received the content response 128, the collections module 120 interprets the received content response 128 to produce collections information 130, where the collections information 130 further includes a collections response from the collections module 120 to the IEI module 122.

The collections response includes one or more of transformed content (e.g., completed sentences and paragraphs), timing information associated with the content, a content source ID, and a content quality level. Having generated the collections response of the collections information 130, the collections module 120 sends the collections information 130 to the IEI module 122. Having received the collections information 130 from the collections module 120, the IEI module 122 interprets the further content of the content response to generate further knowledge, where the further knowledge is stored in a memory associated with the IEI module 122 to facilitate subsequent answering of questions posed in received queries.

FIG. 4B further illustrates the example of the interpreting of the content to produce the response to the query where, the query module 124 interprets a received query request 136 from a requester to produce an interpretation of the query request. For example, the query module 124 receives the query request 136 from the user device 12-2, and/or from one or more of the wireless user device 14-2 and the transactional server 18-2. The query request 136 includes one or more of an identifier (ID) associated with the request (e.g., requester ID, ID of an entity to send a response to), a question, question constraints (e.g., within a timeframe, within a geographic area, within a domain of knowledge, etc.), and content associated with the question (e.g., which may be analyzed for new knowledge itself).

The interpreting of the query request 136 includes determining whether to issue a request to the IEI module 122 (e.g., a question, perhaps with content) and/or to issue a request to the collections module 120 (e.g., for further background content). For example, the query module 124 produces the interpretation of the query request to indicate to send the request directly to the IEI module 122 when the question is associated with a simple non-time varying function answer (e.g., question: "how many hydrogen atoms does a molecule of water have?").

Having interpreted the query request 136, the query module 124 issues at least one of an IEI request as query information 138 to the IEI module 122 (e.g., when receiving a simple new query request) and a collections request 132 to the collections module 120 (e.g., based on two or more query requests 136 requiring more substantive content gathering). The IEI request of the query information 138 includes one or more of an identifier (ID) of the query module 124, an ID of the requester (e.g., the user device 12-2), a question (e.g., with regards to content for analysis, with regards to knowledge minded by the AI server from general content), one or more constraints (e.g., assumptions, restrictions, etc.) associated with the question, content for analysis of the question, and timing information (e.g., a date range for relevance of the question).

Having received the query information 138 that includes the IEI request from the query module 124, the IEI module 122 determines whether a satisfactory response can be generated based on currently available knowledge, including that of the query request 136. The determining includes indicating that the satisfactory response cannot be generated when an estimated quality level of an answer falls below a minimum quality threshold level. When the satisfactory response cannot be generated, the IEI module 122 facilitates collecting more content. The facilitating includes issuing a collections request to the collections module 120 of the AI server 20-1 and/or to another server or user device, and interpreting a subsequent collections response 134 of collections information 130 that includes further content to produce further knowledge to enable a more favorable answer.

When the IEI module 122 indicates that the satisfactory response can be generated, the IEI module 122 issues an IEI response as query information 138 to the query module 124. The IEI response includes one or more of one or more answers, timing relevance of the one or more answers, an estimated quality level of each answer, and one or more assumptions associated with the answer. The issuing includes generating the IEI response based on the collections response 134 of the collections information 130 and the IEI request, and sending the IEI response as the query information 138 to the query module 124. Alternatively, or in addition to, at least some of the further content collected by the collections module 120 is utilized to generate a collections response 134 issued by the collections module 120 to the query module 124. The collections response 134 includes one or more of further content, a content availability indicator (e.g., when, where, required credentials, etc.), a content freshness indicator (e.g., timestamps, predicted time availability), content source identifiers, and a content quality level.

Having received the query information 138 from the IEI module 122, the query module 124 issues a query response 140 to the requester based on the IEI response and/or the collections response 134 directly from the collections module 120, where the collection module 120 generates the collections response 134 based on collected content and the collections request 132. The query response 140 includes one or more of an answer, answer timing, an answer quality level, and answer assumptions.

Figure 4C:
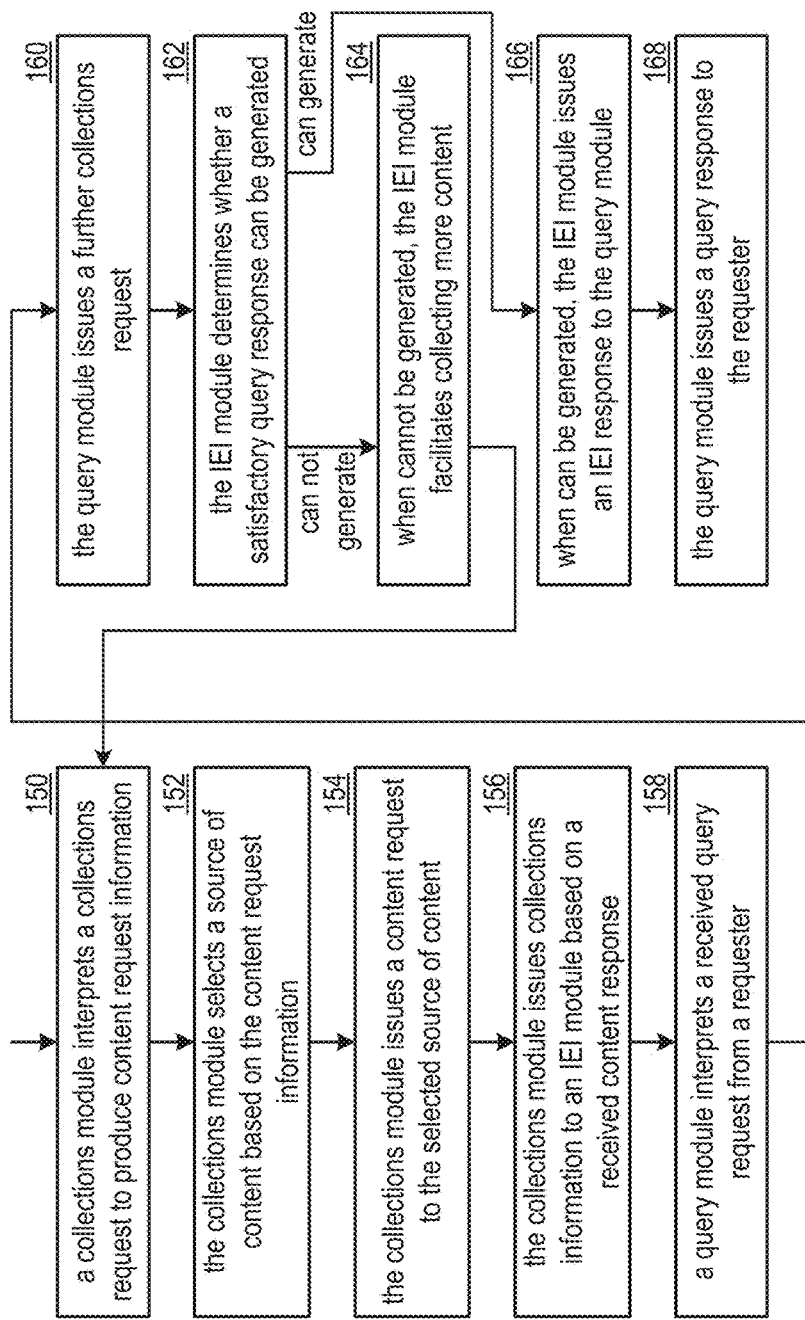
FIG. 4C is a logic diagram of an embodiment of a method for interpreting content to produce a response to a query within a computing system in accordance with the present invention.

FIG. 4C is a logic diagram of an embodiment of a method for interpreting content to produce a response to a query within a computing system. In particular, a method is presented for use in conjunction with one or more functions and features described in conjunction with FIGS. 1-3, 4A-4B, and also FIG. 4C. The method includes step 150 where a collections module of a processing module of one or more computing devices (e.g., of one or more servers) interprets a collections request to produce content request information. The interpreting may include one or more of identifying a desired content source, identifying a content type, identifying a content domain, and identifying content timing requirements.

The method continues at step 152 where the collections module selects a source of content based on the content request information. For example, the collections module identifies one or more potential sources based on the content request information and selects the source of content from the potential sources utilizing a selection approach (e.g., based on one or more of favorable history, a favorable security level, favorable accessibility, favorable cost, favorable performance, etc.). The method continues at step 154 where the collections module issues a content request to the selected source of content. The issuing includes generating a content request based on the content request information for the selected source of content and sending the content request to the selected source of content.

The method continues at step 156 where the collections module issues collections information to an identigen entigen intelligence (IEI) module based on a received content response, where the IEI module extracts further knowledge from newly obtained content from the one or more received content responses. For example, the collections module generates the collections information based on newly obtained content from the one or more received content responses of the selected source of content.

The method continues at step 158 where a query module interprets a received query request from a requester to produce an interpretation of the query request. The interpreting may include determining whether to issue a request to the IEI module (e.g., a question) or to issue a request to the collections module to gather further background content. The method continues at step 160 where the query module issues a further collections request. For example, when receiving a new query request, the query module generates a request for the IEI module. As another example, when receiving a plurality of query requests for similar questions, the query module generates a request for the collections module to gather further background content.

The method continues at step 162 where the IEI module determines whether a satisfactory query response can be generated when receiving the request from the query module. For example, the IEI module indicates that the satisfactory query response cannot be generated when an estimated quality level of an answer is below a minimum answer quality threshold level. The method branches to step 166 when the IEI module determines that the satisfactory query response can be generated. The method continues to step 164 when the IEI module determines that the satisfactory query response cannot be generated. When the satisfactory query response cannot be generated, the method continues at step 164 where the IEI module facilitates collecting more content. The method loops back to step 150.

When the satisfactory query response can be generated, the method continues at step 166 where the IEI module issues an IEI response to the query module. The issuing includes generating the IEI response based on the collections response and the IEI request, and sending the IEI response to the query module. The method continues at step 168 where the query module issues a query response to the requester. For example, the query module generates the query response based on the IEI response and/or a collections response from the collections module and sends the query response to the requester, where the collections module generates the collections response based on collected content and the collections request.

The method described above in conjunction with the processing module can alternatively be performed by other modules of the computing system 10 of FIG. 1 or by other devices. In addition, at least one memory section (e.g., a computer readable memory, a non-transitory computer readable storage medium, a non-transitory computer readable memory organized into a first memory element, a second memory element, a third memory element, a fourth element section, a fifth memory element etc.) that stores operational instructions can, when executed by one or more processing modules of one or more computing devices (e.g., one or more servers, one or more user devices) of the computing system 10, cause the one or more computing devices to perform any or all of the method steps described above.

Figure 5A:
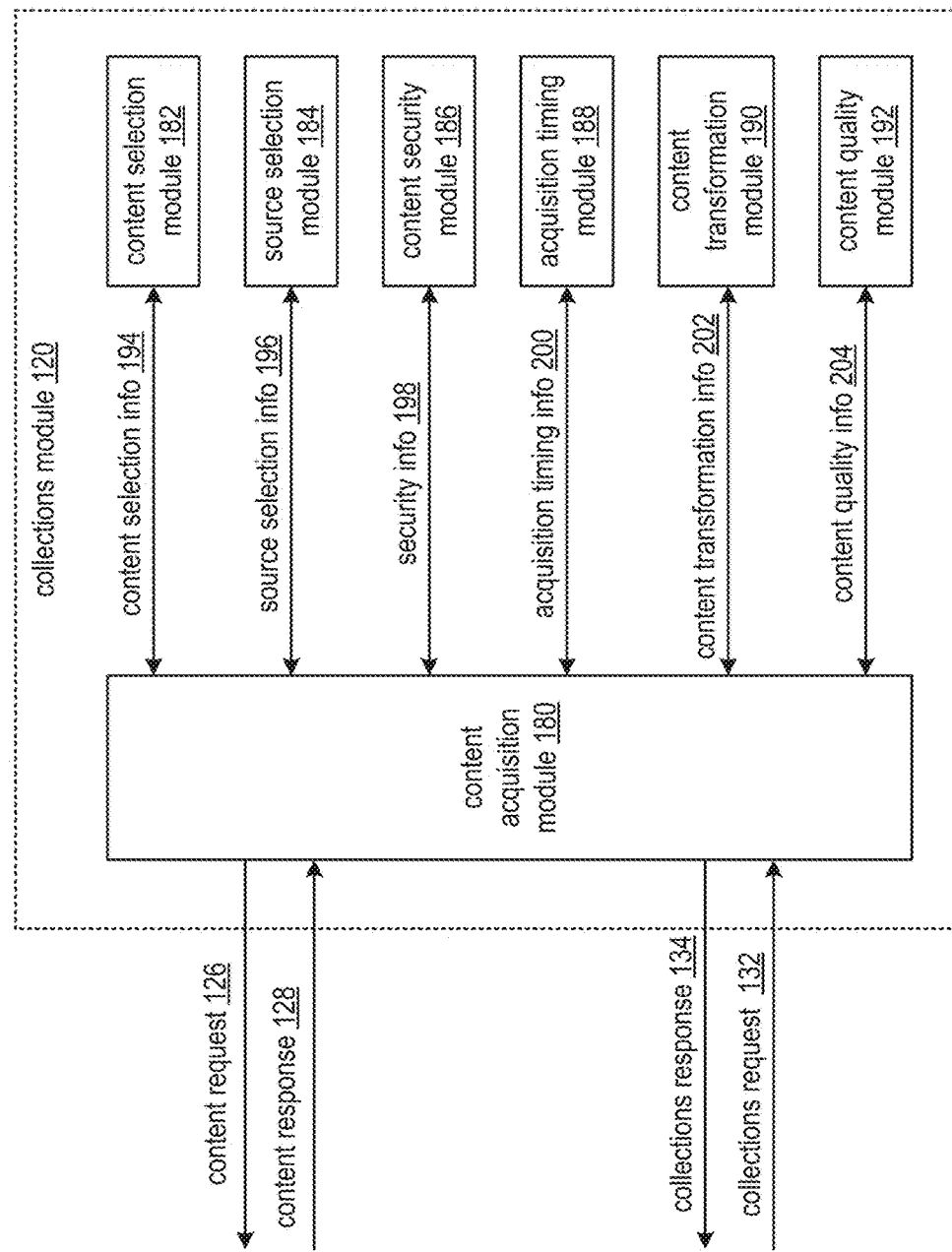
FIG. 5A is a schematic block diagram of an embodiment of a collections module of a computing system in accordance with the present invention.

FIG. 5A is a schematic block diagram of an embodiment of the collections module 120 of FIG. 4A that includes a content acquisition module 180, a content selection module 182, a source selection module 184, a content security module 186, an acquisition timing module 188, a content transformation module 190, and a content quality module 192. Generally, an embodiment of this invention presents solutions where the collections module 120 supports collecting content.

In an example of operation of the collecting of the content, the content acquisition module 180 receives a collections request 132 from a requester. The content acquisition module 180 obtains content selection information 194 based on the collections request 132. The content selection information 194 includes one or more of content requirements, a desired content type indicator, a desired content source identifier, a content type indicator, a candidate source identifier (ID), and a content profile (e.g., a template of typical parameters of the content). For example, the content acquisition module 180 receives the content selection information 194 from the content selection module 182, where the content selection module 182 generates the content selection information 194 based on a content selection information request from the content acquisition module 180 and where the content acquisition module 180 generates the content selection information request based on the collections request 132.

The content acquisition module 180 obtains source selection information 196 based on the collections request 132. The source selection information 196 includes one or more of candidate source identifiers, a content profile, selected sources, source priority levels, and recommended source access timing. For example, the content acquisition module 180 receives the source selection information 196 from the source selection module 184, where the source selection module 184 generates the source selection information 196 based on a source selection information request from the content acquisition module 180 and where the content acquisition module 180 generates the source selection information request based on the collections request 132.

The content acquisition module 180 obtains acquisition timing information 200 based on the collections request 132. The acquisition timing information 200 includes one or more of recommended source access timing, confirmed source access timing, source access testing results, estimated velocity of content update's, content precious, timestamps, predicted time availability, required content acquisition triggers, content acquisition trigger detection indicators, and a duplicative indicator with a pending content request. For example, the content acquisition module 180 receives the acquisition timing information 200 from the acquisition timing module 188, where the acquisition timing module 188 generates the acquisition timing information 200 based on an acquisition timing information request from the content acquisition module 180 and where the content acquisition module 180 generates the acquisition timing information request based on the collections request 132.

Having obtained the content selection information 194, the source selection information 196, and the acquisition timing information 200, the content acquisition module 180 issues a content request 126 to a content source utilizing security information 198 from the content security module 186, where the content acquisition module 180 generates the content request 126 in accordance with the content selection information 194, the source selection information 196, and the acquisition timing information 200. The security information 198 includes one or more of source priority requirements, requester security information, available security procedures, and security credentials for trust and/or encryption. For example, the content acquisition module 180 generates the content request 126 to request a particular content type in accordance with the content selection information 194 and to include security parameters of the security information 198, initiates sending of the content request 126 in accordance with the acquisition timing information 200, and sends the content request 126 to a particular targeted content source in accordance with the source selection information 196.

In response to receiving a content response 128, the content acquisition module 180 determines the quality level of received content extracted from the content response 128. For example, the content acquisition module 180 receives content quality information 204 from the content quality module 192, where the content quality module 192 generates the quality level of the received content based on receiving a content quality request from the content acquisition module 180 and where the content acquisition module 180 generates the content quality request based on content extracted from the content response 128. The content quality information includes one or more of a content reliability threshold range, a content accuracy threshold range, a desired content quality level, a predicted content quality level, and a predicted level of trust.

When the quality level is below a minimum desired quality threshold level, the content acquisition module 180 facilitates acquisition of further content. The facilitating includes issuing another content request 126 to a same content source and/or to another content source to receive and interpret further received content. When the quality level is above the minimum desired quality threshold level, the content acquisition module 180 issues a collections response 134 to the requester. The issuing includes processing the content in accordance with a transformation approach to produce transformed content, generating the collections response 134 to include the transformed content, and sending the collections response 134 to the requester. The processing of the content to produce the transformed content includes receiving content transformation information 202 from the content transformation module 190, where the content transformation module 190 transforms the content in accordance with the transformation approach to produce the transformed content. The content transformation information includes a desired format, available formats, recommended formatting, the received content, transformation instructions, and the transformed content.

Figure 5B:
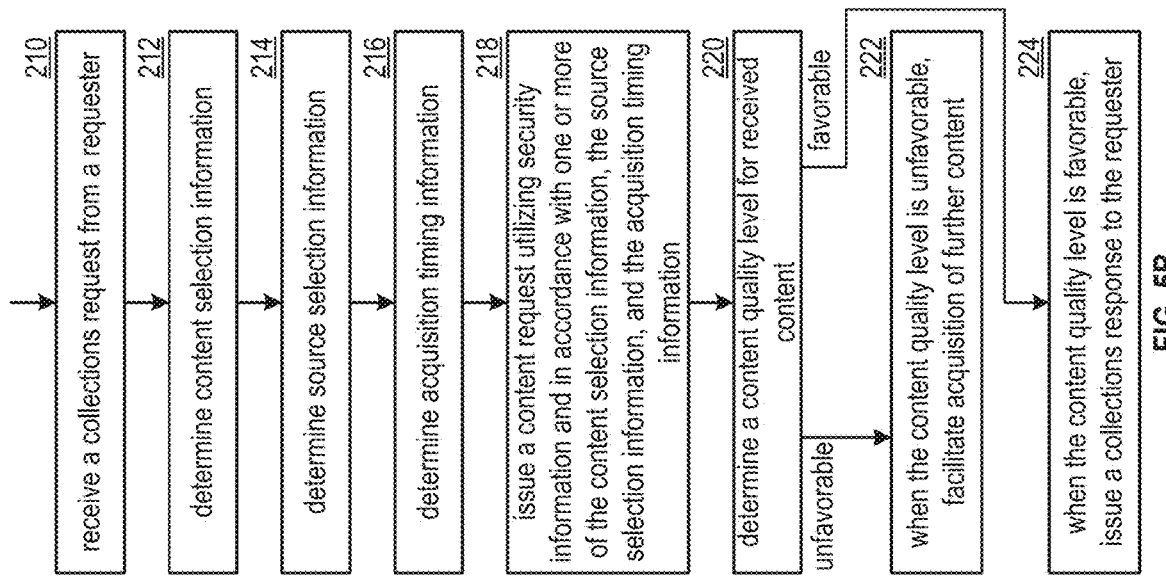
FIG. 5B is a logic diagram of an embodiment of a method for obtaining content within a computing system in accordance with the present invention.

FIG. 5B is a logic diagram of an embodiment of a method for obtaining content within a computing system. In particular, a method is presented for use in conjunction with one or more functions and features described in conjunction with FIGS. 1-3, 4A-4C, 5A, and also FIG. 5B. The method includes step 210 where a processing module of one or more processing modules of one or more computing devices of the computing system receives a collections request from the requester. The method continues at step 212 where the processing module determines content selection information. The determining includes interpreting the collections request to identify requirements of the content.

The method continues at step 214 where the processing module determines source selection information. The determining includes interpreting the collections request to identify and select one or more sources for the content to be collected. The method continues at step 216 where the processing module determines acquisition timing information. The determining includes interpreting the collections request to identify timing requirements for the acquisition of the content from the one or more sources. The method continues at step 218 where the processing module issues a content request utilizing security information and in accordance with one or more of the content selection information, the source selection information, and the acquisition timing information. For example, the processing module issues the content request to the one or more sources for the content in accordance with the content requirements, where the sending of the request is in accordance with the acquisition timing information.

The method continues at step 220 where the processing module determines a content quality level for received content area the determining includes receiving the content from the one or more sources, obtaining content quality information for the received content based on a quality analysis of the received content. The method branches to step 224 when the content quality level is favorable and the method continues to step 222 when the quality level is unfavorable. For example, the processing module determines that the content quality level is favorable when the content quality level is equal to or above a minimum quality threshold level and determines that the content quality level is unfavorable when the content quality level is less than the minimum quality threshold level.

When the content quality level is unfavorable, the method continues at step 222 where the processing module facilitates acquisition and further content. For example, the processing module issues further content requests and receives further content for analysis. When the content quality level is favorable, the method continues at step 224 where the processing module issues a collections response to the requester. The issuing includes generating the collections response and sending the collections response to the requester. The generating of the collections response may include transforming the received content into transformed content in accordance with a transformation approach (e.g., reformatting, interpreting absolute meaning and translating into another language in accordance with the absolute meaning, etc.).

The method described above in conjunction with the processing module can alternatively be performed by other modules of the computing system 10 of FIG. 1 or by other devices. In addition, at least one memory section (e.g., a computer readable memory, a non-transitory computer readable storage medium, a non-transitory computer readable memory organized into a first memory element, a second memory element, a third memory element, a fourth element section, a fifth memory element etc.) that stores operational instructions can, when executed by one or more processing modules of one or more computing devices (e.g., one or more servers, one or more user devices) of the computing system 10, cause the one or more computing devices to perform any or all of the method steps described above.

Figure 5C:
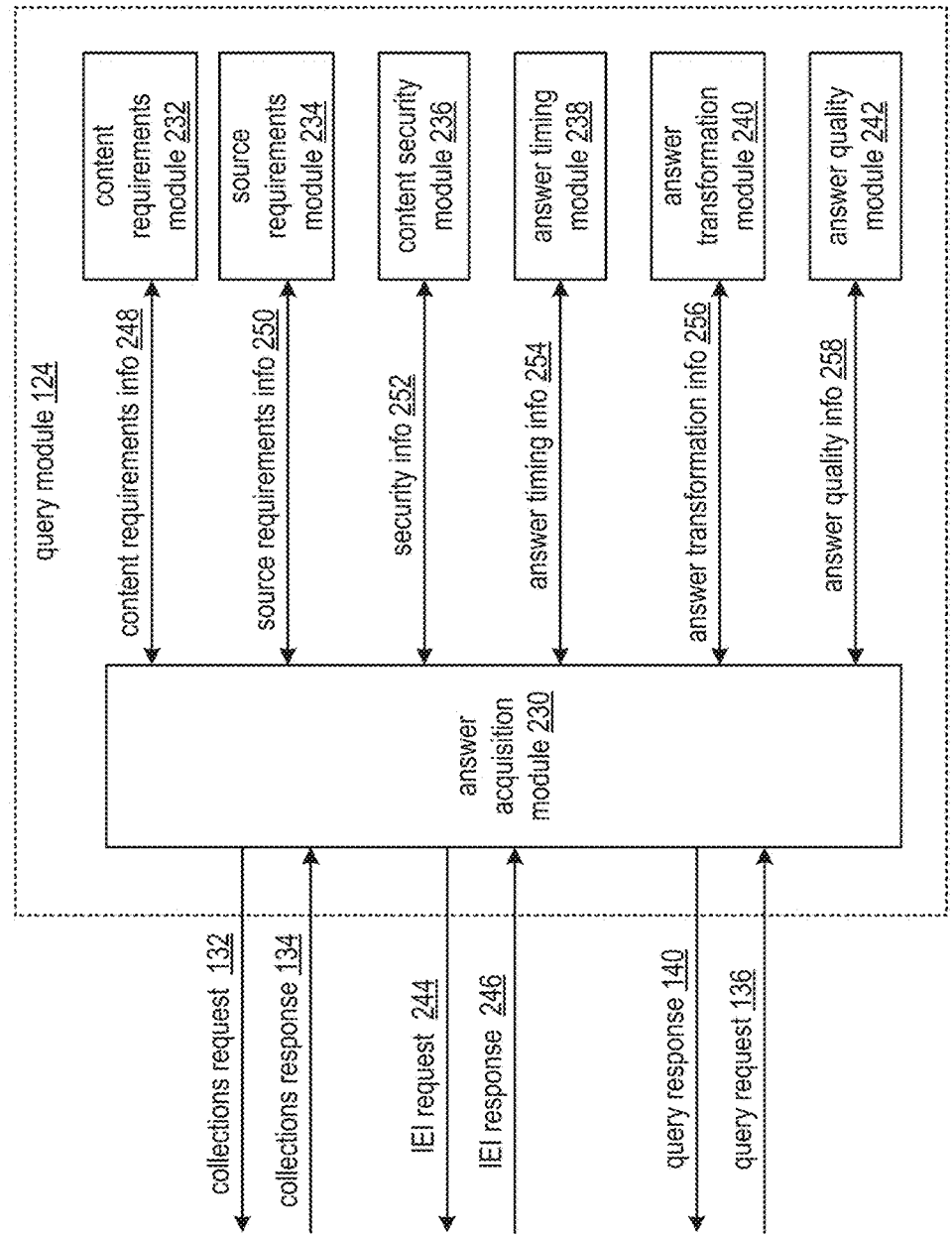
FIG. 5C is a schematic block diagram of an embodiment of a query module of a computing system in accordance with the present invention.

FIG. 5C is a schematic block diagram of an embodiment of the query module 124 of FIG. 4A that includes an answer acquisition module 230, a content requirements module 232 a source requirements module 234, a content security module 236, an answer timing module 238, an answer transformation module 240, and an answer quality module 242. Generally, an embodiment of this invention presents solutions where the query module 124 supports responding to a query.

In an example of operation of the responding to the query, the answer acquisition module 230 receives a query request 136 from a requester. The answer acquisition module 230 obtains content requirements information 248 based on the query request 136. The content requirements information 248 includes one or more of content parameters, a desired content type, a desired content source if any, a content type if any, candidate source identifiers, a content profile, and a question of the query request 136. For example, the answer acquisition module 230 receives the content requirements information 248 from the content requirements module 232, where the content requirements module 232 generates the content requirements information 248 based on a content requirements information request from the answer acquisition module 230 and where the answer acquisition module 230 generates the content requirements information request based on the query request 136.

The answer acquisition module 230 obtains source requirements information 250 based on the query request 136. The source requirements information 250 includes one or more of candidate source identifiers, a content profile, a desired source parameter, recommended source parameters, source priority levels, and recommended source access timing. For example, the answer acquisition module 230 receives the source requirements information 250 from the source requirements module 234, where the source requirements module 234 generates the source requirements information 250 based on a source requirements information request from the answer acquisition module 230 and where the answer acquisition module 230 generates the source requirements information request based on the query request 136.

The answer acquisition module 230 obtains answer timing information 254 based on the query request 136. The answer timing information 254 includes one or more of requested answer timing, confirmed answer timing, source access testing results, estimated velocity of content updates, content freshness, timestamps, predicted time available, requested content acquisition trigger, and a content acquisition trigger detected indicator. For example, the answer acquisition module 230 receives the answer timing information 254 from the answer timing module 238, where the answer timing module 238 generates the answer timing information 254 based on an answer timing information request from the answer acquisition module 230 and where the answer acquisition module 230 generates the answer timing information request based on the query request 136.

Having obtained the content requirements information 248, the source requirements information 250, and the answer timing information 254, the answer acquisition module 230 determines whether to issue an IEI request 244 and/or a collections request 132 based on one or more of the content requirements information 248, the source requirements information 250, and the answer timing information 254. For example, the answer acquisition module 230 selects the IEI request 244 when an immediate answer to a simple query request 136 is required and is expected to have a favorable quality level. As another example, the answer acquisition module 230 selects the collections request 132 when a longer-term answer is required as indicated by the answer timing information to before and/or when the query request 136 has an unfavorable quality level.

When issuing the IEI request 244, the answer acquisition module 230 generates the IEI request 244 in accordance with security information 252 received from the content security module 236 and based on one or more of the content requirements information 248, the source requirements information 250, and the answer timing information 254. Having generated the IEI request 244, the answer acquisition module 230 sends the IEI request 244 to at least one IEI module.

When issuing the collections request 132, the answer acquisition module 230 generates the collections request 132 in accordance with the security information 252 received from the content security module 236 and based on one or more of the content requirements information 248, the source requirements information 250, and the answer timing information 254. Having generated the collections request 132, the answer acquisition module 230 sends the collections request 132 to at least one collections module. Alternatively, the answer acquisition module 230 facilitate sending of the collections request 132 to one or more various user devices (e.g., to access a subject matter expert).

The answer acquisition module 230 determines a quality level of a received answer extracted from a collections response 134 and/or an IEI response 246. For example, the answer acquisition module 230 extracts the quality level of the received answer from answer quality information 258 received from the answer quality module 242 in response to an answer quality request from the answer acquisition module 230. When the quality level is unfavorable, the answer acquisition module 230 facilitates obtaining a further answer. The facilitation includes issuing at least one of a further IEI request 244 and a further collections request 132 to generate a further answer for further quality testing. When the quality level is favorable, the answer acquisition module 230 issues a query response 140 to the requester. The issuing includes generating the query response 140 based on answer transformation information 256 received from the answer transformation module 240, where the answer transformation module 240 generates the answer transformation information 256 to include a transformed answer based on receiving the answer from the answer acquisition module 230. The answer transformation information 250 6A further include the question, a desired format of the answer, available formats, recommended formatting, received IEI responses, transformation instructions, and transformed IEI responses into an answer.

Figure 5D:
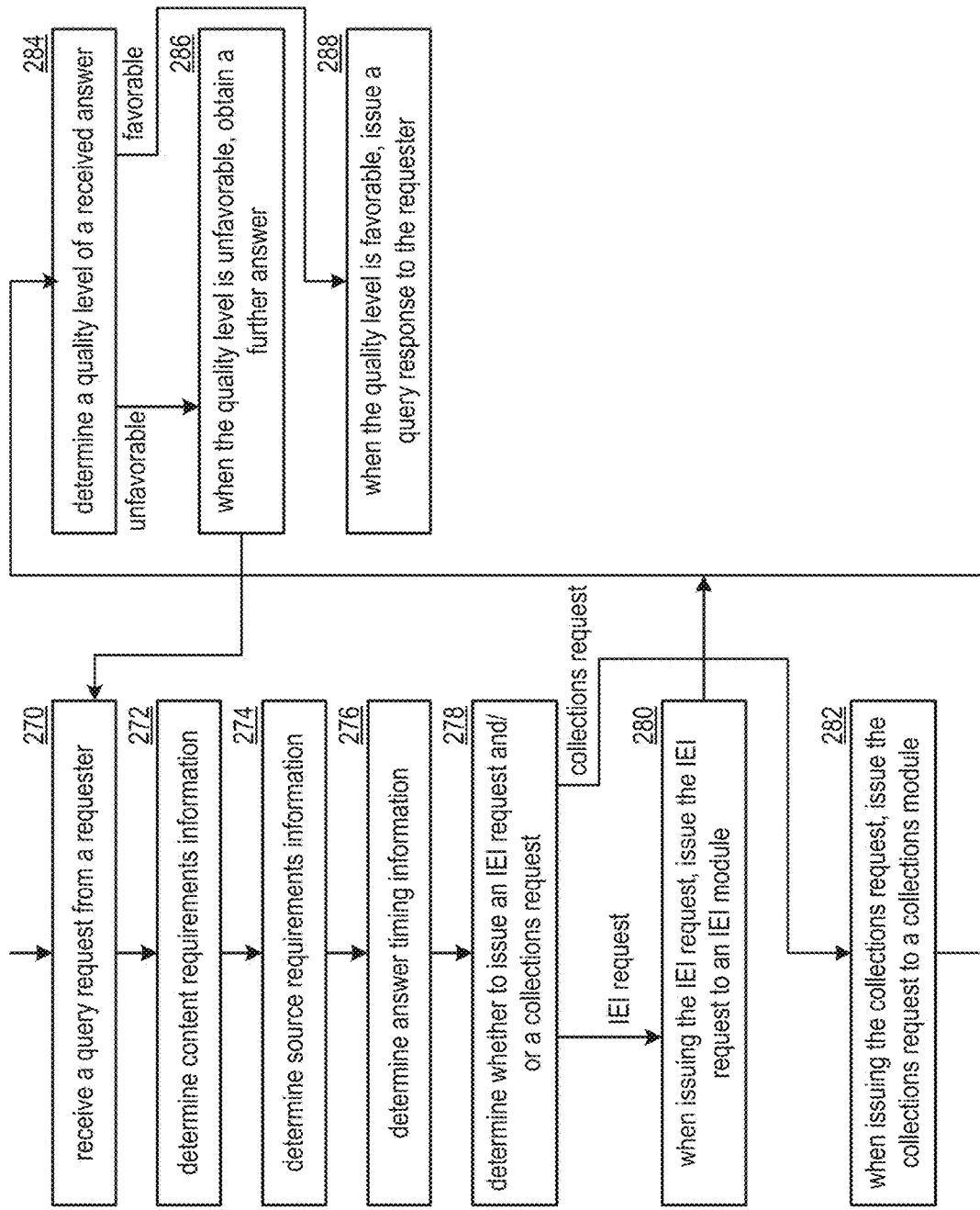
FIG. 5D is a logic diagram of an embodiment of a method for providing a response to a query within a computing system in accordance with the present invention.

FIG. 5D is a logic diagram of an embodiment of a method for providing a response to a query within a computing system. In particular, a method is presented for use in conjunction with one or more functions and features described in conjunction with FIGS. 1-3, 4A-4C, 5C, and also FIG. 5D. The method includes step 270 where a processing module of one or more processing modules of one or more computing devices of the computing system receives a query request (e.g., a question) from a requester. The method continues at step 272 where the processing module determines content requirements information. The determining includes interpreting the query request to produce the content requirements. The method continues at step 274 where the processing module determines source requirements information. The determining includes interpreting the query request to produce the source requirements. The method continues at step 276 where the processing module determines answer timing information. The determining includes interpreting the query request to produce the answer timing information.

The method continues at step 278 the processing module determines whether to issue an IEI request and/or a collections request. For example, the determining includes selecting the IEI request when the answer timing information indicates that a simple one-time answer is appropriate. As another example, the processing module selects the collections request when the answer timing information indicates that the answer is associated with a series of events over an event time frame.

When issuing the IEI request, the method continues at step 280 where the processing module issues the IEI request to an IEI module. The issuing includes generating the IEI request in accordance with security information and based on one or more of the content requirements information, the source requirements information, and the answer timing information.

When issuing the collections request, the method continues at step 282 where the processing module issues the collections request to a collections module. The issuing includes generating the collections request in accordance with the security information and based on one or more of the content requirements information, the source requirements information, and the answer timing information. Alternatively, the processing module issues both the IEI request and the collections request when a satisfactory partial answer may be provided based on a corresponding IEI response and a further more generalized and specific answer may be provided based on a corresponding collections response and associated further IEI response.

The method continues at step 284 where the processing module determines a quality level of a received answer. The determining includes extracting the answer from the collections response and/or the IEI response and interpreting the answer in accordance with one or more of the content requirements information, the source requirements information, the answer timing information, and the query request to produce the quality level. The method branches to step 288 when the quality level is favorable and the method continues to step 286 when the quality level is unfavorable. For example, the processing module indicates that the quality level is favorable when the quality level is equal to or greater than a minimum answer quality threshold level. As another example, the processing module indicates that the quality level is unfavorable when the quality level is less than the minimum answer quality threshold level.

When the quality level is unfavorable, the method continues at step 286 where the processing module obtains a further answer. The obtaining includes at least one of issuing a further IEI request and a further collections request to facilitate obtaining of a further answer for further answer quality level testing as the method loops back to step 270. When the quality level is favorable, the method continues at step 288 where the processing module issues a query response to the requester. The issuing includes transforming the answer into a transformed answer in accordance with an answer transformation approach (e.g., formatting, further interpretations of the virtual question in light of the answer and further knowledge) and sending the transformed answer to the requester as the query response.

The method described above in conjunction with the processing module can alternatively be performed by other modules of the computing system 10 of FIG. 1 or by other devices. In addition, at least one memory section (e.g., a computer readable memory, a non-transitory computer readable storage medium, a non-transitory computer readable memory organized into a first memory element, a second memory element, a third memory element, a fourth element section, a fifth memory element etc.) that stores operational instructions can, when executed by one or more processing modules of one or more computing devices (e.g., one or more servers, one or more user devices) of the computing system 10, cause the one or more computing devices to perform any or all of the method steps described above.

Figure 5E:
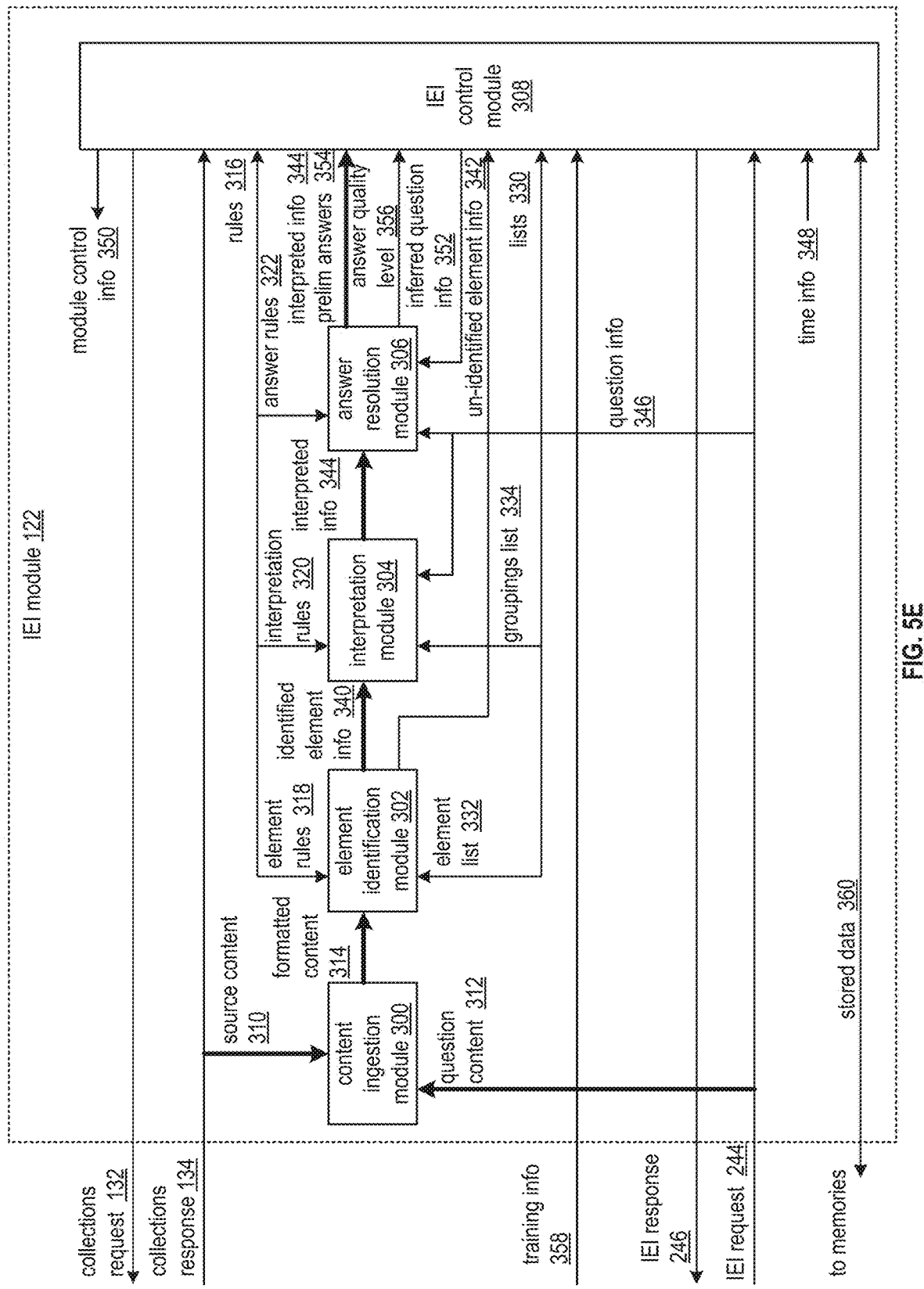
FIG. 5E is a schematic block diagram of an embodiment of an identigen entigen intelligence (IEI) module of a computing system in accordance with the present invention.

FIG. 5E is a schematic block diagram of an embodiment of the identigen entigen intelligence (IEI) module 122 of FIG. 4A that includes a content ingestion module 300, an element identification module 302, and interpretation module 304, and answer resolution module 306, and an IEI control module 308. Generally, an embodiment of this invention presents solutions where the IEI module 122 supports interpreting content to produce knowledge that may be utilized to answer questions.

In an example of operation of the producing and utilizing of the knowledge, the content ingestion module 300 generates formatted content 314 based on question content 312 and/or source content 310, where the IEI module 122 receives an IEI request 244 that includes the question content 312 and the IEI module 122 receives a collections response 134 that includes the source content 310. The source content 310 includes content from a source extracted from the collections response 134. The question content 312 includes content extracted from the IEI request 244 (e.g., content paired with a question). The content ingestion module 300 generates the formatted content 314 in accordance with a formatting approach (e.g., creating proper sentences from words of the content). The formatted content 314 includes modified content that is compatible with subsequent element identification (e.g., complete sentences, combinations of words and interpreted sounds and/or inflection cues with temporal associations of words).

The element identification module 302 processes the formatted content 314 based on element rules 318 and an element list 332 to produce identified element information 340. Rules 316 includes the element rules 318 (e.g., match, partial match, language translation, etc.). Lists 330 includes the element list 332 (e.g., element ID, element context ID, element usage ID, words, characters, symbols etc.). The IEI control module 308 may provide the rules 316 and the lists 330 by accessing stored data 360 from a memory associated with the IEI module 122. Generally, an embodiment of this invention presents solutions where the stored data 360 may further include one or more of a descriptive dictionary, categories, representations of element sets, element list, sequence data, pending questions, pending request, recognized elements, unrecognized elements, errors, etc.

The identified element information 340 includes one or more of identifiers of elements identified in the formatted content 314, may include ordering and/or sequencing and grouping information. For example, the element identification module 302 compares elements of the formatted content 314 to known elements of the element list 332 to produce identifiers of the known elements as the identified element information 340 in accordance with the element rules 318. Alternatively, the element identification module 302 outputs un-identified element information 342 to the IEI control module 308, where the un-identified element information 342 includes temporary identifiers for elements not identifiable from the formatted content 314 when compared to the element list 332.

The interpretation module 304 processes the identified element information 340 in accordance with interpretation rules 320 (e.g., potentially valid permutations of various combinations of identified elements), question information 346 (e.g., a question extracted from the IEI request 244 which may be paired with content associated with the question), and a groupings list 334 (e.g., representations of associated groups of representations of things, a set of element identifiers, valid element usage IDs in accordance with similar, an element context, permutations of sets of identifiers for possible interpretations of a sentence or other) to produce interpreted information 344. The interpreted information 344 includes potentially valid interpretations of combinations of identified elements. Generally, an embodiment of this invention presents solutions where the interpretation module 304 supports producing the interpreted information 344 by considering permutations of the identified element information 340 in accordance with the interpretation rules 320 and the groupings list 334.

The answer resolution module 306 processes the interpreted information 344 based on answer rules 322 (e.g., guidance to extract a desired answer), the question information 346, and inferred question information 352 (e.g., posed by the IEI control module or analysis of general collections of content or refinement of a stated question from a request) to produce preliminary answers 354 and an answer quality level 356. The answer generally lies in the interpreted information 344 as both new content received and knowledge based on groupings list 334 generated based on previously received content. The preliminary answers 354 includes an answer to a stated or inferred question that subject further refinement. The answer quality level 356 includes a determination of a quality level of the preliminary answers 354 based on the answer rules 322. The inferred question information 352 may further be associated with time information 348, where the time information includes one or more of current real-time, a time reference associated with entity submitting a request, and a time reference of a collections response.

When the IEI control module 308 determines that the answer quality level 356 is below an answer quality threshold level, the IEI control module 308 facilitates collecting of further content (e.g., by issuing a collections request 132 and receiving corresponding collections responses 134 for analysis). When the answer quality level 356 compares favorably to the answer quality threshold level, the IEI control module 308 issues an IEI response 246 based on the preliminary answers 354. When receiving training information 358, the IEI control module 308 facilitates updating of one or more of the lists 330 and the rules 316 and stores the updated list 330 and the updated rules 316 in the memories as updated stored data 360.

Figure 5F:
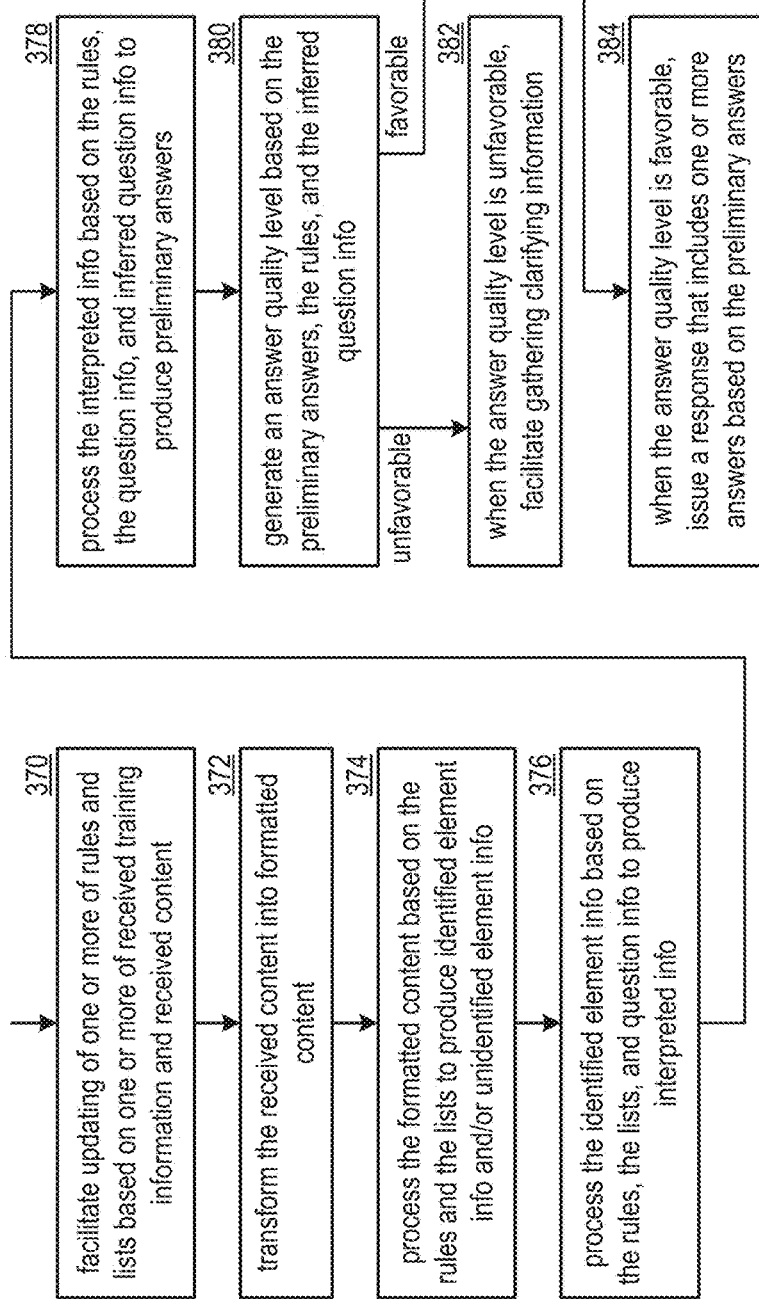
FIG. 5F is a logic diagram of an embodiment of a method for analyzing content within a computing system in accordance with the present invention.

FIG. 5F is a logic diagram of an embodiment of a method for analyzing content within a computing system. In particular, a method is presented for use in conjunction with one or more functions and features described in conjunction with FIGS. 1-3, 4A-4C, 5E, and also FIG. 5F. The method includes step 370 where a processing module of one or more processing modules of one or more computing devices of the computing system facilitates updating of one or more rules and lists based on one or more of received training information and received content. For example, the processing module updates rules with received rules to produce updated rules and updates element lists with received elements to produce updated element lists. As another example, the processing module interprets the received content to identify a new word for at least temporary inclusion in the updated element list.

The method continues at step 372 where the processing module transforms at least some of the received content into formatted content. For example, the processing module processes the received content in accordance with a transformation approach to produce the formatted content, where the formatted content supports compatibility with subsequent element identification (e.g., typical sentence structures of groups of words).

The method continues at step 374 where the processing module processes the formatted content based on the rules and the lists to produce identified element information and/or an identified element information. For example, the processing module compares the formatted content to element lists to identify a match producing identifiers for identified elements or new identifiers for unidentified elements when there is no match.

The method continues at step 376 with a processing module processes the identified element information based on rules, the lists, and question information to produce interpreted information. For example, the processing module compares the identified element information to associated groups of representations of things to generate potentially valid interpretations of combinations of identified elements.

The method continues at step 378 where the processing module processes the interpreted information based on the rules, the question information, and inferred question information to produce preliminary answers. For example, the processing module matches the interpreted information to one or more answers (e.g., embedded knowledge based on a fact base built from previously received content) with highest correctness likelihood levels that is subject to further refinement.

The method continues at step 380 where the processing module generates an answer quality level based on the preliminary answers, the rules, and the inferred question information. For example, the processing module predicts the answer correctness likelihood level based on the rules, the inferred question information, and the question information. The method branches to step 384 when the answer quality level is favorable and the method continues to step 382 when the answer quality level is unfavorable. For example, the generating of the answer quality level further includes the processing module indicating that the answer quality level is favorable when the answer quality level is greater than or equal to a minimum answer quality threshold level. As another example, the generating of the answer quality level further includes the processing module indicating that the answer quality level is unfavorable when the answer quality level is less than the minimum answer quality threshold level.

When the answer quality level is unfavorable, the method continues at step 382 where the processing module facilitates gathering clarifying information. For example, the processing module issues a collections request to facilitate receiving further content and or request question clarification from a question requester. When the answer quality level is favorable, the method continues at step 384 where the processing module issues a response that includes one or more answers based on the preliminary answers and/or further updated preliminary answers based on gathering further content. For example, the processing module generates a response that includes one or more answers and the answer quality level and issues the response to the requester.

The method described above in conjunction with the processing module can alternatively be performed by other modules of the computing system 10 of FIG. 1 or by other devices. In addition, at least one memory section (e.g., a computer readable memory, a non-transitory computer readable storage medium, a non-transitory computer readable memory organized into a first memory element, a second memory element, a third memory element, a fourth element section, a fifth memory element etc.) that stores operational instructions can, when executed by one or more processing modules of one or more computing devices (e.g., one or more servers, one or more user devices) of the computing system 10, cause the one or more computing devices to perform any or all of the method steps described above.

Figure 6A:
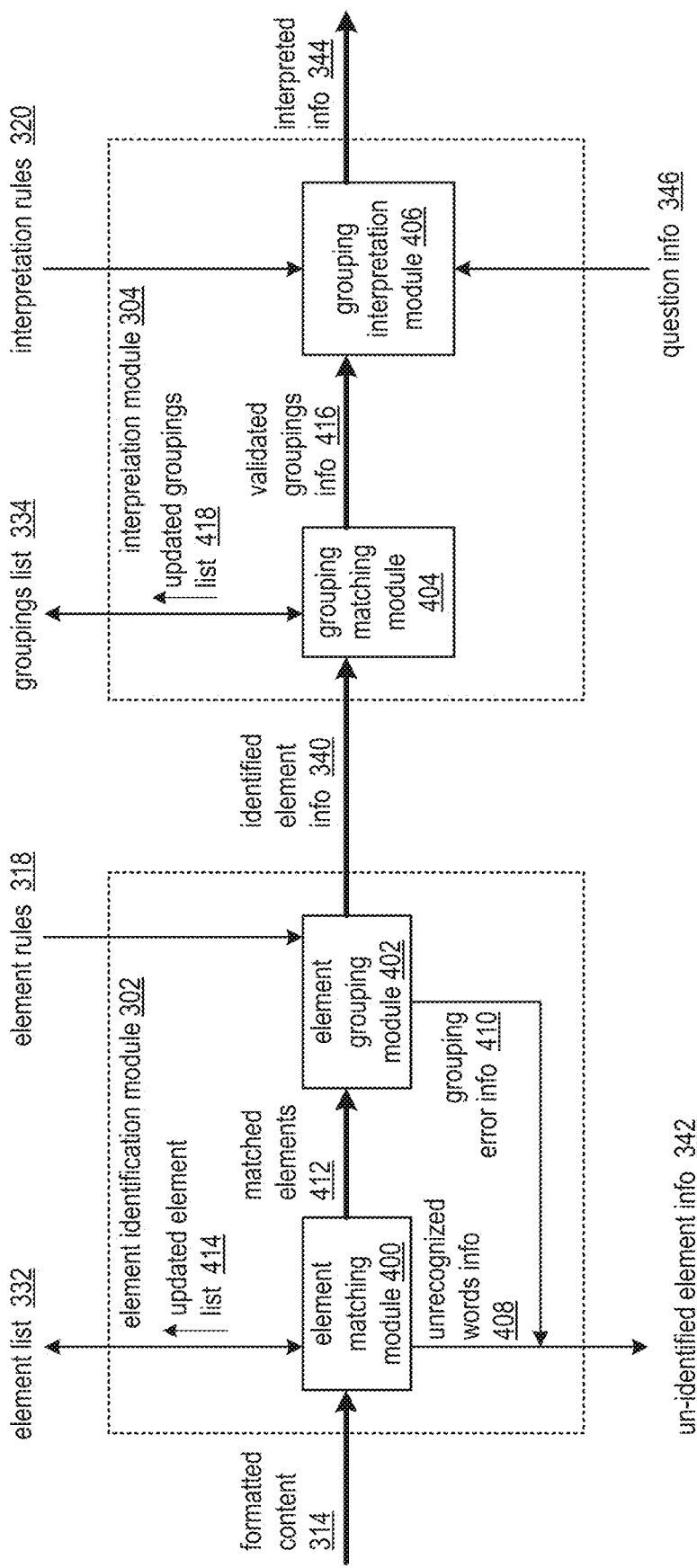
FIG. 6A is a schematic block diagram of an embodiment of an element identification module and an interpretation module of a computing system in accordance with the present invention.

FIG. 6A is a schematic block diagram of an embodiment of the element identification module 302 of FIG. 5A and the interpretation module 304 of FIG. 5A. The element identification module 302 includes an element matching module 400 and an element grouping module 402. The interpretation module 304 includes a grouping matching module 404 and a grouping interpretation module 406. Generally, an embodiment of this invention presents solutions where the element identification module 302 supports identifying potentially valid permutations of groupings of elements while the interpretation module 304 interprets the potentially valid permutations of groupings of elements to produce interpreted information that includes the most likely of groupings based on a question.

In an example of operation of the identifying of the potentially valid permutations of groupings of elements, when matching elements of the formatted content 314, the element matching module 400 generates matched elements 412 (e.g., identifiers of elements contained in the formatted content 314) based on the element list 332. For example, the element matching module 400 matches a received element to an element of the element list 332 and outputs the matched elements 412 to include an identifier of the matched element. When finding elements that are unidentified, the element matching module 400 outputs un-recognized words information 408 (e.g., words not in the element list 332, may temporarily add) as part of un-identified element information 342. For example, the element matching module 400 indicates that a match cannot be made between a received element of the formatted content 314, generates the unrecognized words info 408 to include the received element and/or a temporary identifier, and issues and updated element list 414 that includes the temporary identifier and the corresponding unidentified received element.

The element grouping module 402 analyzes the matched elements 412 in accordance with element rules 318 to produce grouping error information 410 (e.g., incorrect sentence structure indicators) when a structural error is detected. The element grouping module 402 produces identified element information 340 when favorable structure is associated with the matched elements in accordance with the element rules 318. The identified element information 340 may further include grouping information of the plurality of permutations of groups of elements (e.g., several possible interpretations), where the grouping information includes one or more groups of words forming an associated set and/or super-group set of two or more subsets when subsets share a common core element.

In an example of operation of the interpreting of the potentially valid permutations of groupings of elements to produce the interpreted information, the grouping matching module 404 analyzes the identified element information 340 in accordance with a groupings list 334 to produce validated groupings information 416. For example, the grouping matching module 404 compares a grouping aspect of the identified element information 340 (e.g., for each permutation of groups of elements of possible interpretations), generates the validated groupings information 416 to include identification of valid permutations aligned with the groupings list 334. Alternatively, or in addition to, the grouping matching module 404 generates an updated groupings list 418 when determining a new valid grouping (e.g., has favorable structure and interpreted meaning) that is to be added to the groupings list 334.

The grouping interpretation module 406 interprets the validated groupings information 416 based on the question information 346 and in accordance with the interpretation rules 320 to produce interpreted information 344 (e.g., most likely interpretations, next most likely interpretations, etc.). For example, the grouping interpretation module 406 obtains context, obtains favorable historical interpretations, processes the validated groupings based on interpretation rules 320, where each interpretation is associated with a correctness likelihood level.

Figure 6B:
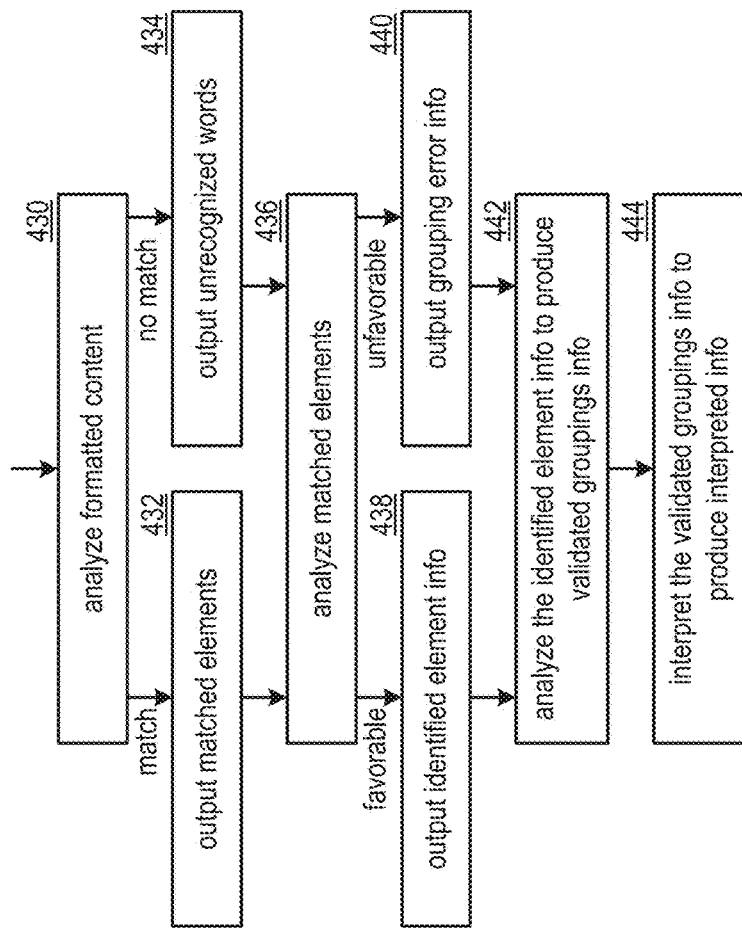
FIG. 6B is a logic diagram of an embodiment of a method for interpreting information within a computing system in accordance with the present invention.

FIG. 6B is a logic diagram of an embodiment of a method for interpreting information within a computing system. In particular, a method is presented for use in conjunction with one or more functions and features described in conjunction with FIGS. 1-3, 4A-4C, 5E-5F, 6A, and also FIG. 6B. The method includes step 430 where a processing module of one or more processing modules of one or more computing devices of the computing system analyzes formatted content. For example, the processing module attempt to match a received element of the formatted content to one or more elements of an elements list. When there is no match, the method branches to step 434 and when there is a match, the method continues to step 432. When there is a match, the method continues at step 432 where the processing module outputs matched elements (e.g., to include the matched element and/or an identifier of the matched element). When there is no match, the method continues at step 434 where the processing module outputs unrecognized words (e.g., elements and/or a temporary identifier for the unmatched element).

The method continues at step 436 where the processing module analyzes matched elements. For example, the processing module attempt to match a detected structure of the matched elements (e.g., chained elements as in a received sequence) to favorable structures in accordance with element rules. The method branches to step 440 when the analysis is unfavorable and the method continues to step 438 when the analysis is favorable. When the analysis is favorable matching a detected structure to the favorable structure of the element rules, the method continues at step 438 where the processing module outputs identified element information (e.g., an identifier of the favorable structure, identifiers of each of the detected elements). When the analysis is unfavorable matching a detected structure to the favorable structure of the element rules, the method continues at step 440 where the processing module outputs grouping error information (e.g., a representation of the incorrect structure, identifiers of the elements of the incorrect structure, a temporary new identifier of the incorrect structure).

The method continues at step 442 where the processing module analyzes the identified element information to produce validated groupings information. For example, the processing module compares a grouping aspect of the identified element information and generates the validated groupings information to include identification of valid permutations that align with the groupings list. Alternatively, or in addition to, the processing module generates an updated groupings list when determining a new valid grouping.

The method continues at step 444 where the processing module interprets the validated groupings information to produce interpreted information. For example, the processing module obtains one or more of context and historical interpretations and processes the validated groupings based on interpretation rules to generate the interpreted information, where each interpretation is associated with a correctness likelihood level (e.g., a quality level).

The method described above in conjunction with the processing module can alternatively be performed by other modules of the computing system 10 of FIG. 1 or by other devices. In addition, at least one memory section (e.g., a computer readable memory, a non-transitory computer readable storage medium, a non-transitory computer readable memory organized into a first memory element, a second memory element, a third memory element, a fourth element section, a fifth memory element etc.) that stores operational instructions can, when executed by one or more processing modules of one or more computing devices (e.g., one or more servers, one or more user devices) of the computing system 10, cause the one or more computing devices to perform any or all of the method steps described above.

Figure 6C:
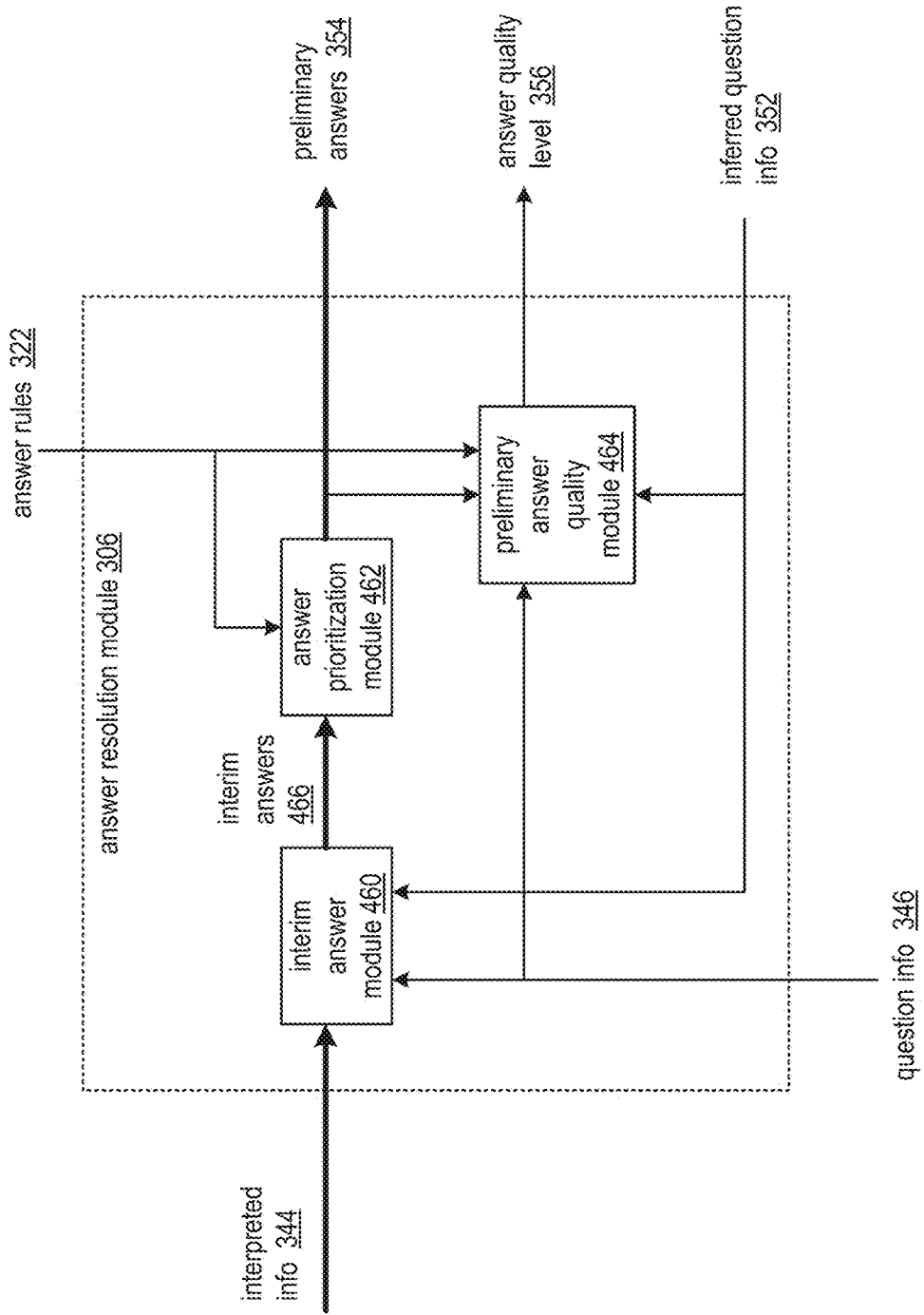
FIG. 6C is a schematic block diagram of an embodiment of an answer resolution module of a computing system in accordance with the present invention.

FIG. 6C is a schematic block diagram of an embodiment of the answer resolution module 306 of FIG. 5A that includes an interim answer module 460, and answer prioritization module 462, and a preliminary answer quality module 464. Generally, an embodiment of this invention presents solutions where the answer resolution module 306 supports producing an answer for interpreted information 344.

In an example of operation of the providing of the answer, the interim answer module 460 analyzes the interpreted information 344 based on question information 346 and inferred question information 352 to produce interim answers 466 (e.g., answers to stated and/or inferred questions without regard to rules that is subject to further refinement). The answer prioritization module 462 analyzes the interim answers 466 based on answer rules 322 to produce preliminary answer 354. For example, the answer prioritization module 462 identifies all possible answers from the interim answers 466 that conform to the answer rules 322.

The preliminary answer quality module 464 analyzes the preliminary answers 354 in accordance with the question information 346, the inferred question information 352, and the answer rules 322 to produce an answer quality level 356. For example, for each of the preliminary answers 354, the preliminary answer quality module 464 may compare a fit of the preliminary answer 354 to a corresponding previous answer and question quality level, calculate the answer quality level 356 based on a level of conformance to the answer rules 322, calculate the answer quality level 356 based on alignment with the inferred question information 352, and determine the answer quality level 356 based on an interpreted correlation with the question information 346.

Figure 6D:
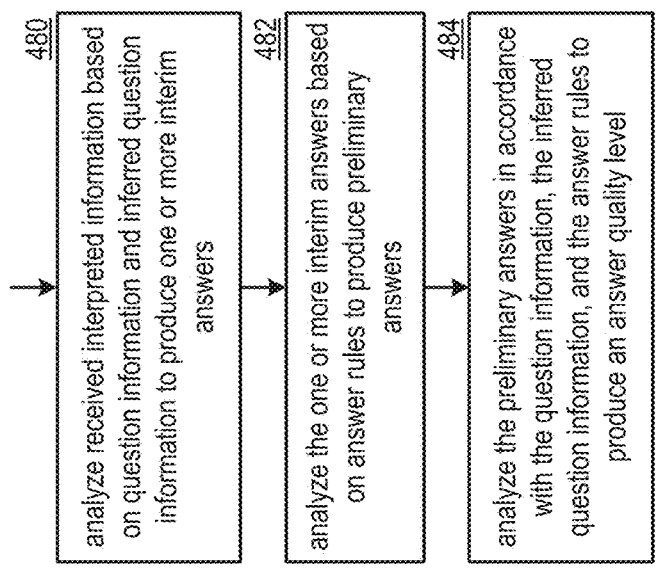
FIG. 6D is a logic diagram of an embodiment of a method for producing an answer within a computing system in accordance with the present invention.

FIG. 6D is a logic diagram of an embodiment of a method for producing an answer within a computing system. In particular, a method is presented for use in conjunction with one or more functions and features described in conjunction with FIGS. 1-3, 4A-4C, 5E-5F, 6C, and also FIG. 6D. The method includes step 480 where a processing module of one or more processing modules of one or more computing devices of the computing system analyzes received interpreted information based on question information and inferred question information to produce one or more interim answers. For example, the processing module generates potential answers based on patterns consistent with previously produced knowledge and likelihood of correctness.

The method continues at step 482 where the processing module analyzes the one or more interim answers based on answer rules to produce preliminary answers. For example, the processing module identifies all possible answers from the interim answers that conform to the answer rules. The method continues at step 484 where the processing module analyzes the preliminary answers in accordance with the question information, the inferred question information, and the answer rules to produce an answer quality level. For example, for each of the elementary answers, the processing module may compare a fit of the preliminary answer to a corresponding previous answer-and-answer quality level, calculate the answer quality level based on performance to the answer rules, calculate answer quality level based on alignment with the inferred question information, and determine the answer quality level based on interpreted correlation with the question information.

The method described above in conjunction with the processing module can alternatively be performed by other modules of the computing system 10 of FIG. 1 or by other devices. In addition, at least one memory section (e.g., a computer readable memory, a non-transitory computer readable storage medium, a non-transitory computer readable memory organized into a first memory element, a second memory element, a third memory element, a fourth element section, a fifth memory element etc.) that stores operational instructions can, when executed by one or more processing modules of one or more computing devices (e.g., one or more servers, one or more user devices) of the computing system 10, cause the one or more computing devices to perform any or all of the method steps described above.

Figure 7A:
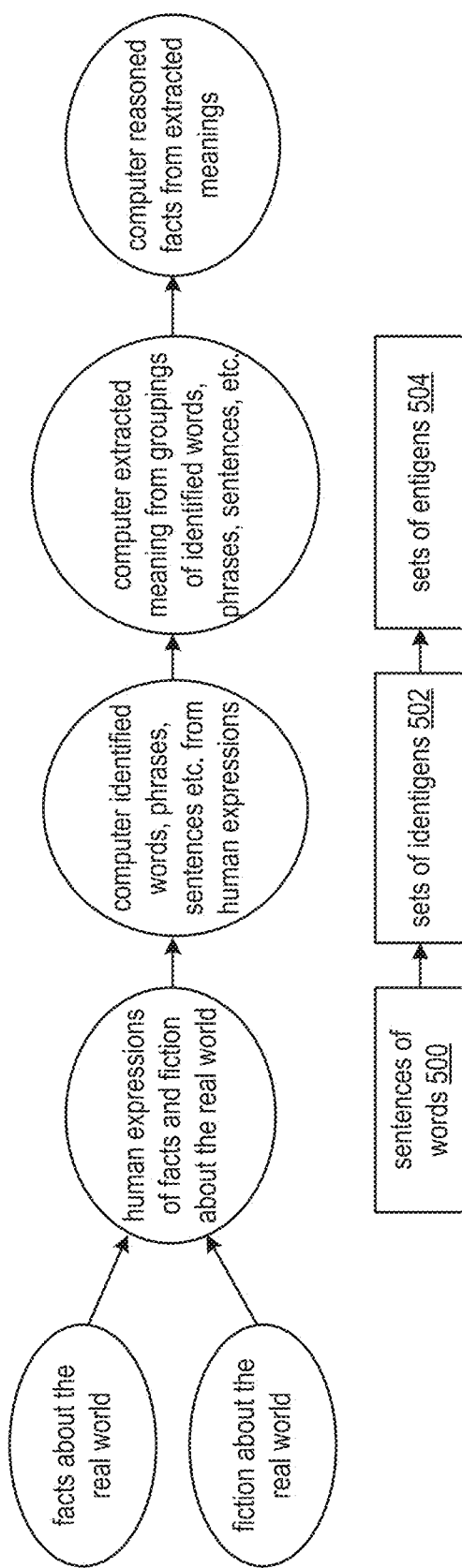
FIG. 7A is an information flow diagram for interpreting information within a computing system in accordance with the present invention.

FIG. 7A is an information flow diagram for interpreting information within a computing system, where sets of entigens 504 are interpreted from sets of identigens 502 which are interpreted from sentences of words 500. Such identigen entigen intelligence (IEI) processing of the words (e.g., to IEI process) includes producing one or more of interim knowledge, a preliminary answer, and an answer quality level. For example, the IEI processing includes identifying permutations of identigens of a phrase of a sentence (e.g., interpreting human expressions to produce identigen groupings for each word of ingested content), reducing the permutations of identigens (e.g., utilizing rules to eliminate unfavorable permutations), mapping the reduced permutations of identigens to at least one set of entigens (e.g., most likely identigens become the entigens) to produce the interim knowledge, processing the knowledge in accordance with a knowledge database (e.g., comparing the set of entigens to the knowledge database) to produce a preliminary answer, and generating the answer quality level based on the preliminary answer for a corresponding domain.

Human expressions are utilized to portray facts and fiction about the real world. The real-world includes items, actions, and attributes. The human expressions include textual words, textual symbols, images, and other sensorial information (e.g., sounds). It is known that many words, within a given language, can mean different things based on groupings and orderings of the words. For example, the sentences of words 500 can include many different forms of sentences that mean vastly different things even when the words are very similar.

The present invention presents solutions where the computing system 10 supports producing a computer-based representation of a truest meaning possible of the human expressions given the way that multitudes of human expressions relate to these meanings. As a first step of the flow diagram to transition from human representations of things to a most precise computer representation of the things, the computer identifies the words, phrases, sentences, etc. from the human expressions to produce the sets of identigens 502. Each identigen includes an identifier of their meaning and an identifier of an instance for each possible language, culture, etc. For example, the words car and automobile share a common meaning identifier but have different instance identifiers since they are different words and are spelled differently. As another example, the word duck is associated both with a bird and an action to elude even though they are spelled the same. In this example the bird duck has a different meaning than the elude duck and as such each has a different meaning identifier of the corresponding identigens.

As a second step of the flow diagram to transition from human representations of things to the most precise computer representation of the things, the computer extracts meaning from groupings of the identified words, phrases, sentences, etc. to produce the sets of entigens 504. Each entigen includes an identifier of a single conceivable and perceivable thing in space and time (e.g., independent of language and other aspects of the human expressions). For example, the words car and automobile are different instances of the same meaning and point to a common shared entigen. As another example, the word duck for the bird meaning has an associated unique entigen that is different than the entigen for the word duck for the elude meaning.

As a third step of the flow diagram to transition from human expressions of things to the most precise computer representation of the things, the computer reasons facts from the extracted meanings. For example, the computer maintains a fact-based of the valid meanings from the valid groupings or sets of entigens so as to support subsequent inferences, deductions, rationalizations of posed questions to produce answers that are aligned with a most factual view. As time goes on, and as an entigen has been identified, it can encounter an experience transformations in time, space, attributes, actions, and words which are used to identify it without creating contradictions or ever losing its identity.

Figure 7B:
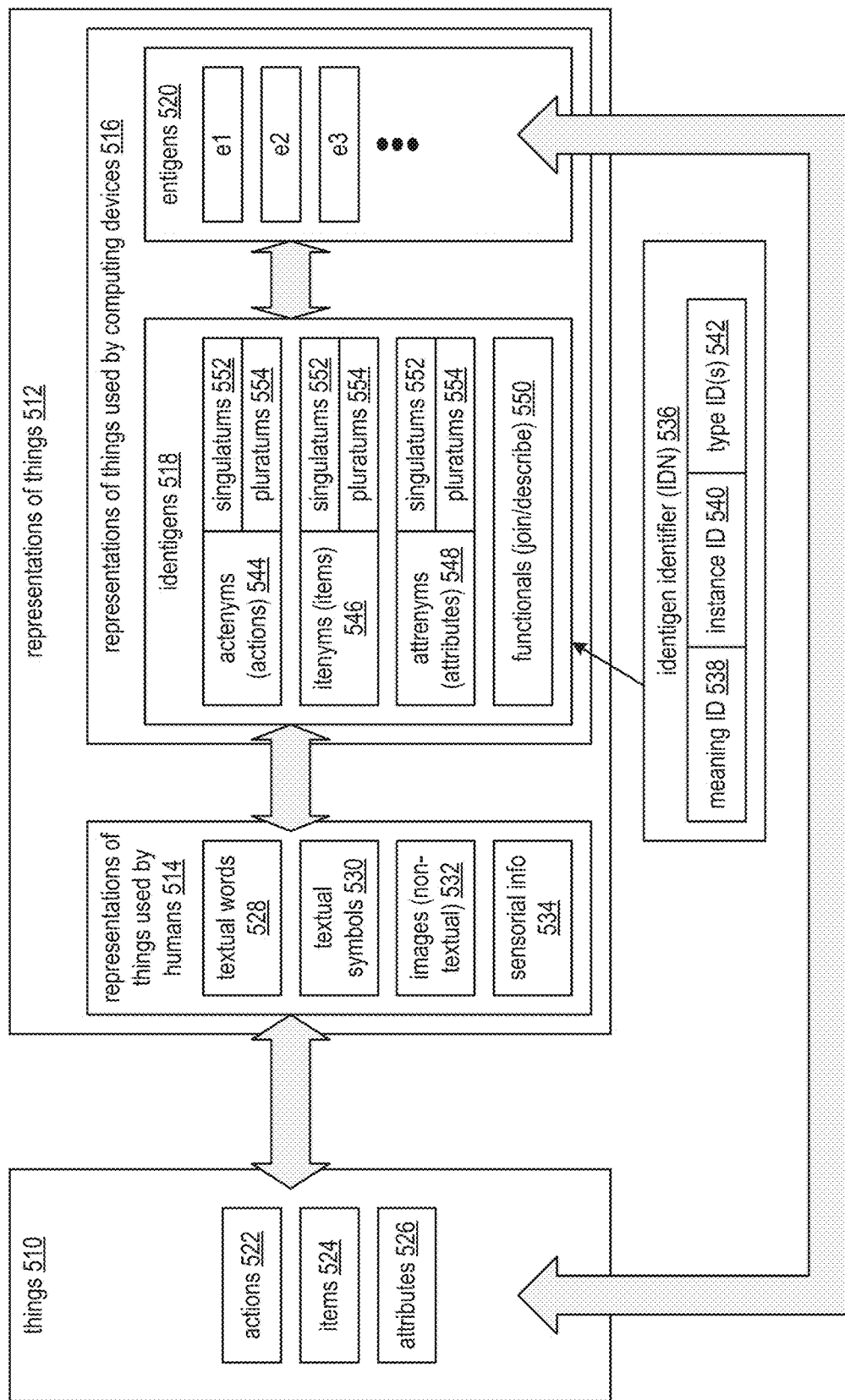
FIG. 7B is a relationship block diagram illustrating an embodiment of relationships between things and representations of things within a computing system in accordance with the present invention.

FIG. 7B is a relationship block diagram illustrating an embodiment of relationships between things 510 and representations of things 512 within a computing system. The things 510 includes conceivable and perceivable things including actions 522, items 524, and attributes 526. The representation of things 512 includes representations of things used by humans 514 and representation of things used by of computing devices 516 of embodiments of the present invention. The things 510 relates to the representations of things used by humans 514 where the invention presents solutions where the computing system 10 supports mapping the representations of things used by humans 514 to the representations of things used by computing devices 516, where the representations of things used by computing devices 516 map back to the things 510.

The representations of things used by humans 514 includes textual words 528, textual symbols 530, images (e.g., non-textual) 532, and other sensorial information 534 (e.g., sounds, sensor data, electrical fields, voice inflections, emotion representations, facial expressions, whistles, etc.). The representations of things used by computing devices 516 includes identigens 518 and entigens 520. The representations of things used by humans 514 maps to the identigens 518 and the identigens 518 map to the entigens 520. The entigens 520 uniquely maps back to the things 510 in space and time, a truest meaning the computer is looking for to create knowledge and answer questions based on the knowledge.

To accommodate the mapping of the representations of things used by humans 514 to the identigens 518, the identigens 518 is partitioned into actenyms 544 (e.g., actions), itenyms 546 (e.g., items), attrenyms 548 (e.g., attributes), and functionals 550 (e.g., that join and/or describe). Each of the actenyms 544, itenyms 546, and attrenyms 548 may be further classified into singulatums 552 (e.g., identify one unique entigen) and pluratums 554 (e.g., identify a plurality of entigens that have similarities).

Each identigen 518 is associated with an identigens identifier (IDN) 536. The IDN 536 includes a meaning identifier (ID) 538 portion, an instance ID 540 portion, and a type ID 542 portion. The meaning ID 538 includes an identifier of common meaning. The instance ID 540 includes an identifier of a particular word and language. The type ID 542 includes one or more identifiers for actenyms, itenyms, attrenyms, singulatums, pluratums, a time reference, and any other reference to describe the IDN 536. The mapping of the representations of things used by humans 514 to the identigens 518 by the computing system of the present invention includes determining the identigens 518 in accordance with logic and instructions for forming groupings of words.

Generally, an embodiment of this invention presents solutions where the identigens 518 map to the entigens 520. Multiple identigens may map to a common unique entigen. The mapping of the identigens 518 to the entigens 520 by the computing system of the present invention includes determining entigens in accordance with logic and instructions for forming groupings of identigens.

FIG. 7C is a diagram of an embodiment of a synonym words table 570 within a computing system, where the synonym words table 570 includes multiple fields including textual words 572, identigens 518, and entigens 520. The identigens 518 includes fields for the meaning identifier (ID) 538 and the instance ID 540. The computing system of the present invention may utilize the synonym words table 570 to map textual words 572 to identigens 518 and map the identigens 518 to entigens 520. For example, the words car, automobile, auto, bil (Swedish), carro (Spanish), and bil (Danish) all share a common meaning but are different instances (e.g., different words and languages). The words map to a common meaning ID but to individual unique instant identifiers. Each of the different identigens map to a common entigen since they describe the same thing.

FIG. 7D is a diagram of an embodiment of a polysemous words table 576 within a computing system, where the polysemous words table 576 includes multiple fields including textual words 572, identigens 518, and entigens 520. The identigens 518 includes fields for the meaning identifier (ID) 538 and the instance ID 540. The computing system of the present invention may utilize the polysemous words table 576 to map textual words 572 to identigens 518 and map the identigens 518 to entigens 520. For example, the word duck maps to four different identigens since the word duck has four associated different meanings (e.g., bird, fabric, to submerge, to elude) and instances. Each of the identigens represent different things and hence map to four different entigens.

FIG. 7E is a diagram of an embodiment of transforming words into groupings within a computing system that includes a words table 580, a groupings of words section to validate permutations of groupings, and a groupings table 584 to capture the valid groupings. The words table 580 includes multiple fields including textual words 572, identigens 518, and entigens 520. The identigens 518 includes fields for the meaning identifier (ID) 538, the instance ID 540, and the type ID 542. The computing system of the present invention may utilize the words table 580 to map textual words 572 to identigens 518 and map the identigens 518 to entigens 520. For example, the word pilot may refer to a flyer and the action to fly. Each meaning has a different identigen and different entigen.

The computing system the present invention may apply rules to the fields of the words table 580 to validate various groupings of words. Those that are invalid are denoted with a "X" while those that are valid are associated with a check mark. For example, the grouping "pilot Tom" is invalid when the word pilot refers to flying and Tom refers to a person. The identigen combinations for the flying pilot and the person Tom are denoted as invalid by the rules. As another example, the grouping "pilot Tom" is valid when the word pilot refers to a flyer and Tom refers to the person. The identigen combinations for the flyer pilot and the person Tom are denoted as valid by the rules.

The groupings table 584 includes multiple fields including grouping ID 586, word strings 588, identigens 518, and entigens 520. The computing system of the present invention may produce the groupings table 584 as a stored fact base for valid and/or invalid groupings of words identified by their corresponding identigens. For example, the valid grouping "pilot Tom" referring to flyer Tom the person is represented with a grouping identifier of 3001 and identity and identifiers 150.001 and 457.001. The entigen field 520 may indicate associated entigens that correspond to the identigens. For example, entigen e717 corresponds to the flyer pilot meaning and entigen e61 corresponds to the time person meaning. Alternatively, or in addition to, the entigen field 520 may be populated with a single entigen identifier (ENI).

The word strings field 588 may include any number of words in a string. Different ordering of the same words can produce multiple different strings and even different meanings and hence entigens. More broadly, each entry (e.g., role) of the groupings table 584 may refer to groupings of words, two or more word strings, an idiom, just identigens, just entigens, and/or any combination of the preceding elements. Each entry has a unique grouping identifier. An idiom may have a unique grouping ID and include identifiers of original word identigens and replacing identigens associated with the meaning of the idiom not just the meaning of the original words. Valid groupings may still have ambiguity on their own and may need more strings and/or context to select a best fit when interpreting a truest meaning of the grouping.

Figure 8A:
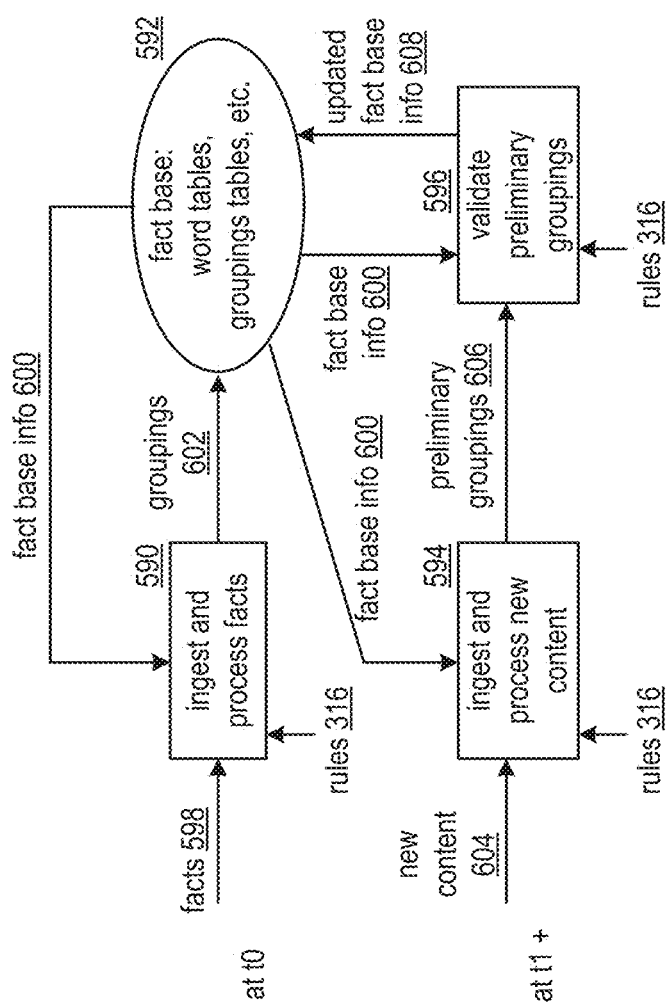
FIG. 8A is a data flow diagram for accumulating knowledge within a computing system in accordance with the present invention.

FIG. 8A is a data flow diagram for accumulating knowledge within a computing system, where a computing device, at a time=t0, ingests and processes facts 598 at a step 590 based on rules 316 and fact base information 600 to produce groupings 602 for storage in a fact base 592 (e.g., words, phrases, word groupings, identigens, entigens, quality levels). The facts 598 may include information from books, archive data, Central intelligence agency (CIA) world fact book, trusted content, etc. The ingesting may include filtering to organize and promote better valid groupings detection (e.g., considering similar domains together). The groupings 602 includes one or more of groupings identifiers, identigen identifiers, entigen identifiers, and estimated fit quality levels. The processing step 590 may include identifying identigens from words of the facts 598 in accordance with the rules 316 and the fact base info 600 and identifying groupings utilizing identigens in accordance with rules 316 and fact base info 600.

Subsequent to ingestion and processing of the facts 598 to establish the fact base 592, at a time=t1+, the computing device ingests and processes new content 604 at a step 594 in accordance with the rules 316 and the fact base information 600 to produce preliminary grouping 606. The new content may include updated content (e.g., timewise) from periodicals, newsfeeds, social media, etc. The preliminary grouping 606 includes one or more of preliminary groupings identifiers, preliminary identigen identifiers, preliminary entigen identifiers, estimated fit quality levels, and representations of unidentified words.

The computing device validates the preliminary groupings 606 at a step 596 based on the rules 316 and the fact base info 600 to produce updated fact base info 608 for storage in the fact base 592. The validating includes one or more of reasoning a fit of existing fact base info 600 with the new preliminary grouping 606, discarding preliminary groupings, updating just time frame information associated with an entry of the existing fact base info 600 (e.g., to validate knowledge for the present), creating new entigens, and creating a median entigen to summarize portions of knowledge within a median indicator as a quality level indicator (e.g., suggestive not certain).

Storage of the updated fact base information 608 captures patterns that develop by themselves instead of searching for patterns as in prior art artificial intelligence systems. Growth of the fact base 592 enables subsequent reasoning to create new knowledge including deduction, induction, inference, and inferential sentiment (e.g., a chain of sentiment sentences). Examples of sentiments includes emotion, beliefs, convictions, feelings, judgments, notions, opinions, and views.

FIG. 8B is a diagram of an embodiment of a groupings table 620 within a computing system. The groupings table 620 includes multiple fields including grouping ID 586, word strings 588, an IF string 622 and a THEN string 624. Each of the fields for the IF string 622 and the THEN string 624 includes fields for an identigen (IDN) string 626, and an entigen (ENI) string 628. The computing system of the present invention may produce the groupings table 620 as a stored fact base to enable IF THEN based inference to generate a new knowledge inference 630.

Figure 8C:
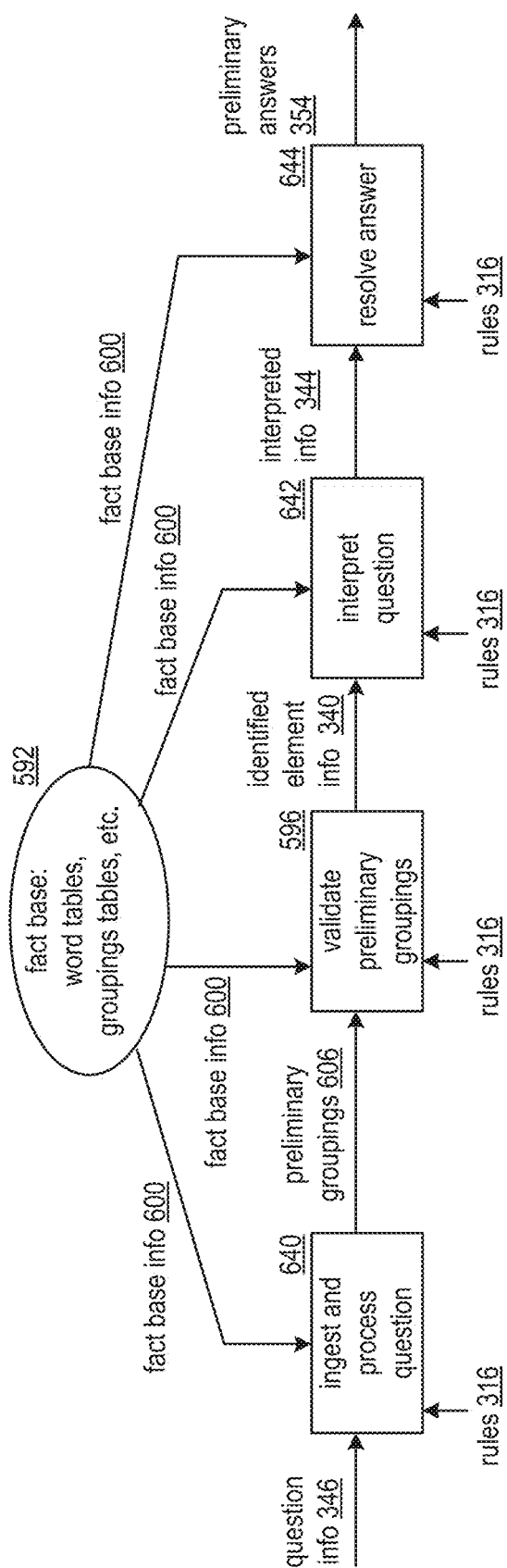
FIG. 8C is a data flow diagram for answering questions utilizing accumulated knowledge within a computing system in accordance with the present invention.

As a specific example, grouping 5493 points out the logic of IF someone has a tumor, THEN someone is sick and the grouping 5494 points of the logic that IF someone is sick, THEN someone is sad. As a result of utilizing inference, the new knowledge inference 630 may produce grouping 5495 where IF someone has a tumor, THEN someone is possibly sad (e.g., or is sad). FIG. 8C is a data flow diagram for answering questions utilizing accumulated knowledge within a computing system, where a computing device ingests and processes question information 346 at a step 640 based on rules 316 and fact base info 600 from a fact base 592 to produce preliminary grouping 606. The ingesting and processing questions step 640 includes identifying identigens from words of a question in accordance with the rules 316 and the fact base information 600 and may also include identifying groupings from the identified identigens in accordance with the rules 316 and the fact base information 600.

The computing device validates the preliminary grouping 606 at a step 596 based on the rules 316 and the fact base information 600 to produce identified element information 340. For example, the computing device reasons fit of existing fact base information with new preliminary groupings 606 to produce the identified element information 340 associated with highest quality levels. The computing device interprets a question of the identified element information 340 at a step 642 based on the rules 316 and the fact base information 600. The interpreting of the question may include separating new content from the question and reducing the question based on the fact base information 600 and the new content.

The computing device produces preliminary answers 354 from the interpreted information 344 at a resolve answer step 644 based on the rules 316 and the fact base information 600. For example, the computing device compares the interpreted information 344 two the fact base information 600 to produce the preliminary answers 354 with highest quality levels utilizing one or more of deduction, induction, inferencing, and applying inferential sentiments logic. Alternatively, or in addition to, the computing device may save new knowledge identified from the question information 346 to update the fact base 592.

Figure 8D:
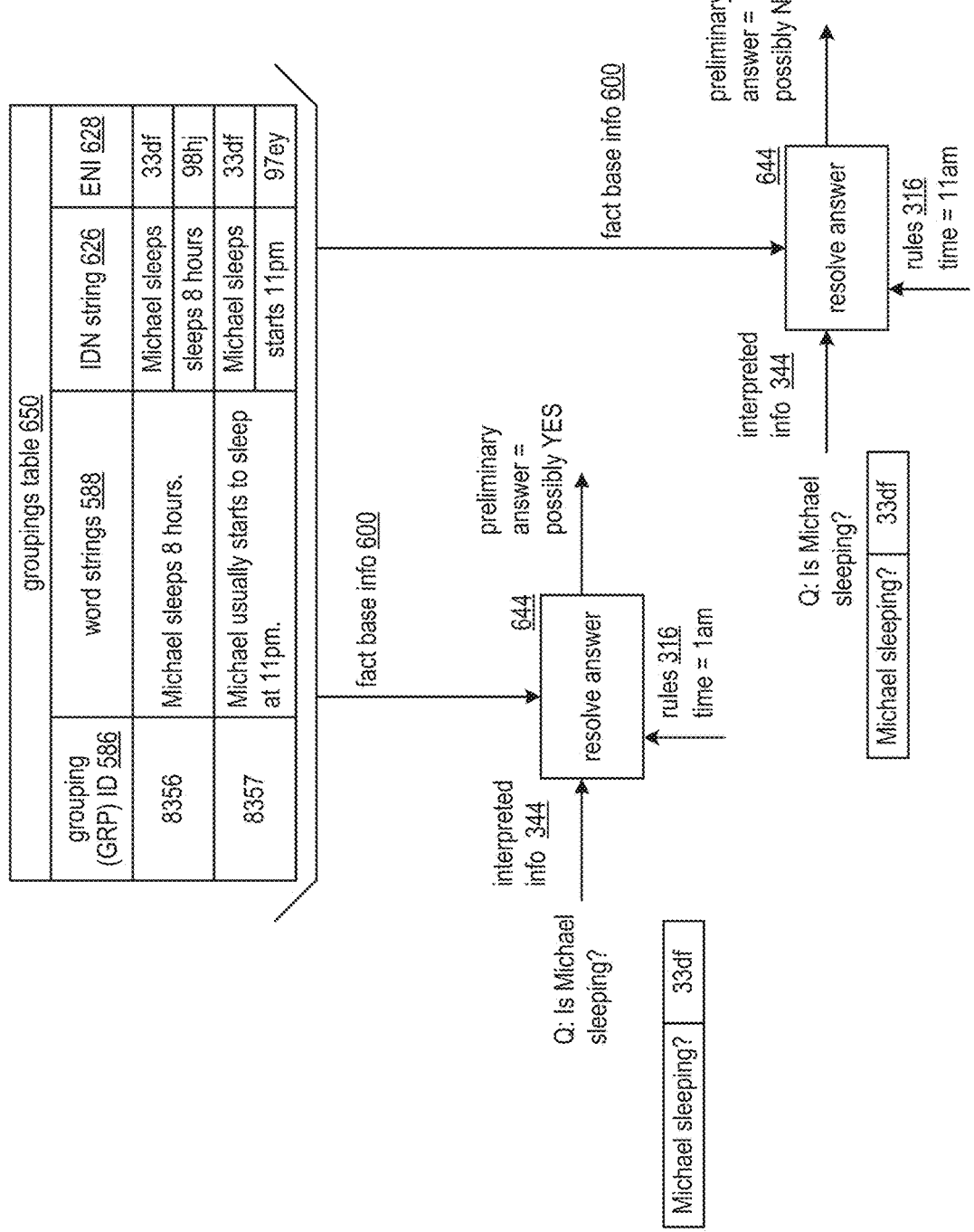
FIG. 8D is a data flow diagram for answering questions utilizing interference within a computing system in accordance with the present invention.

FIG. 8D is a data flow diagram for answering questions utilizing interference within a computing system that includes a groupings table 648 and the resolve answer step 644 of FIG. 8C. The groupings table 648 includes multiple fields including fields for a grouping (GRP) identifier (ID) 586, word strings 588, an identigen (IDN) string 626, and an entigen (ENI) 628. The groupings table 648 may be utilized to build a fact base to enable resolving a future question into an answer. For example, the grouping 8356 notes knowledge that Michael sleeps eight hours and grouping 8357 notes that Michael usually starts to sleep at 11 PM.

In a first question example that includes a question "Michael sleeping?", the resolve answer step 644 analyzes the question from the interpreted information 344 in accordance with the fact base information 600, the rules 316, and a real-time indicator that the current time is 1 AM to produce a preliminary answer of "possibly YES" when inferring that Michael is probably sleeping at 1 AM when Michael usually starts sleeping at 11 PM and Michael usually sleeps for a duration of eight hours.

In a second question example that includes the question "Michael sleeping?", the resolve answer step 644 analyzes the question from the interpreted information 344 in accordance with the fact base information 600, the rules 316, and a real-time indicator that the current time is now 11 AM to produce a preliminary answer of "possibly NO" when inferring that Michael is probably not sleeping at 11 AM when Michael usually starts sleeping at 11 PM and Michael usually sleeps for a duration of eight hours.

Figure 8E:
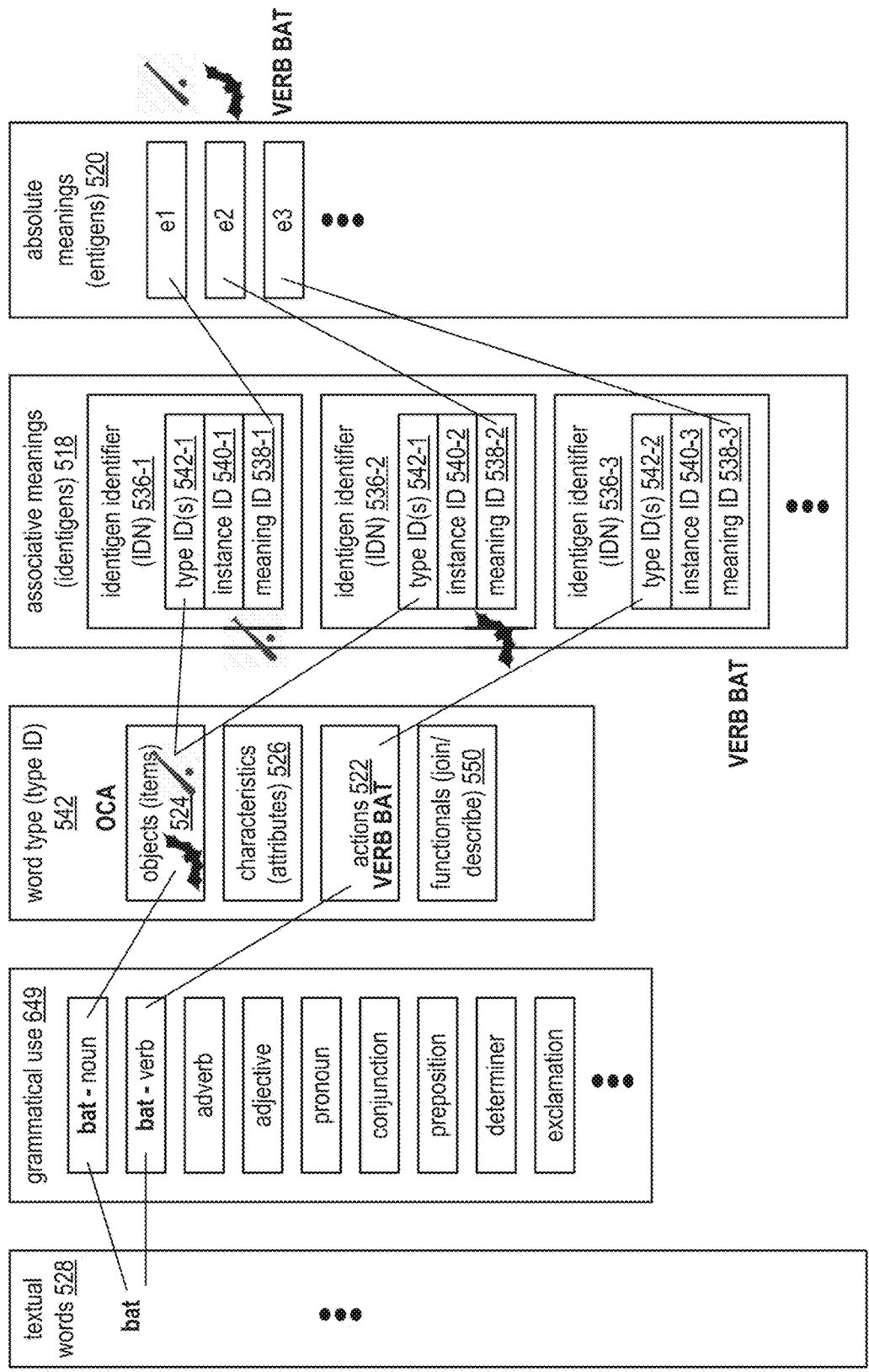
FIG. 8E is a relationship block diagram illustrating another embodiment of relationships between things and representations of things within a computing system in accordance with the present invention.

FIG. 8E is a relationship block diagram illustrating another embodiment of relationships between things and representations of things within a computing system. While things in the real world are described with words, it is often the case that a particular word has multiple meanings in isolation. Interpreting the meaning of the particular word may hinge on analyzing how the word is utilized in a phrase, a sentence, multiple sentences, paragraphs, and even whole documents or more. Describing and stratifying the use of words, word types, and possible meanings help in interpreting a true meaning.

Humans utilize textual words 528 to represent things in the real world. Quite often a particular word has multiple instances of different grammatical use when part of a phrase of one or more sentences. The grammatical use 649 of words includes the nouns and the verbs, and also includes adverbs, adjectives, pronouns, conjunctions, prepositions, determiners, exclamations, etc.

As an example of multiple grammatical use, the word "bat" in the English language can be utilized as a noun or a verb. For instance, when utilized as a noun, the word "bat" may apply to a baseball bat or may apply to a flying "bat." As another instance, when utilized as a verb, the word "bat" may apply to the action of hitting or batting an object, i.e., "bat the ball."

To stratify word types by use, the words are associated with a word type (e.g., type identifier 542). The word types include objects (e.g., items 524), characteristics (e.g., attributes 526), actions 522, and the functionals 550 for joining other words and describing words. For example, when the word "bat" is utilized as a noun, the word is describing the object of either the baseball bat or the flying bat. As another example, when the word "bat" is utilized as a verb, the word is describing the action of hitting.

To determine possible meanings, the words, by word type, are mapped to associative meanings (e.g., identigens 518). For each possible associative meaning, the word type is documented with the meaning and further with an identifier (ID) of the instance (e.g., an identigen identifier).

For the example of the word "bat" when utilized as a noun for the baseball bat, a first identigen identifier 536-1 includes a type ID 542-1 associated with the object 524, an instance ID 540-1 associated with the first identigen identifier (e.g., unique for the baseball bat), and a meaning ID 538-1 associated with the baseball bat. For the example of the word "bat" when utilized as a noun for the flying bat, a second identigen identifier 536-2 includes a type ID 542-1 associated with the object 524, an instance ID 540-2 associated with the second identigen identifier (e.g., unique for the flying bat), and a meaning ID 538-2 associated with the flying bat. For the example of the word "bat" when utilized as a verb for the bat that hits, a third identigen identifier 536-2 includes a type ID 542-2 associated with the actions 522, an instance ID 540-3 associated with the third identigen identifier (e.g., unique for the bat that hits), and a meaning ID 538-3 associated with the bat that hits.

With the word described by a type and possible associative meanings, a combination of full grammatical use of the word within the phrase etc., application of rules, and utilization of an ever-growing knowledge database that represents knowledge by linked entigens, the absolute meaning (e.g., entigen 520) of the word is represented as a unique entigen. For example, a first entigen e1 represents the absolute meaning of a baseball bat (e.g., a generic baseball bat not a particular baseball bat that belongs to anyone), a second entigen e2 represents the absolute meaning of the flying bat (e.g., a generic flying bat not a particular flying bat), and a third entigen e3 represents the absolute meaning of the verb bat (e.g., to hit).

An embodiment of methods to ingest text to produce absolute meanings for storage in a knowledge database are discussed in greater detail with reference to FIGS. 8F-H. Those embodiments further discuss the discerning of the grammatical use, the use of the rules, and the utilization of the knowledge database to definitively interpret the absolute meaning of a string of words.

Another embodiment of methods to respond to a query to produce an answer based on knowledge stored in the knowledge database are discussed in greater detail with reference to FIGS. 8J-L. Those embodiments further discuss the discerning of the grammatical use, the use of the rules, and the utilization of the knowledge database to interpret the query. The query interpretation is utilized to extract the answer from the knowledge database to facilitate forming the query response.

Figure 8F:
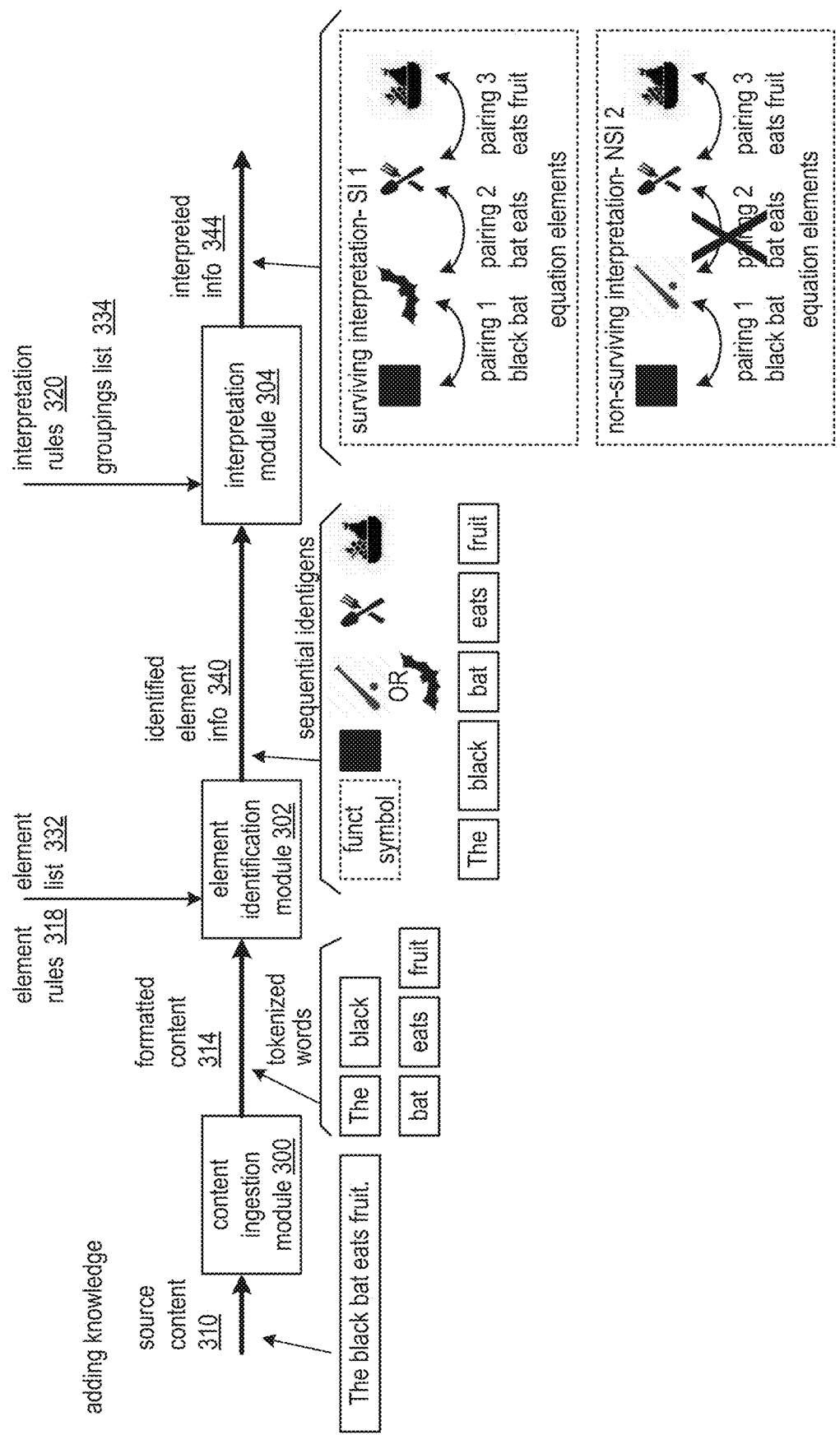
FIGS. 8F and 8G are schematic block diagrams of another embodiment of a computing system in accordance with the present invention.
Figure 8G:
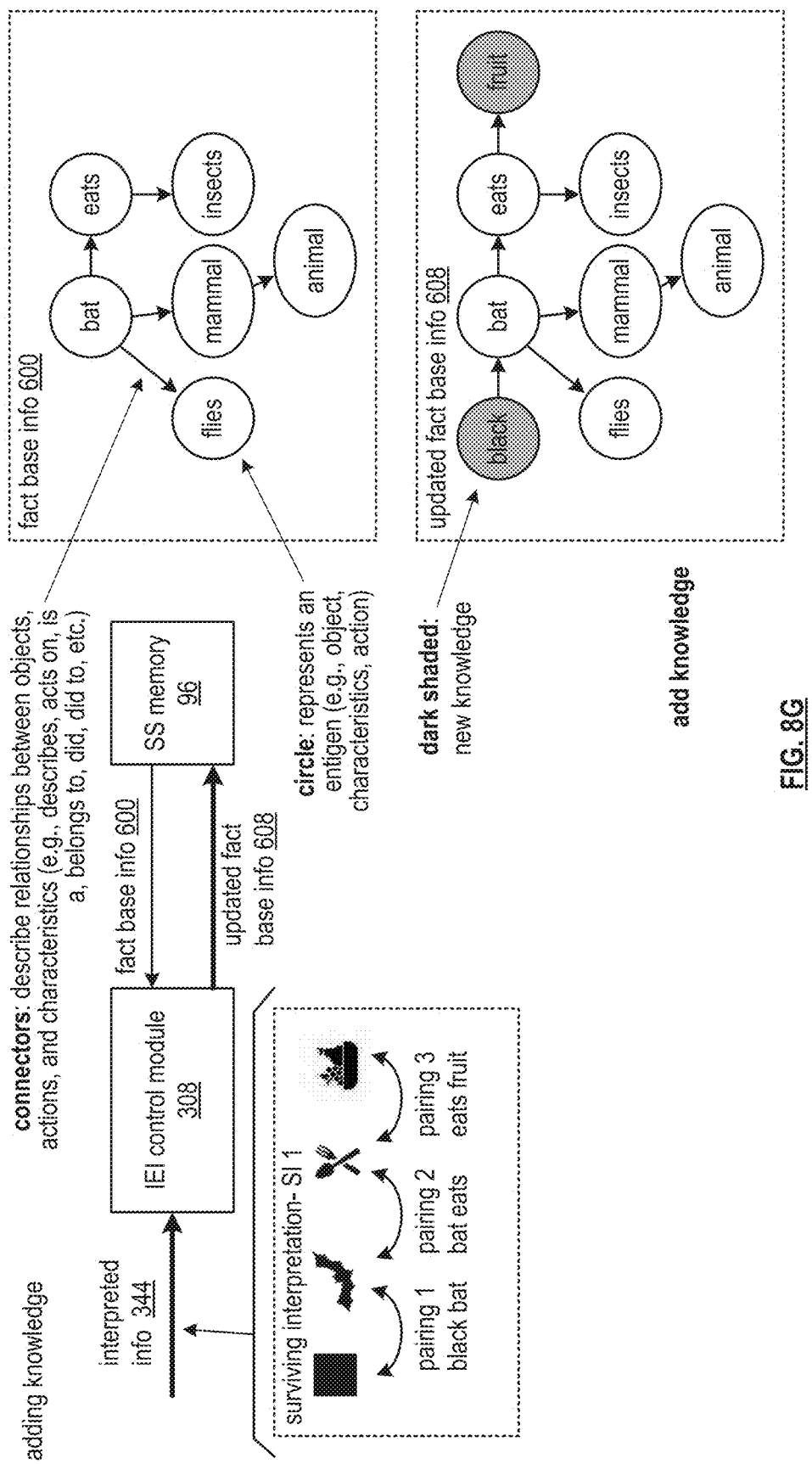

FIGS. 8F and 8G are schematic block diagrams of another embodiment of a computing system that includes the content ingestion module 300 of FIG. 5E, the element identification module 302 of FIG. 5E, the interpretation module 304 of FIG. 5E, the IEI control module 308 of FIG. 5E, and the SS memory 96 of FIG. 2. Generally, an embodiment of this invention provides presents solutions where the computing system 10 supports processing content to produce knowledge for storage in a knowledge database.

The processing of the content to produce the knowledge includes a series of steps. For example, a first step includes identifying words of an ingested phrase to produce tokenized words. As depicted in FIG. 8F, a specific example of the first step includes the content ingestion module 300 comparing words of source content 310 to dictionary entries to produce formatted content 314 that includes identifiers of known words. Alternatively, when a comparison is unfavorable, the temporary identifier may be assigned to an unknown word. For instance, the content ingestion module 300 produces identifiers associated with the words "the", "black", "bat", "eats", and "fruit" when the ingested phrase includes "The black bat eats fruit", and generates the formatted content 314 to include the identifiers of the words.

A second step of the processing of the content to produce the knowledge includes, for each tokenized word, identifying one or more identigens that correspond the tokenized word, where each identigen describes one of an object, a characteristic, and an action. As depicted in FIG. 8F, a specific example of the second step includes the element identification module 302 performing a look up of identigen identifiers, utilizing an element list 332 and in accordance with element rules 318, of the one or more identigens associated with each tokenized word of the formatted content 314 to produce identified element information 340.

A unique identifier is associated with each of the potential object, the characteristic, and the action (OCA) associated with the tokenized word (e.g. sequential identigens). For instance, the element identification module 302 identifies a functional symbol for "the", identifies a single identigen for "black", identifies two identigens for "bat" (e.g., baseball bat and flying bat), identifies a single identigen for "eats", and identifies a single identigen for "fruit." When at least one tokenized word is associated with multiple identigens, two or more permutations of sequential combinations of identigens for each tokenized word result. For example, when "bat" is associated with two identigens, two permutations of sequential combinations of identigens result for the ingested phrase.

A third step of the processing of the content to produce the knowledge includes, for each permutation of sequential combinations of identigens, generating a corresponding equation package (i.e., candidate interpretation), where the equation package includes a sequential linking of pairs of identigens (e.g., relationships), where each sequential linking pairs a preceding identigen to a next identigen, and where an equation element describes a relationship between paired identigens (OCAs) such as describes, acts on, is a, belongs to, did, did to, etc. Multiple OCAs occur for a common word when the word has multiple potential meanings (e.g., a baseball bat, a flying bat).

As depicted in FIG. 8F, a specific example of the third step includes the interpretation module 304, for each permutation of identigens of each tokenized word of the identified element information 340, the interpretation module 304 generates, in accordance with interpretation rules 320 and a groupings list 334, an equation package to include one or more of the identifiers of the tokenized words, a list of identifiers of the identigens of the equation package, a list of pairing identifiers for sequential pairs of identigens, and a quality metric associated with each sequential pair of identigens (e.g., likelihood of a proper interpretation). For instance, the interpretation module 304 produces a first equation package that includes a first identigen pairing of a black bat (e.g., flying bat with a higher quality metric level), the second pairing of bat eats (e.g., the flying bat eats, with a higher quality metric level), and a third pairing of eats fruit, and the interpretation module 304 produces a second equation package that includes a first pairing of a black bat (e.g., baseball bat, with a neutral quality metric level), the second pairing of bat eats (e.g., the baseball bat eats, with a lower quality metric level), and a third pairing of eats fruit.

A fourth step of the processing of the content to produce the knowledge includes selecting a surviving equation package associated with a most favorable confidence level. As depicted in FIG. 8F, a specific example of the fourth step includes the interpretation module 304 applying interpretation rules 320 (i.e., inference, pragmatic engine, utilizing the identifiers of the identigens to match against known valid combinations of identifiers of entigens) to reduce a number of permutations of the sequential combinations of identigens to produce interpreted information 344 that includes identification of at least one equation package as a surviving interpretation SI (e.g., higher quality metric level).

Non-surviving equation packages are eliminated that compare unfavorably to pairing rules and/or are associated with an unfavorable quality metric levels to produce a non-surviving interpretation NSI 2 (e.g., lower quality metric level), where an overall quality metric level may be assigned to each equation package based on quality metric levels of each pairing, such that a higher quality metric level of an equation package indicates a higher probability of a most favorable interpretation. For instance, the interpretation module 304 eliminates the equation package that includes the second pairing indicating that the "baseball bat eats" which is inconsistent with a desired quality metric level of one or more of the groupings list 334 and the interpretation rules 320 and selects the equation package associated with the "flying bat eats" which is favorably consistent with the one or more of the quality metric levels of the groupings list 334 and the interpretation rules 320.

A fifth step of the processing of the content to produce the knowledge utilizing the confidence level includes integrating knowledge of the surviving equation package into a knowledge database. For example, integrating at least a portion of the reduced OCA combinations into a graphical database to produce updated knowledge. As another example, the portion of the reduced OCA combinations may be translated into rows and columns entries when utilizing a rows and columns database rather than a graphical database. When utilizing the rows and columns approach for the knowledge database, subsequent access to the knowledge database may utilize structured query language (SQL) queries.

As depicted in FIG. 8G, a specific example of the fifth step includes the IEI control module 308 recovering fact base information 600 from SS memory 96 to identify a portion of the knowledge database for potential modification utilizing the OCAs of the surviving interpretation SI 1 (i.e., compare a pattern of relationships between the OCAs of the surviving interpretation SI 1 from the interpreted information 344 to relationships of OCAs of the portion of the knowledge database including potentially new quality metric levels).

The fifth step further includes determining modifications (e.g., additions, subtractions, further clarifications required when information is complex, etc.) to the portion of the knowledge database based on the new quality metric levels. For instance, the IEI control module 308 causes adding the element "black" as a "describes" relationship of an existing bat OCA and adding the element "fruit" as an eats "does to" relationship to implement the modifications to the portion of the fact base information 600 to produce updated fact base information 608 for storage in the SS memory 96.

Figure 8H:
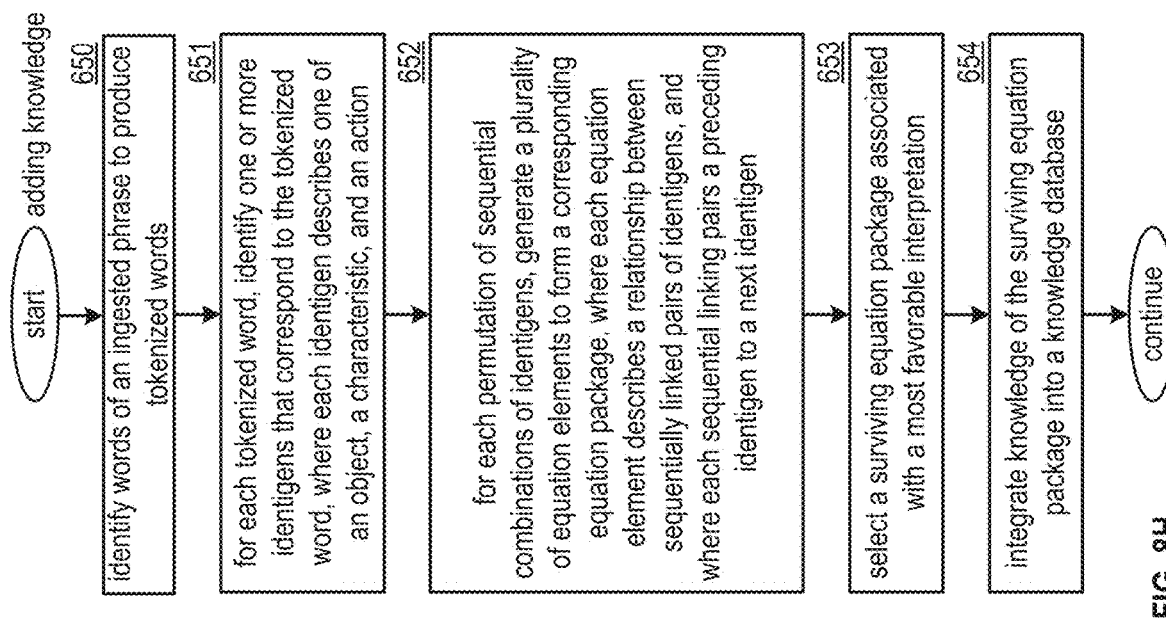
FIG. 8H is a logic diagram of an embodiment of a method for processing content to produce knowledge within a computing system in accordance with the present invention.

FIG. 8H is a logic diagram of an embodiment of a method for processing content to produce knowledge for storage within a computing system. In particular, a method is presented for use in conjunction with one or more functions and features described in conjunction with FIGS. 1-8E, 8F, and also FIG. 8G. The method includes step 650 where a processing module of one or more processing modules of one or more computing devices of the computing system identifies words of an ingested phrase to produce tokenized words. The identified includes comparing words to known words of dictionary entries to produce identifiers of known words.

For each tokenized word, the method continues at step 651 where the processing module identifies one or more identigens that corresponds to the tokenized word, where each identigen describes one of an object, a characteristic, and an action (e.g., OCA). The identifying includes performing a lookup of identifiers of the one or more identigens associated with each tokenized word, where the different identifiers associated with each of the potential object, the characteristic, and the action associated with the tokenized word.

The method continues at step 652 where the processing module, for each permutation of sequential combinations of identigens, generates a plurality of equation elements to form a corresponding equation package, where each equation element describes a relationship between sequentially linked pairs of identigens, where each sequential linking pairs a preceding identigen to a next identigen. For example, for each permutation of identigens of each tokenized word, the processing module generates the equation package to include a plurality of equation elements, where each equation element describes the relationship (e.g., describes, acts on, is a, belongs to, did, did too, etc.) between sequentially adjacent identigens of a plurality of sequential combinations of identigens. Each equation element may be further associated with a quality metric to evaluate a favorability level of an interpretation in light of the sequence of identigens of the equation package.

The method continues at step 653 where the processing module selects a surviving equation package associated with most favorable interpretation. For example, the processing module applies rules (i.e., inference, pragmatic engine, utilizing the identifiers of the identigens to match against known valid combinations of identifiers of entigens), to reduce the number of permutations of the sequential combinations of identigens to identify at least one equation package, where non-surviving equation packages are eliminated the compare unfavorably to pairing rules and/or are associated with an unfavorable quality metric levels to produce a non-surviving interpretation, where an overall quality metric level is assigned to each equation package based on quality metric levels of each pairing, such that a higher quality metric level indicates an equation package with a higher probability of favorability of correctness.

The method continues at step 654 where the processing module integrates knowledge of the surviving equation package into a knowledge database. For example, the processing module integrates at least a portion of the reduced OCA combinations into a graphical database to produce updated knowledge. The integrating may include recovering fact base information from storage of the knowledge database to identify a portion of the knowledge database for potential modifications utilizing the OCAs of the surviving equation package (i.e., compare a pattern of relationships between the OCAs of the surviving equation package to relationships of the OCAs of the portion of the knowledge database including potentially new quality metric levels). The integrating further includes determining modifications (e.g., additions, subtractions, further clarifications required when complex information is presented, etc.) to produce the updated knowledge database that is based on fit of acceptable quality metric levels, and implementing the modifications to the portion of the fact base information to produce the updated fact base information for storage in the portion of the knowledge database.

The method described above in conjunction with the processing module can alternatively be performed by other modules of the computing system 10 of FIG. 1 or by other devices. In addition, at least one memory section (e.g., a computer readable memory, a non-transitory computer readable storage medium, a non-transitory computer readable memory organized into a first memory element, a second memory element, a third memory element, a fourth element section, a fifth memory element etc.) that stores operational instructions can, when executed by one or more processing modules of one or more computing devices (e.g., one or more servers, one or more user devices) of the computing system 10, cause the one or more computing devices to perform any or all of the method steps described above.

Figure 8J:
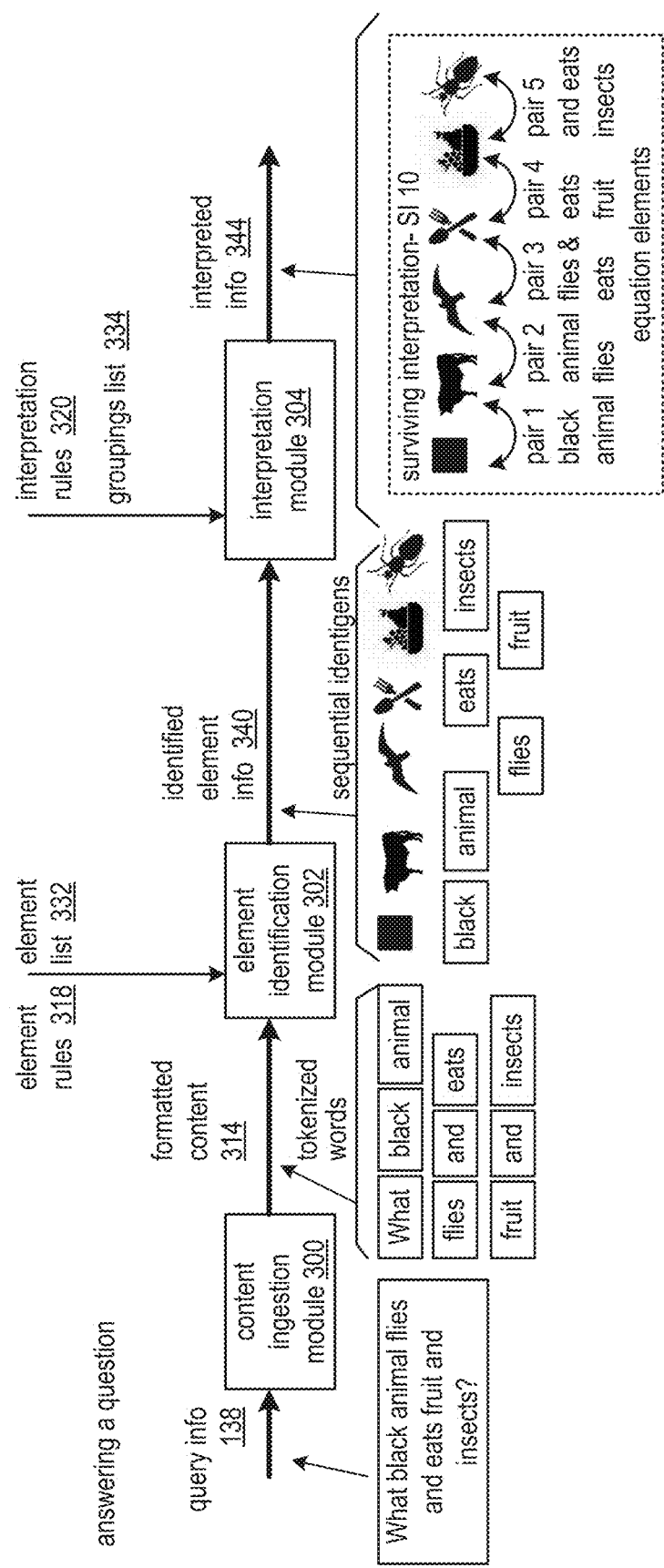
FIGS. 8J and 8K are schematic block diagrams another embodiment of a computing system in accordance with the present invention.
Figure 8K:
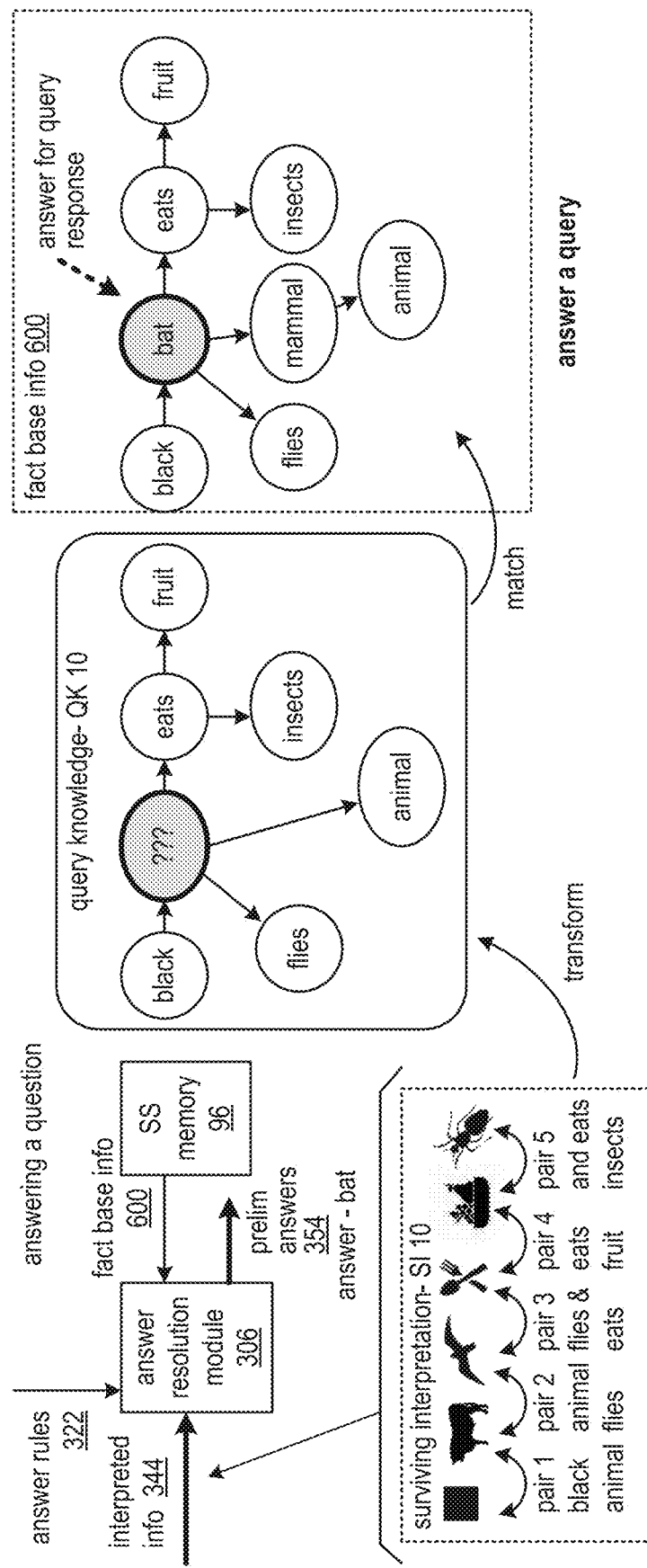

FIGS. 8J and 8K are schematic block diagrams of another embodiment of a computing system that includes the content ingestion module 300 of FIG. 5E, the element identification module 302 of FIG. 5E, the interpretation module 304 of FIG. 5E, the answer resolution module 306 of FIG. 5E, and the SS memory 96 of FIG. 2. Generally, an embodiment of this invention provides solutions where the computing system 10 supports for generating a query response to a query utilizing a knowledge database.

The generating of the query response to the query includes a series of steps. For example, a first step includes identifying words of an ingested query to produce tokenized words. As depicted in FIG. 8J, a specific example of the first step includes the content ingestion module 300 comparing words of query info 138 to dictionary entries to produce formatted content 314 that includes identifiers of known words. For instance, the content ingestion module 300 produces identifiers for each word of the query "what black animal flies and eats fruit and insects?"

A second step of the generating of the query response to the query includes, for each tokenized word, identifying one or more identigens that correspond the tokenized word, where each identigen describes one of an object, a characteristic, and an action (OCA). As depicted in FIG. 8J, a specific example of the second step includes the element identification module 302 performing a look up of identifiers, utilizing an element list 332 and in accordance with element rules 318, of the one or more identigens associated with each tokenized word of the formatted content 314 to produce identified element information 340. A unique identifier is associated with each of the potential object, the characteristic, and the action associated with a particular tokenized word. For instance, the element identification module 302 produces a single identigen identifier for each of the black color, an animal, flies, eats, fruit, and insects.

A third step of the generating of the query response to the query includes, for each permutation of sequential combinations of identigens, generating a corresponding equation package (i.e., candidate interpretation). The equation package includes a sequential linking of pairs of identigens, where each sequential linking pairs a preceding identigen to a next identigen. An equation element describes a relationship between paired identigens (OCAs) such as describes, acts on, is a, belongs to, did, did to, etc.

As depicted in FIG. 8J, a specific example of the third step includes the interpretation module 304, for each permutation of identigens of each tokenized word of the identified element information 340, generating the equation packages in accordance with interpretation rules 320 and a groupings list 334 to produce a series of equation elements that include pairings of identigens. For instance, the interpretation module 304 generates a first pairing to describe a black animal, a second pairing to describe an animal that flies, a third pairing to describe flies and eats, a fourth pairing to describe eats fruit, and a fifth pairing to describe eats fruit and insects.

A fourth step of the generating the query response to the query includes selecting a surviving equation package associated with a most favorable interpretation. As depicted in FIG. 8J, a specific example of the fourth step includes the interpretation module 304 applying the interpretation rules 320 (i.e., inference, pragmatic engine, utilizing the identifiers of the identigens to match against known valid combinations of identifiers of entigens) to reduce the number of permutations of the sequential combinations of identigens to produce interpreted information 344. The interpreted information 344 includes identification of at least one equation package as a surviving interpretation SI 10, where non-surviving equation packages, if any, are eliminated that compare unfavorably to pairing rules to produce a non-surviving interpretation.

A fifth step of the generating the query response to the query includes utilizing a knowledge database, generating a query response to the surviving equation package of the query, where the surviving equation package of the query is transformed to produce query knowledge for comparison to a portion of the knowledge database. An answer is extracted from the portion of the knowledge database to produce the query response.

As depicted in FIG. 8K, a specific example of the fifth step includes the answer resolution module 306 interpreting the surviving interpretation SI 10 of the interpreted information 344 in accordance with answer rules 322 to produce query knowledge QK 10 (i.e., a graphical representation of knowledge when the knowledge database utilizes a graphical database). For example, the answer resolution module 306 accesses fact base information 600 from the SS memory 96 to identify the portion of the knowledge database associated with a favorable comparison of the query knowledge QK 10 (e.g., by comparing attributes of the query knowledge QK 10 to attributes of the fact base information 600), and generates preliminary answers 354 that includes the answer to the query. For instance, the answer is "bat" when the associated OCAs of bat, such as black, eats fruit, eats insects, is an animal, and flies, aligns with OCAs of the query knowledge.

Figure 8L:
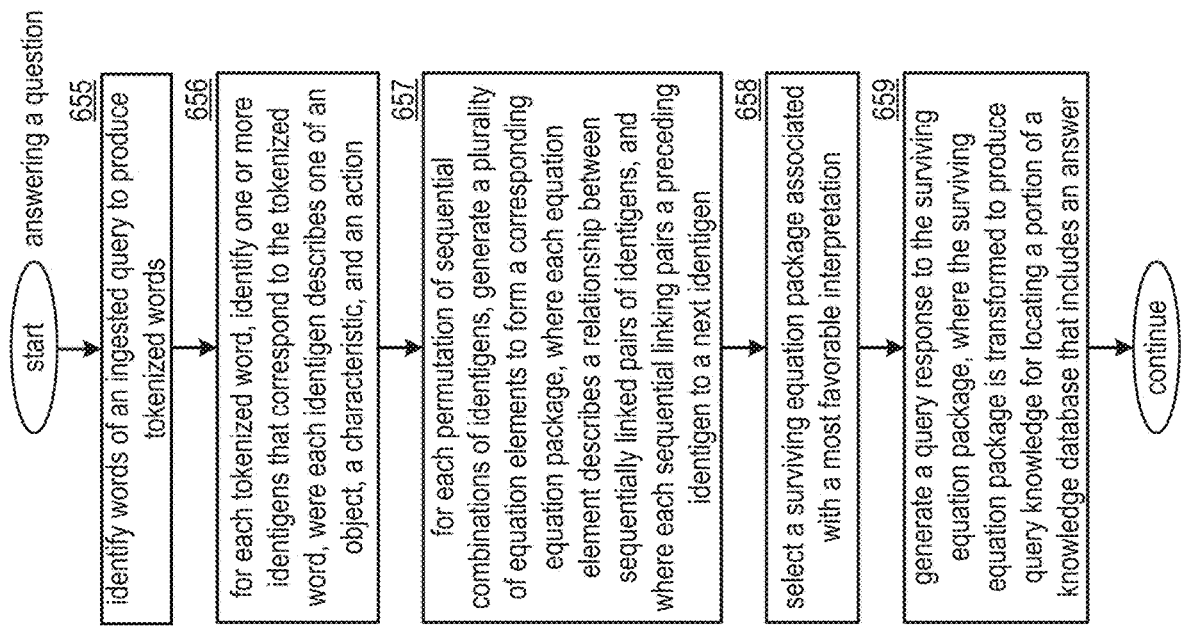
FIG. 8L is a logic diagram of an embodiment of a method for generating a query response to a query within a computing system in accordance with the present invention.

FIG. 8L is a logic diagram of an embodiment of a method for generating a query response to a query utilizing knowledge within a knowledge database within a computing system. In particular, a method is presented for use in conjunction with one or more functions and features described in conjunction with FIGS. 1-8D, 8J, and also FIG. 8K. The method includes step 655 where a processing module of one or more processing modules of one or more computing devices of the computing system identifies words of an ingested query to produce tokenized words. For example, the processing module compares words to known words of dictionary entries to produce identifiers of known words.

For each tokenized word, the method continues at step 656 where the processing module identifies one or more identigens that correspond to the tokenized word, where each identigen describes one of an object, a characteristic, and an action. For example, the processing module performs a lookup of identifiers of the one or more identigens associated with each tokenized word, where different identifiers associated with each permutation of a potential object, characteristic, and action associated with the tokenized word.

For each permutation of sequential combinations of identigens, the method continues at step 657 where the processing module generates a plurality of equation elements to form a corresponding equation package, where each equation element describes a relationship between sequentially linked pairs of identigens. Each sequential linking pairs a preceding identigen to a next identigen. For example, for each permutation of identigens of each tokenized word, the processing module includes all other permutations of all other tokenized words to generate the equation packages. Each equation package includes a plurality of equation elements describing the relationships between sequentially adjacent identigens of a plurality of sequential combinations of identigens.

The method continues at step 658 where the processing module selects a surviving equation package associated with a most favorable interpretation. For example, the processing module applies rules (i.e., inference, pragmatic engine, utilizing the identifiers of the identigens to match against known valid combinations of identifiers of entigens) to reduce the number of permutations of the sequential combinations of identigens to identify at least one equation package. Non-surviving equation packages are eliminated the compare unfavorably to pairing rules.

The method continues at step 659 where the processing module generates a query response to the surviving equation package, where the surviving equation package is transformed to produce query knowledge for locating the portion of a knowledge database that includes an answer to the query. As an example of generating the query response, the processing module interprets the surviving the equation package in accordance with answer rules to produce the query knowledge (e.g., a graphical representation of knowledge when the knowledge database utilizes a graphical database format).

The processing module accesses fact base information from the knowledge database to identify the portion of the knowledge database associated with a favorable comparison of the query knowledge (e.g., favorable comparison of attributes of the query knowledge to the portion of the knowledge database, aligning favorably comparing entigens without conflicting entigens). The processing module extracts an answer from the portion of the knowledge database to produce the query response.

The method described above in conjunction with the processing module can alternatively be performed by other modules of the computing system 10 of FIG. 1 or by other devices. In addition, at least one memory section (e.g., a computer readable memory, a non-transitory computer readable storage medium, a non-transitory computer readable memory organized into a first memory element, a second memory element, a third memory element, a fourth element section, a fifth memory element etc.) that stores operational instructions can, when executed by one or more processing modules of one or more computing devices (e.g., one or more servers, one or more user devices) of the computing system 10, cause the one or more computing devices to perform any or all of the method steps described above.

Figure 9A:
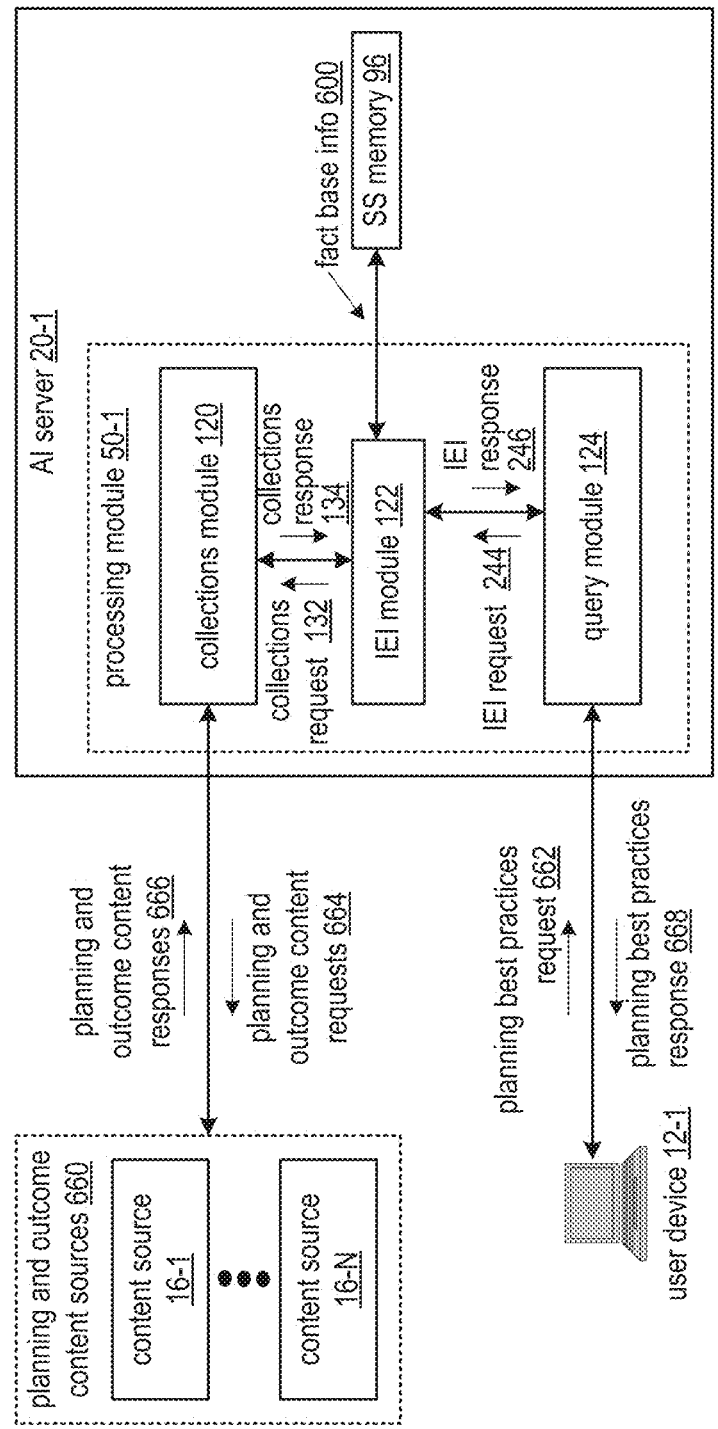
FIG. 9A is a schematic block diagram of another embodiment of a computing system in accordance with the present invention.

FIG. 9A is a schematic block diagram of another embodiment of a computing system that includes planning and outcome content sources 660, the AI server 20-1 of FIG. 1, and the user device 12-1 of FIG. 1. The planning and outcome content sources 660 includes the content sources 16-1 through 16-N of FIG. 1. The AI server 20-1 includes the processing module 50-1 of FIG. 2 and the SS memory 96 of FIG. 2. The processing module 50-1 includes the collections module 120 of FIG. 4A, the IEI module 122 of FIG. 4A, and the query module 124 of FIG. 4A. Generally, an embodiment of this invention presents solutions where the computing system 10 supports identifying best practices.

The identifying of the best practices includes a series of steps. For example, a first step includes facilitating gathering planning and outcome content based on one or more planning best practices requests. Planning content may include one or more of estimated outcomes, reports, future forecasts, action plans, etc. and outcome content may include one or more of closing reports, actual results, action plans successes, action plan failures, etc. The planning best practices requests may include one or more of a plan identifier (ID), outcome ID, planning and outcome content sources ID, supplemental outcome information, minimum threshold of quality requirement, type of management function, etc.

As a specific example of the first step to facilitate the gathering of the planning and outcome content, the IEI module 122 receives an IEI request 244 from the query module 124. The query module 124 generates the IEI request 244 based on receiving a planning best practices request 662 from the user device 12-1. The planning best practices request 662 includes the one or more planning best practice requests.

The IEI module 122 determines whether to gather incremental planning and outcome content based on a maturity level of associated knowledge of a knowledge base (e.g., fact base information 600 from SS memory 96) and indicates to gather more when the maturity level is low, i.e., little knowledge associated with the one or more requests. When gathering more, the IEI module 122 identifies one or more content sources of the planning and outcome content sources 660 based on the one or more planning best practice requests (e.g., sources associated with planning and/or outcome content associated with the request).

The IEI module 122 issues a collections request 132 to the collections module 120, receives a collections response 134 from the collections module 120, where the collections response 134 includes the incremental planning and outcome content. The collections module 120 issues one or more planning and outcome content requests 664 to the identified content sources of the planning and outcome content sources 660, receives planning and outcome content responses 666 from the planning and outcome content sources 666, and generates the collections response 134 based on the received planning and outcome content responses 666.

A second step of the identifying of the best practices includes IEI processing the gathered planning and outcome content to produce incremental knowledge associated with the one or more planning best practices requests. As a specific example of the second step, the IEI module 122 IEI processes the incremental planning and outcome content to produce the incremental knowledge and facilitates storage of the incremental knowledge as fact base information 600 in the SS memory 96.

A third step of the identifying of the best practices includes locating knowledge to respond to a particular planning best practices request of the one or more planning best practices requests. As a specific example of the third step, the IEI module 122 IEI processes the particular planning best practices request to generate request knowledge. The IEI module 122 compares the request knowledge to knowledge of the knowledge base to locate a portion of the knowledge base associated with the particular planning best practices request (i.e., compare a graphical database representation of the request to portions of the knowledge base to locate the portion) and indicates the locating of the knowledge.

A fourth step of the identifying of the best practices includes generating a planning best practices response with regards to the particular planning best practices request. As a specific example of the fourth step, the IEI module 122 utilizes the located portion of the knowledge base to produce the planning best practices response 668. The planning best practices 668 includes multiple facets of planning and results including one or more of planning quality metrics for plans, desired planning practices associated with favorable outcomes (e.g., practices correlated to desired outcomes), and undesired planning practices associated with unfavorable outcomes (e.g., biases, lapses, gaps, mismatches, incorrect assumptions, etc.).

Having produced the planning best practices response 668, the IEI module 122 generates an IEI response 246 that includes the planning best practices response 668. The IEI module 122 sends the IEI response 246 to the query module 124. The query module 124 sends the planning best practices response 668 to the user device 12-1.

Figure 9B:
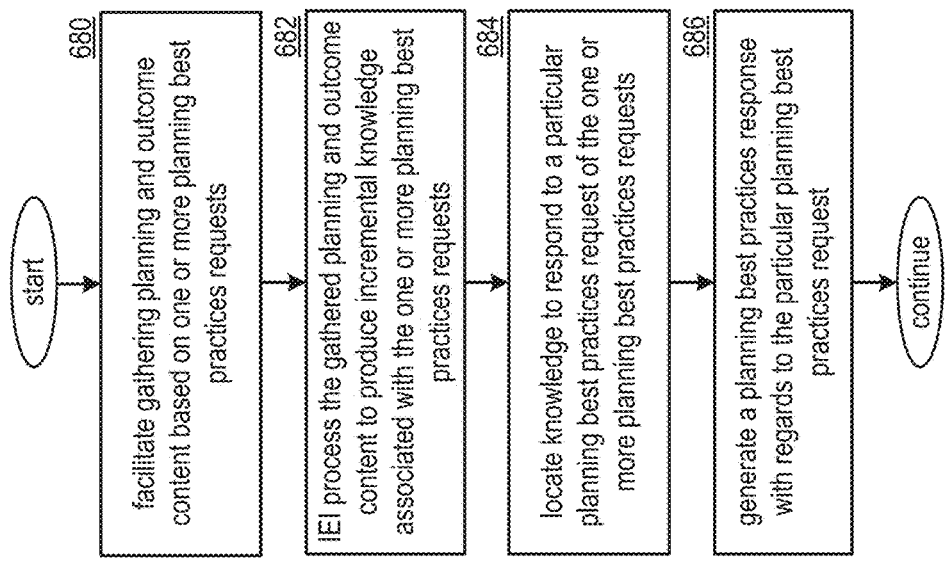
FIG. 9B is a logic diagram of an embodiment of a method for identifying best practices within a computing system in accordance with the present invention.

FIG. 9B is a logic diagram of an embodiment of a method for identifying best practices within a computing system. In particular, a method is presented for use in conjunction with one or more functions and features described in conjunction with FIGS. 1-8D, and also FIG. 9A. The method includes step 680 where a processing module of one or more processing modules of one or more computing devices of the computing system facilitates gathering planning and outcome content based on one or more planning best practices requests.

The facilitating includes receiving the one or more planning best practices request and determining whether to gather incremental planning and outcome content based on a maturity level of the associated knowledge of the knowledge base (e.g., indicate together more when the maturity level is low, i.e., little knowledge associated with the one or more requests). When gathering more, the processing module identifies one or more content sources of planning and outcome content sources based on the one or more planning best practice requests (e.g., sources associated with planning and/or outcome content associated with the request). The processing module causes issuing of one or more planning and outcome content requests to the identified one or more content sources and receives the incremental planning and outcome content in response to the one or more planning and outcome content request.

The method continues at step 682 where the processing module IEI processes the gathered planning and outcome content to produce incremental knowledge associated with the one or more planning best practices requests. For example, the processing module IEI processes the incremental planning and content outcome to produce incremental knowledge and facilitates storage of the incremental knowledge in the knowledge base.

The method continues at step 684 where the processing module locates knowledge to respond to a particular planning best practices request of the one or more planning best practices requests. For example, the locating includes IEI processing the particular planning best practices request to generate request knowledge. The locating further includes comparing the request knowledge to knowledge of the knowledge base to locate a portion of the knowledge base associated with the particular planning best practices request. For instance, compare a graphical database representation of the request to portions of the knowledge base to locate the portion of the knowledge base.

The method continues at step 686 where the processing module generates a planning best practices response with regards to the particular planning best practices request. For example, the generating includes utilizing the located portion of the knowledge base to produce the planning best practices response. The response includes multiple facets of planning and results including one or more of planning quality metrics for plans, desired planning practices associated with favorable outcomes (i.e., practices correlated to desired outcomes), and undesired planning practices associated with unfavorable outcomes (i.e., biases, lapses, gaps, mismatches, incorrect assumptions, etc.). In an embodiment, the processing module sends the planning best practices response to a requesting entity. Alternatively, or in addition to, the processing module ingests the planning best practices response as new content to produce further incremental knowledge for integration with the knowledge base to produce an updated knowledge base.

The method described above in conjunction with the processing module can alternatively be performed by other modules of the computing system 10 of FIG. 1 or by other devices. In addition, at least one memory section (e.g., a computer readable memory, a non-transitory computer readable storage medium, a non-transitory computer readable memory organized into a first memory element, a second memory element, a third memory element, a fourth element section, a fifth memory element etc.) that stores operational instructions can, when executed by one or more processing modules of one or more computing devices (e.g., one or more servers, one or more user devices) of the computing system 10, cause the one or more computing devices to perform any or all of the method steps described above.

Figure 10A:
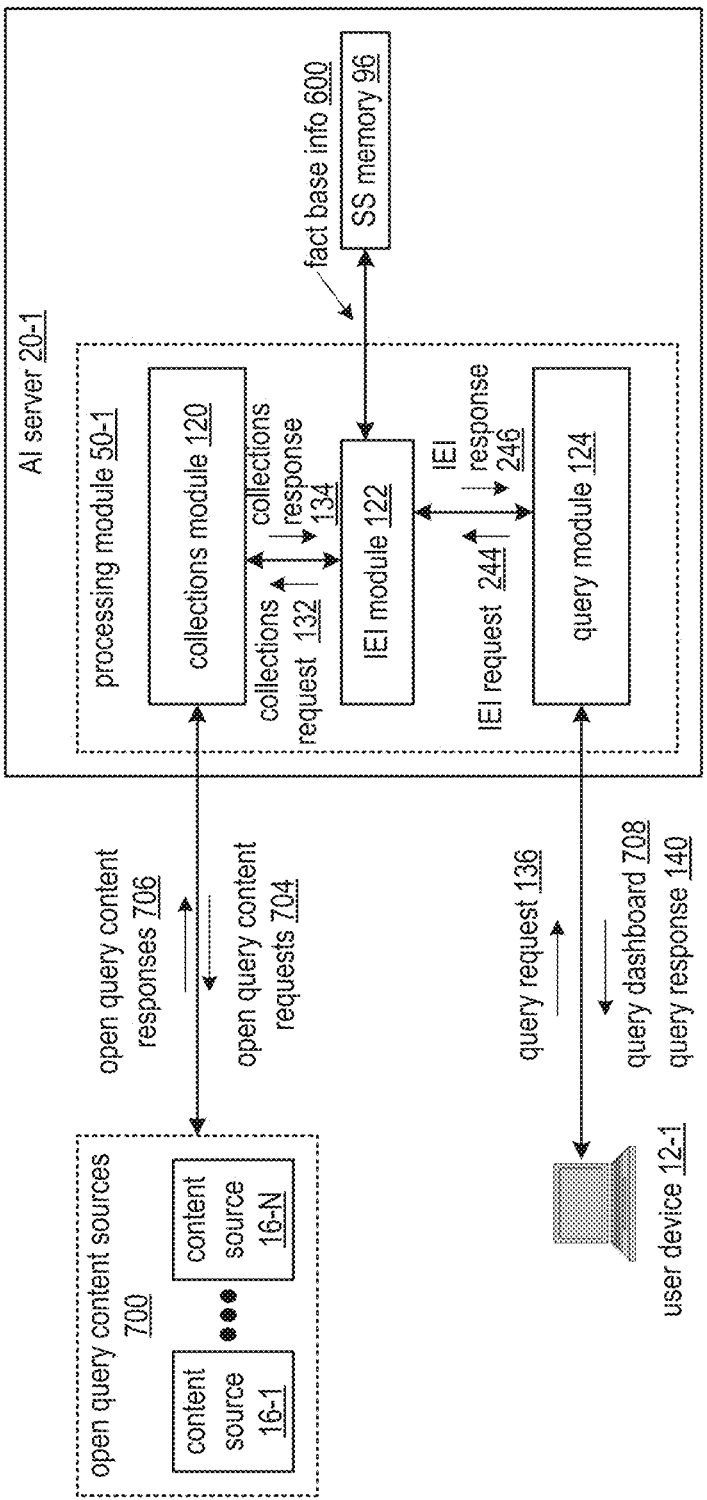
FIG. 10A is a schematic block diagram of another embodiment of a computing system in accordance with the present invention.

FIG. 10A is a schematic block diagram of another embodiment of a computing system that includes open query content sources 700, the AI server 20-1 of FIG. 1, and the user device 12-1 of FIG. 1. The open query content sources 700 includes the content sources 16-1 through 16-N of FIG. 1. The AI server 20-1 includes the processing module 50-1 of FIG. 2 and the SS memory 96 of FIG. 2. The processing module 50-1 includes the collections module 120 of FIG. 4A, the IEI module 122 of FIG. 4A, and the query module 124 of FIG. 4A. Generally, an embodiment of this invention presents solutions where the computing system 10 supports providing a query dashboard.

The providing of the query dashboard includes a series of steps. For example, a first step includes facilitating gathering incremental content associated with one or more open queries to a knowledge base. As a specific example of the first step, the IEI module 122 receives one or more IEI requests 244 from the query module 124. The query module 124 generates each of the one or more IEI requests 244 based on queries extracted from one or more query requests 136 from the user device 12-1 and identifies one or more content sources 16-1 through 16-N of the open query content sources 700 associated with desired open query content associated with one or more of the queries. For instance, IEI process a query to produce query knowledge, compare the query knowledge to fact base information 600 from the SS memory 96 that includes stored knowledge, indicate to gather the Incremental content when the comparison is unfavorable.

The query module 124 issues a collections request 132 to the collections module 120, where the collections request 132 includes the identity of the one or more content sources 16-1 through 16-N and content identifier information. The collections module 120 issues one or more open query content request 704 to the identified content sources of the open query content sources 700 and receives a collections response 134 from the collections module 120. The collections response 134 includes the incremental content. The collections module 120 extracts the incremental content from one or more open query content responses 706 received from the open query content sources 700.

A second step of the providing of the query dashboard includes processing the incremental content to update the knowledge base with incremental knowledge. As a specific example of the second step, the IEI module 122 IEI processes the incremental content to produce the incremental knowledge (i.e. for each word of the incremental content, identify a group of identigens, for each pairwise grouping of sequential identigens, identify entigens of each of the group of identigens in accordance with rules to produce a sequence of entigens). The IEI module 122 integrates one or more portions of the sequence of entigens with entigen representations of the knowledge base to produce the updated knowledge base.

A third step of the providing of the query dashboard includes, for a first open query, generating query dashboard information. As a specific example of the third step, the IEI module 122 analyzes a status of the open query to include one or more of the query, previous interim query responses, a final query response, a quality metric associated with a response, an estimated time to next response, one or more content descriptors associated with content required but not yet received to facilitate a response, a quality level of the open query (i.e., maturity level of an interim response), and a suggested shift in an open query to facilitate producing a favorable response (i.e., suggested rewording of a question).

A fourth step of the providing of the query dashboard includes outputting, to a requesting entity associated with the first open query, one or more of the query dashboard information and a query response to the first open query. As a specific example of the fourth step, when the maturity level of the current response to the first open query is unfavorable, the IEI module 122 issues an IEI response 246 to the query module 124. The IEI response 246 includes the query dashboard information.

The query module 124 issues a query dashboard response 708 to the user device 12-1 associated with the first open query, otherwise, when the maturity level of the current response to the first open query is favorable, the IEI module 122 issues the IEI response 246 to the query module 124. The IEI response 246 includes a query response (i.e., a final answer). The query module 124 issues a query response 140 to the user device 12-1. The query response 140 includes the query response.

Figure 10B:
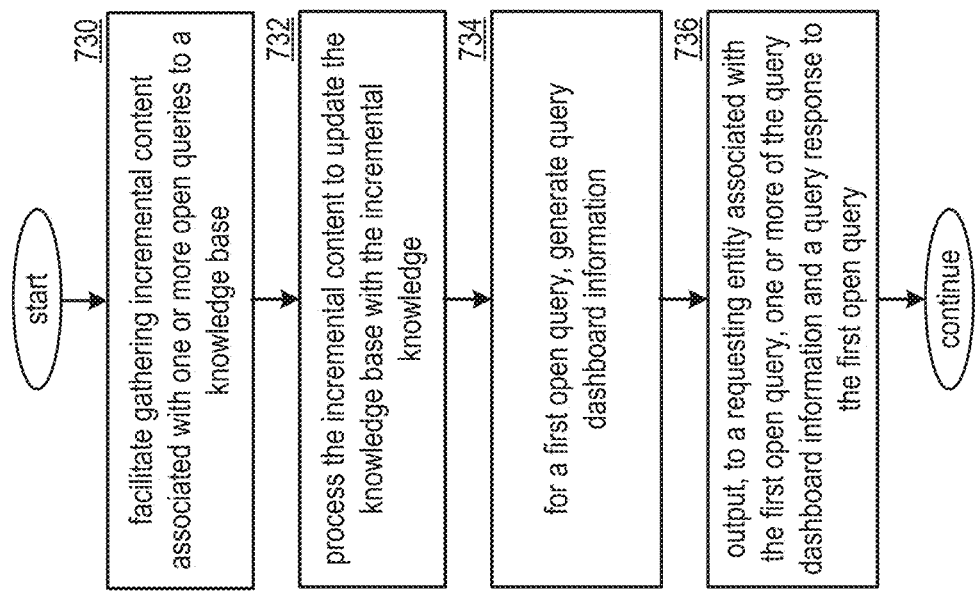
FIG. 10B is a logic diagram of an embodiment of a method for providing a query dashboard within a computing system in accordance with the present invention.

FIG. 10B is a logic diagram of an embodiment of a method for providing a query dashboard within a computing system. In particular, a method is presented for use in conjunction with one or more functions and features described in conjunction with FIGS. 1-8D, and also FIG. 10A. The method includes step 730 where a processing module of one or more processing modules of one or more computing devices of the computing system facilitates gathering incremental content associated with one or more open queries to a knowledge base.

The facilitating includes one or more of receiving queries and identifying one or more content sources of open query content sources associated with desired open query content associated with one or more of the queries (i.e., IEI process a query to produce query knowledge, compare the query knowledge to fact base information of the knowledge base, indicate together the incremental content when the comparison is unfavorable). The facilitating further includes causing the issuing of one or more open query content requests to the identified content sources of the open query content sources, and receiving one or more open query content responses that includes the incremental content.

The method continues at step 732 where the processing module processes the incremental content to update the knowledge base with incremental knowledge. For example, the processing module IEI processes the incremental content to produce the incremental knowledge (i.e., for each word of the incremental content, identify a group of identigens, for each pairwise grouping of sequential identigens, identify entigens of each of the group of identigens in accordance with rules to produce a sequence of entigens). The processing module integrates one or more portions of the sequence of entigens with entigen representations of the knowledge base to produce the updated knowledge base.

The method continues at step 734 where, for a first open query, the processing module generates query dashboard information. For example, the processing module analyzes a status of the first open query to include one or more of the query, previous interim query responses, a final query response, and a quality metric associated with a response. The first open query may further include an estimated time to next responses, one or more content descriptors associated with content required but not yet received to facilitate a response, a quality level of the open query (i.e., a maturity level of an interim response), and a suggested shift in an open query to facilitate producing the favorable response (i.e., suggested rewording of a question).

The method continues at step 736 where the processing module outputs, to a requesting entity associated with the first open query, one or more of the query dashboard information and the query response to the first open query. For example, when the maturity level of the current response to the first open query is unfavorable, the processing module issues a query dashboard response to the requesting entity associated with the first open query, otherwise, when the maturity level of the current response to the first open query is favorable, the processing module issues a query response (i.e., a final answer) to the requesting entity.

The method described above in conjunction with the processing module can alternatively be performed by other modules of the computing system 10 of FIG. 1 or by other devices. In addition, at least one memory section (e.g., a computer readable memory, a non-transitory computer readable storage medium, a non-transitory computer readable memory organized into a first memory element, a second memory element, a third memory element, a fourth element section, a fifth memory element etc.) that stores operational instructions can, when executed by one or more processing modules of one or more computing devices (e.g., one or more servers, one or more user devices) of the computing system 10, cause the one or more computing devices to perform any or all of the method steps described above.

Figure 11A:
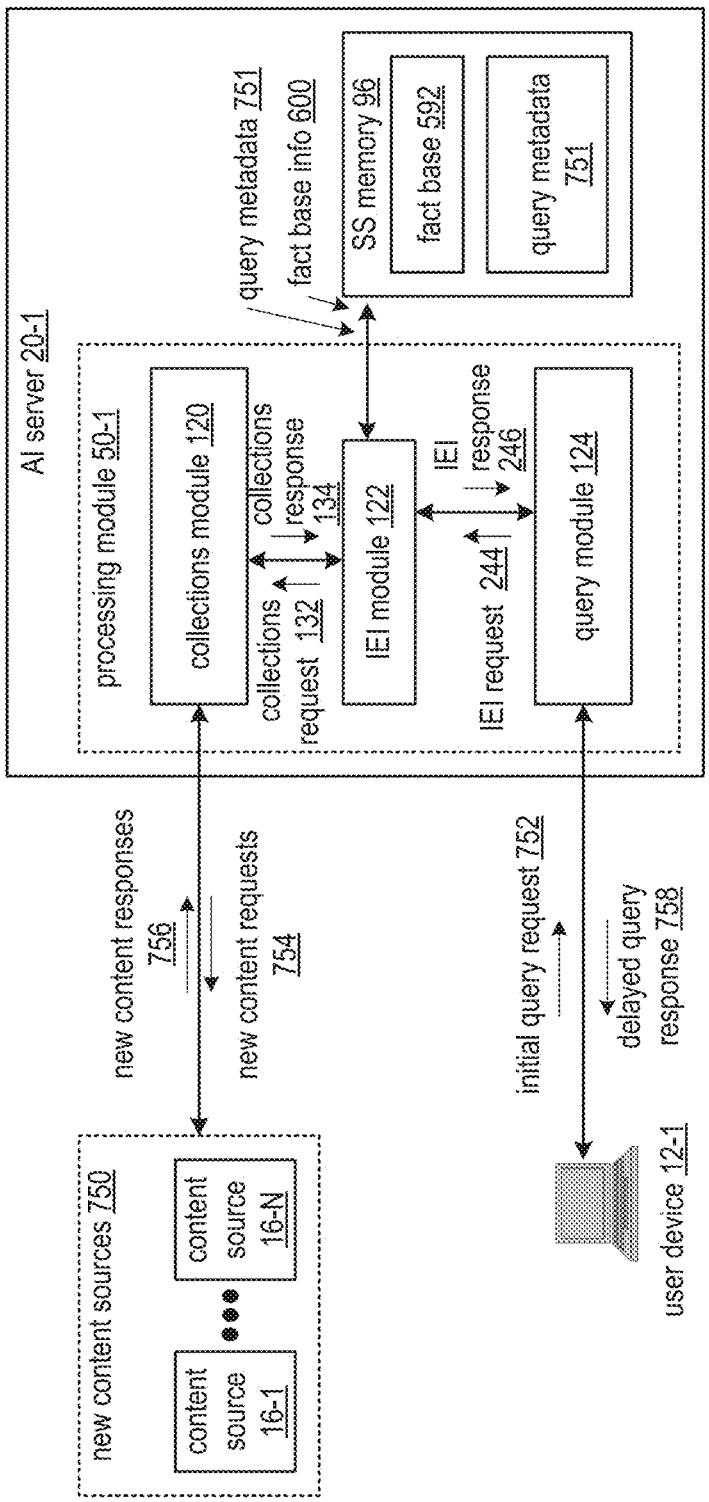
FIG. 11A is a schematic block diagram of another embodiment of a computing system in accordance with the present invention.

FIG. 11A is a schematic block diagram of another embodiment of a computing system that includes new content sources 750, the AI server 20-1 of FIG. 1, and the user device 12-1 of FIG. 1. The new content sources 750 includes the content sources 16-1 through 16-N of FIG. 1. The AI server 20-1 includes the processing module 50-1 of FIG. 2 and the SS memory 96 of FIG. 2. The processing module 50-1 includes the collections module 120 of FIG. 4A, the IEI module 122 of FIG. 4A, and the query module 124 of FIG. 4A. Generally, an embodiment of this invention presents solutions where the computing system 10 supports processing a suspended query.

The processing of the suspended query includes a series of steps. For example, a first step includes determining to suspend an open query when a maturity level of a portion of a knowledge base associated with the open query is unfavorable. As a specific example of the first step, the IEI module 122 receives an IEI request 244 from the query module 124. The query module 124 receives an initial query request 752 from the user device 12-1 and facilitates acquisition of knowledge that would provide a basis of a query response to the open query of the initial query response 752 (e.g., identify stored knowledge of the knowledge base from fact base information 600 of the fact base 592 of the SS memory 96 and may gather content associated with the open query for generation of the incremental knowledge to update the knowledge base).

When a knowledge acquisition time frame expires, the IEI module 122 indicates to suspend the open query when the maturity level of the acquired knowledge of the knowledge base that would provide the basis of the query response to the open query is less than a low maturity threshold level (i.e., not enough knowledge has been acquired at the end of the timeframe). The IEI module 122 generates query metadata 751 for storage in the SS memory 96. The query metadata 751 includes one or more of an ID of the suspended query, timeframe of query suspension, the query, ID of previous content source(s), desired incremental content, desired response quality level, content trigger, query response recipient(s), etc.

A second step of the processing of the suspended query includes determining to reactivate the suspended query when detecting an enabling condition to support generating a favorable query response. The enabling condition includes at least one of detecting that the maturity level of the portion of the knowledge base associated with the open query is favorable and detecting that new content is now available to facilitate updating of the knowledge base such that the maturity level of the portion of the knowledge base is favorable. As a specific example of the second step, the IEI module 122, when updating the knowledge base, favorably compares newly acquired content to a content trigger of the query metadata 751, retrieved from the SS memory 96, where the content trigger is associated with the suspended query, and indicates to reactivate upon the favorable comparison when improving the maturity level of the portion of the knowledge base associated with the query.

Alternatively, or in addition to, IEI module 122 receives a collections response 134 from the collections module 120 that includes new content that compares favorably to the content trigger. The collections module 120 receives new content responses 756 from the new content sources 750 in response to new content requests 754 issued to the new content sources 750 by the collections module 120 based on receiving a collections request 132 from the IEI module 122. The IEI module 122 issues the collections request 132 based on extraction of a descriptor of the desired incremental content from the query metadata 751 of the suspended query. The IEI module 122 IEI processes the incremental content to update the knowledge base (i.e., update the fact base 592), and where the IEI module 122 indicates to reactivate when the updated knowledge base may be utilized to produce the favorable query response.

A third step of the processing of the suspended query includes, when reactivating the suspended query, facilitate generating the favorable query response based on an updated knowledge base. As a specific example of the third step, the IEI module 122 processes the query to produce query knowledge, compares the query knowledge to the updated knowledge base, and extracts query response information to produce the favorable query response.

A fourth step of the processing of the suspended query includes outputting the favorable query response to at least one query response recipient. As a specific example of the fourth step, the IEI module 122 identifies, based on the query metadata 751, an identifier of at least one query response recipient, and issues an IEI response 246 to the query module 124. The IEI response 246 includes the favorable query response and the identifier of the at least one query response recipient (i.e., the user device 12-1). The query module 124 issues a delayed query response 758 to the user device 12-1. The delayed query response 758 includes the favorable query response.

Figure 11B:
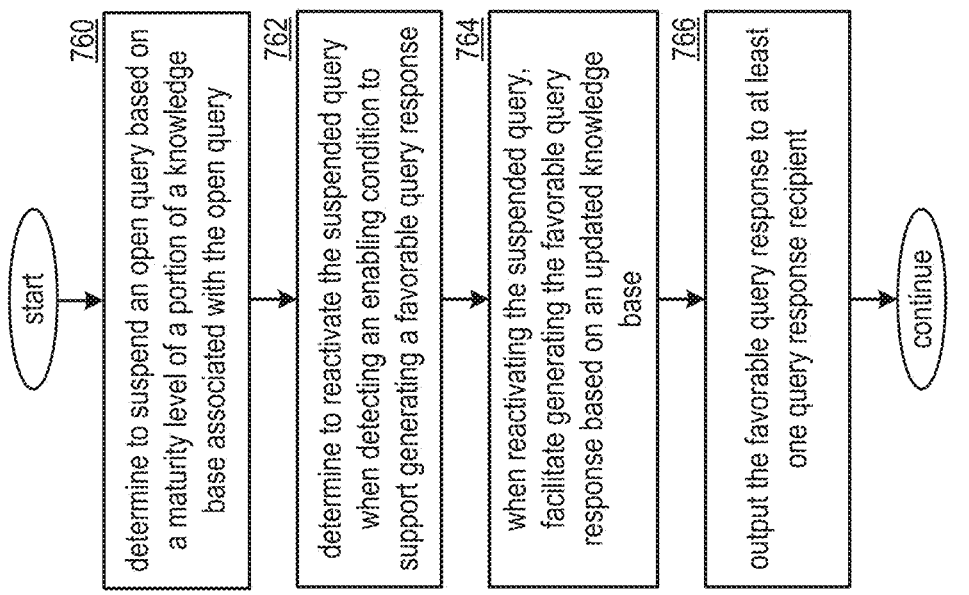
FIG. 11B is a logic diagram of an embodiment of a method for processing a suspended query within a computing system in accordance with the present invention.

FIG. 11B is a logic diagram of an embodiment of a method for processing a suspended query within a computing system. In particular, a method is presented for use in conjunction with one or more functions and features described in conjunction with FIGS. 1-8D, and also FIG. 11A. The method includes step 760 where a processing module of one or more processing modules of one or more computing devices of the computing system determines to suspend an open query based on the maturity level of a portion of a knowledge base associated with the open query. For example, the processing module receives an initial query request and facilitates acquisition of knowledge that would provide a basis of a query response to the open query of the initial query response (e.g., identify stored knowledge of the knowledge base and may gather content associated with the open query for generation of the incremental knowledge to update the knowledge base).

When a knowledge acquisition time frame expires, the processing module indicates to suspend the open query when the maturity level of the acquired knowledge of the knowledge base that would provide the basis of the query response to the open query is less than a low maturity threshold level (i.e., not enough knowledge has been acquired at the end of the timeframe). The processing module generates query metadata for storage. The query metadata includes one or more of an identifier (ID) of the suspended query, timeframe of query suspension, the query, ID of previous content source(s), desired incremental content, desired response quality level, content trigger, query response recipient(s), etc.

The method continues at step 762 where the processing module determines to reactivate the suspended query when detecting an enabling condition to support generating the favorable query response. For example, when updating the knowledge base, the processing module favorably compares newly acquired content to a content trigger of the query metadata. The content trigger is associated with the suspended query. The processing module indicates to reactivate upon the favorable comparison when improving the maturity level of the portion of the knowledge base associated with the query.

Alternatively, or in addition to, the processing module receives new content that compares favorably to the content trigger, where new content responses are received from new content sources in response to new content requests issued to the new content sources, where the new content requests are based on extraction of a descriptor of the desired incremental content from the query metadata of the suspended query. The processing module IEI processes the incremental content to update the knowledge, where the processing module indicates to reactivate the suspended query when the updated knowledge base may be utilized to produce the favorable query response.

When reactivating the suspended query, the method continues at step 764 where the processing module facilitates generating the favorable query response based on the updated knowledge base. The facilitating includes processing the query to produce query knowledge, comparing the query knowledge to the updated knowledge base, and extracting query response information to produce the favorable query response.

The method continues at step 766 where the processing module outputs the favorable query response to at least one query response recipient. For example, the processing module identifies, based on the query metadata, an identifier of at least one query response recipient, issues the favorable query response, based on the identifier of the at least one query response recipient, to the at least one query response recipient.

The method described above in conjunction with the processing module can alternatively be performed by other modules of the computing system 10 of FIG. 1 or by other devices. In addition, at least one memory section (e.g., a computer readable memory, a non-transitory computer readable storage medium, a non-transitory computer readable memory organized into a first memory element, a second memory element, a third memory element, a fourth element section, a fifth memory element etc.) that stores operational instructions can, when executed by one or more processing modules of one or more computing devices (e.g., one or more servers, one or more user devices) of the computing system 10, cause the one or more computing devices to perform any or all of the method steps described above.

FIGS. 12A-D are schematic block diagrams of another embodiment of a computing system illustrating an embodiment of a method for collecting content to remedy potentially incomplete and/or incorrect knowledge. The computing system includes the content ingestion module 300 of FIG. 5E, the element identification module 302 of FIG. 5E, the interpretation module 304 of FIG. 5E, the answer resolution module 306 of FIG. 5E, a corrective content source 780, and a knowledge database 782. In an embodiment, the corrective content source 780 is implemented utilizing one or more of the content sources 16-1 through 16-N of FIG. 1. In an embodiment, the knowledge database 782 is implemented utilizing the fact base 592 of FIG. 8A.

Figure 12A:
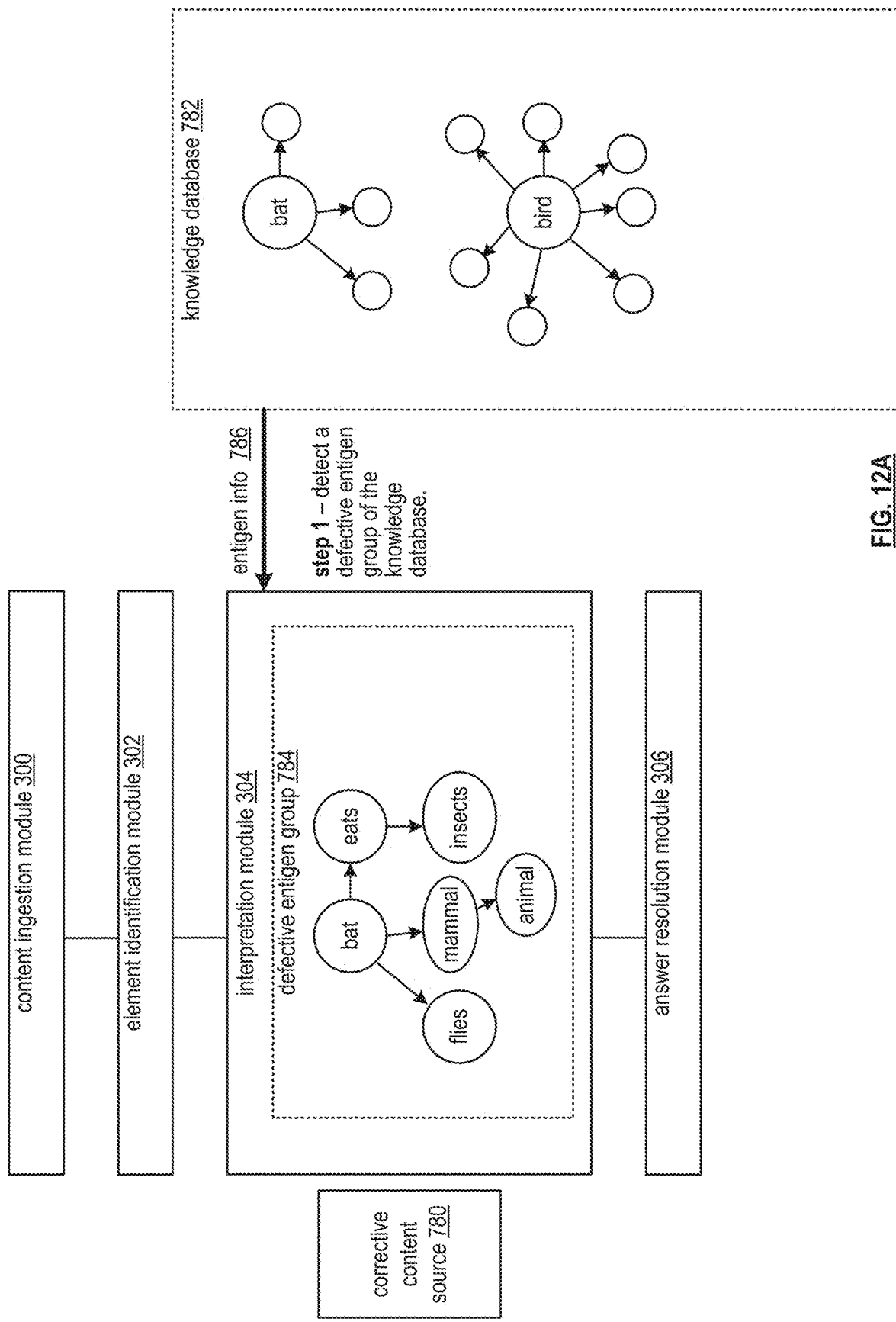
FIGS. 12A-12D are schematic block diagrams of another embodiment of a computing system illustrating an embodiment of a method for collecting content to remedy potentially incomplete and/or incorrect knowledge within a computing system in accordance with the present invention.

FIG. 12A illustrates an example of the method of the collecting content to remedy the potentially incomplete and/or incorrect knowledge where the interpretation module 304 detects a defective entigen group 784. In an embodiment, the defective entigen group 784 is generated based on new content received from the element identification module 302. In another embodiment, the defective entigen group 784 is recovered from the knowledge database 782.

The knowledge database 782 includes the defective entigen group 784 and a multitude of other entigen groups associated with a variety of topics. The defective entigen group 784 includes a plurality of entigens and one or more entigen relationships between at least some of the plurality of entigens. The defective entigen group 784 represents knowledge of a topic of the variety of topics. Examples of the entigen relationships includes "describes", "acts on", "is a", "belongs to", "did", and "did to."

The detecting of the defective entigen group 784 includes a variety of approaches. A first approach includes determining that a number of entigens of the defective entigen group 784 compares unfavorably (e.g., too few, too many, difference greater than a difference threshold) to a number of other entigens of another entigen group associated with other knowledge of another topic. The knowledge database 782 further includes the other entigen group. For example, the interpretation module 304 receives entigen information 786 from the knowledge database 782 that includes an entigen group associated with bats and another entigen group associated with birds. The interpretation module 304 determines that the bat entigen group has far fewer (e.g., more than the difference threshold number) entigens than the bird entigen group.

A second approach to detect the defective entigen group 784 includes identifying an incorrect entigen of the defective entigen group 784. For example, the interpretation module 304 detects an entigen that does not belong to the defective entigen group 784 (e.g., logically inconsistent with other entigens of the defective entigen group 784).

A third approach to detect the defective entigen group 784 includes identifying an incorrect entigen relationship between first and second entigens of the defective entigen group 784. For example, the interpretation module 304 detects an error in a listed entigen relationship between entigens of the defective entigen group 784 (e.g., logically inconsistent with other entigen relationships of the defective entigen group 784).

Figure 12B:
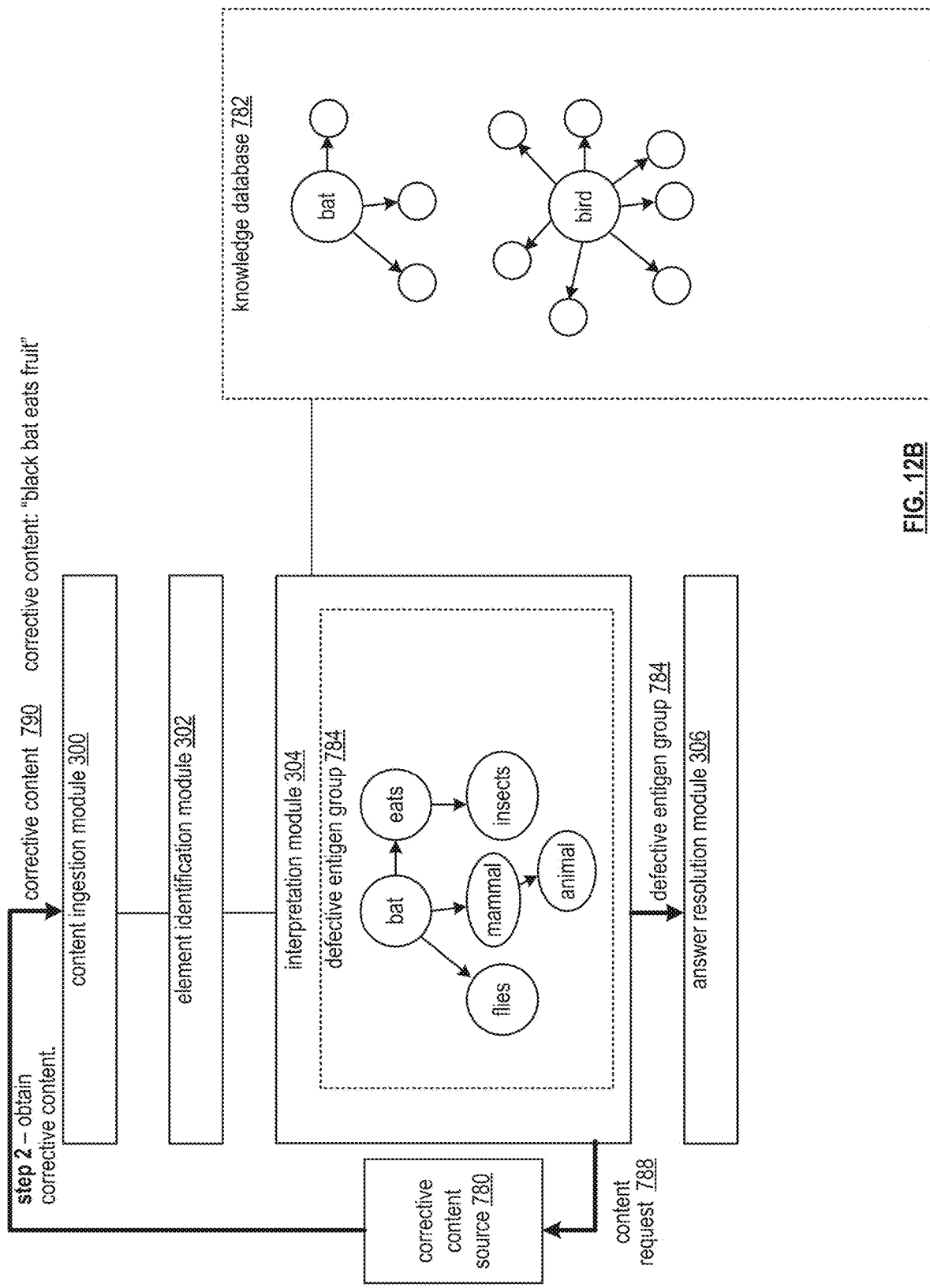

FIG. 12B further illustrates the example of the method of the collecting content to remedy the potentially incomplete and/or incorrect knowledge where the interpretation module 304 obtains corrective content 790 for the topic based on the defective entigen group 784. The obtaining includes a series of steps. A first step includes identifying a defect of the defective entigen group. The defect includes one or more of too few entigens, too many entigens, and incorrect entigen, and an incorrect entigen relationship. For example, the interpretation module 304 identifies the defect as too few entigens associated with the "bat" entigen when the other entigen group associated with birds has many more entigens.

Having identified the defect, a second step includes the interpretation module 304 identifying a content aspect based on the defect. The content aspect includes at least one of related entigens, entigen types (e.g., object, characteristic, action), and related entigen relationships. For example, the interpretation module 304 identifies the content aspect as content associated with one or more of bats, flying bats, bats that are mammals, and what bats eat.

Having identified the content aspect, a third step includes the interpretation module 304 selecting a content source based on the content aspect. The selecting includes one or more of accessing a list of content sources associated with various content aspects, identifying a content source associated with the defective entigen group 784, and identifying content sources associated with the content aspect. For example, the interpretation module 304 selects the corrective content source 780 when the corrective content source 780 is known to include content associated with bats.

Having selected the content source, a fourth step includes the interpretation module 304 obtaining the corrective content from the content source based on the content aspect. For example, the interpretation module 304 issues a content request 788 to the corrective content source 780, where the content request 788 specifies content associated with bats. In response to the content request 788, the corrective content source 780 sends the corrective content 790 to the content ingestion module 300 for further processing.

Figure 12C:
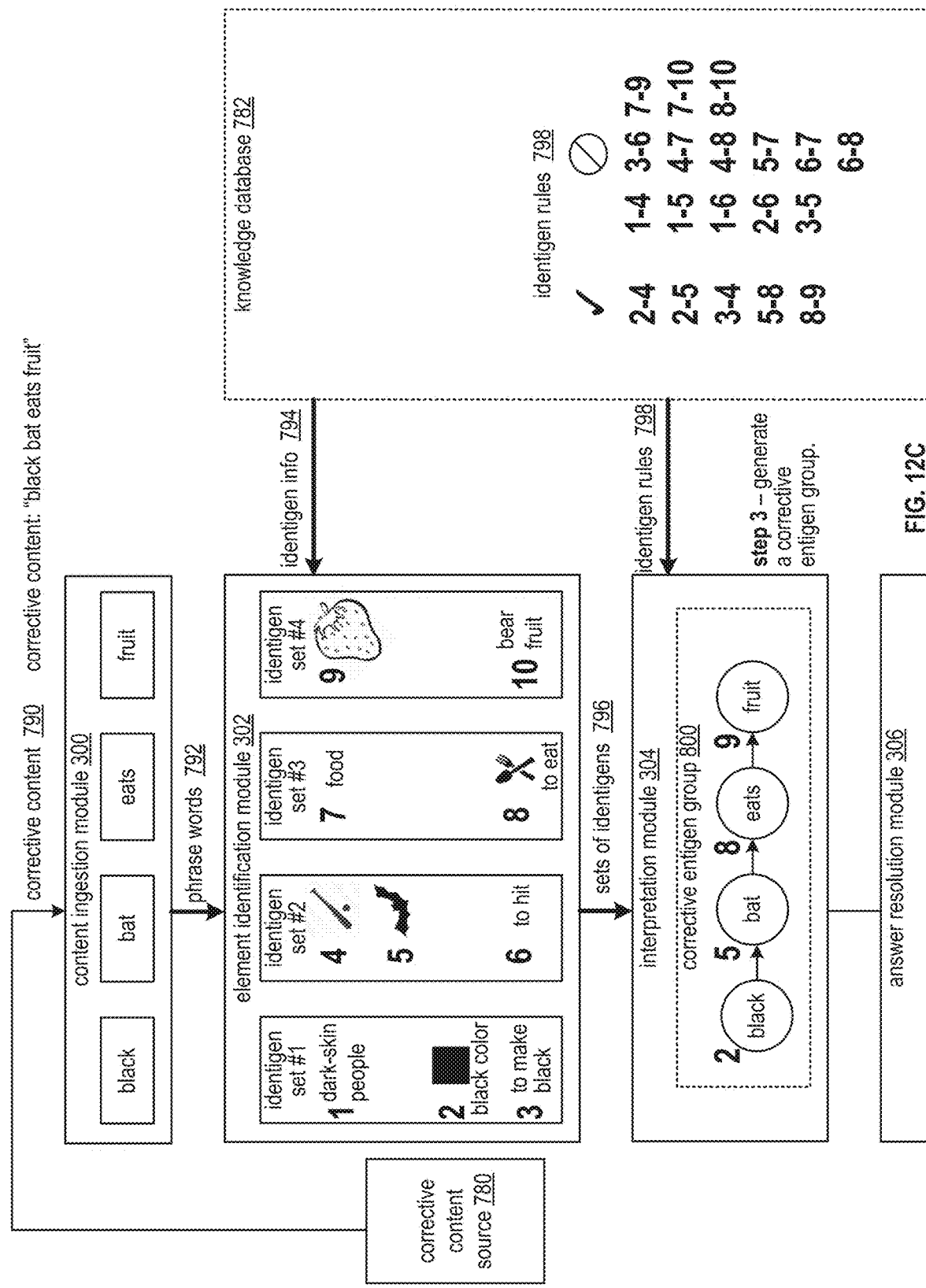

FIG. 12C further illustrates the example of the method of the collecting content to remedy the potentially incomplete and/or incorrect knowledge where the interpretation module generates a corrective entigen group 800 based on the corrective content 790. The generating of the corrective entigen group 800 includes a series of steps. A first step includes the content ingestion module 300 receiving and parsing the corrective content 790 to produce phrase words 792 that includes a plurality of words. For example, when the corrective content 790 includes "black bat eats fruit", the content ingestion module 300 produces the phrase words 792 to include "black", "bat", "eats", and "fruit."

Having received the phrase words 792, a second step of the generating the corrective entigen group 800 includes the element identification module 302 identifying a set of identigens for each word of the corrective content 790 to produce a plurality of sets of identigens (e.g., hereafter interchangeably referred to as sets of identigens 796). A set of identigens of the plurality of sets of identigens represents one or more different meanings of a word of the corrective content 790.

As an example of the identifying the sets of identigens 796, the element identification module 302 accesses the knowledge database 782 utilizing the phrase words 792 to recover identigen information 794. The identigen information 794 includes, for each word, a set of associated identigens. A set of identigens of the sets of identigens 796 includes one or more different meanings of a word of the corrective content 790. For instance, identigens of a first word of the corrective content 790 includes one or more different meanings of the first word. As a particular instance, meanings of the word "black" includes an identigen no. 1 for "dark-skin people", an identigen no. 2 for "black color", and another identigen no. 3 for "to make black."

Having received the sets of identigens 796, a third step of the generating the corrective entigen group 800 includes the interpretation module 304 identifying one valid identigen of each set of identigens of the plurality of sets of identigens by applying identigen rules 798 to the plurality of sets of identigens to produce the corrective entigen group 800. The corrective entigen group 800 represents a most likely meaning of the corrective content 790.

As an example of the identifying the one valid identigens of each set of identigens, the interpretation module accesses the knowledge database 782 to recover the identigen rules 798. The identigens rule 798 includes, for each adjacent pair of identigens of each of the sets of identigens 796, a rule to indicate validity (e.g., valid, invalid). Having recovered the identigen rule 798, the interpretation module 304 applies the identigen rule 798 to the sets of identigens 796 to produce the corrective entigen group 800. In an instance of producing the corrective entigen group 800, the interpretation module 304 determines that the identigen rule 798 indicates that a 2-5 identigen pairing is valid, a 5-8 identigen pairing is valid, and an 8-9 identigen pairing is valid to produce the corrective entigen group 800. The corrective entigen group 800 includes entigens 2, 5, 8, and 9 representing the most likely meaning of the corrective content 790 "black bat eats fruit."

Figure 12D:
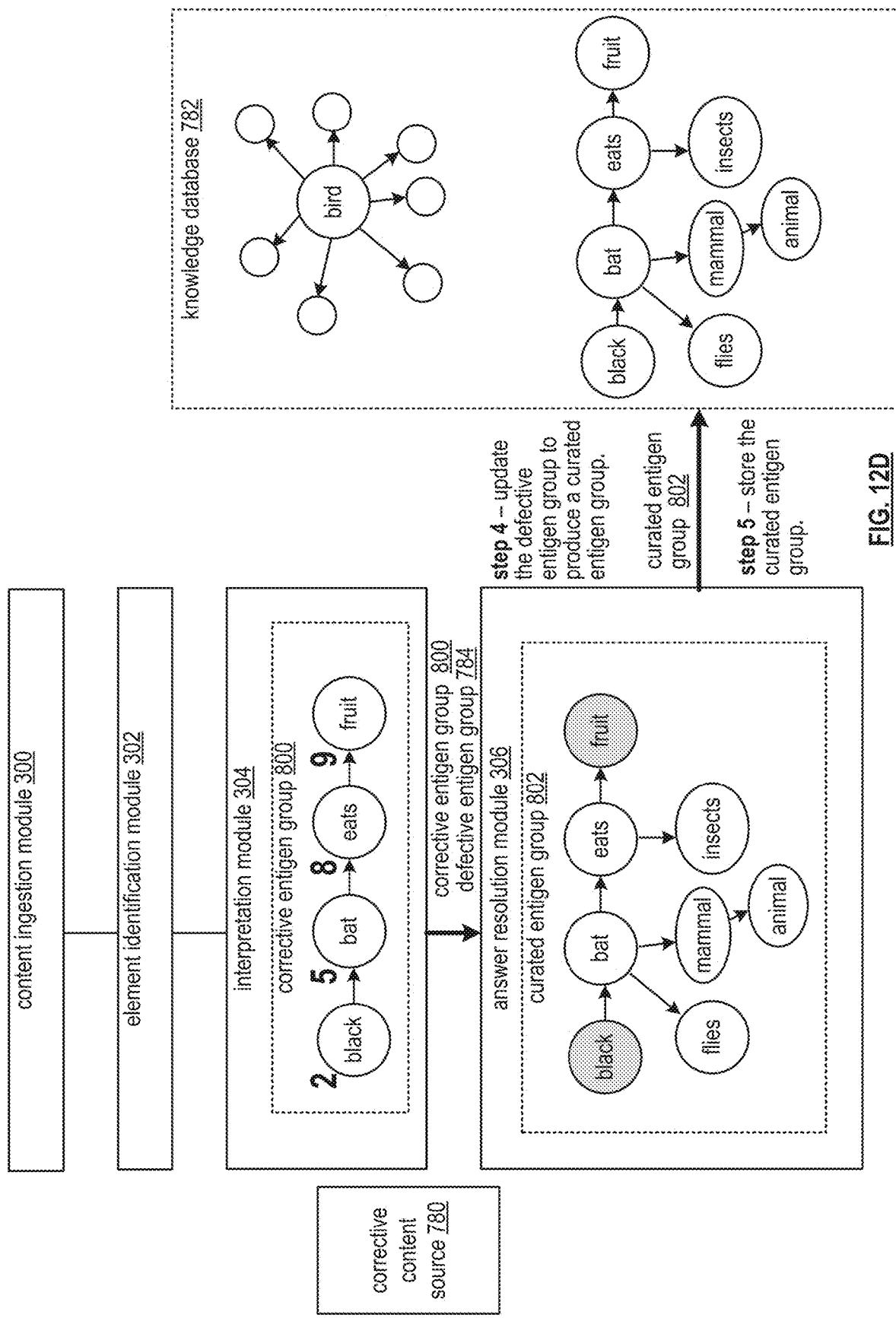

FIG. 12D further illustrates the example of the method of the collecting content to remedy the potentially incomplete and/or incorrect knowledge where the answer resolution module 306 updates the defective entigen group 784 utilizing the corrective entigen group 800 to produce a curated entigen group 802. The updating includes a variety of approaches.

A first approach of the variety of approaches includes the answer resolution module 306 replacing an incorrect entigen of the defective entigen group 784 with a correct entigen of the corrective entigen group 800. For example, the answer resolution module 306 replaces the "flies" entigen (e.g., incorrect entigen) with a "crawls" entigen (e.g., corrective entigen) when bats are known to crawl instead of fly.

A second approach of the variety of approaches includes the answer resolution module 306 updating an incorrect entigen relationship between first and second entigens of the defective entigen group 784 with a correct entigen relationship between the first and second entigens of the corrective entigen group 800. For example, the answer resolution module 306 replaces a relationship between the "eats" and "insects" entigens of the defective entigen group 784 when that relationship indicates "is a" with a relationship that indicates "does to" from the corrective entigen group 800.

A third approach of the variety of approaches includes the answer resolution module 306 augmenting the defective entigen group 784 utilizing the corrective entigen group 800 to produce the curated entigen group 802. For example, the answer resolution module 306 attaches the "black" entigen of the corrective entigen group 800 to the "bat" entigen of the defective entigen group 784 and attaches the "fruit" entigen of the corrective entigen group 800 to the "eats" entigen of the defective entigen group 784 to produce the curated entigen group 802. The overall method described above may repeat until a favorable entigen group associated with bats is produced.

Having produced the curated entigen group 802, the method further includes the answer resolution module 306 storing the curated entigen group 802 in the knowledge database 782. The storing includes one of replacing the defective entigen group 784 of the knowledge database 782 with the curated entigen group 802 or augmenting the defective entigen group 784 of the knowledge database 782 with the curated entigen group 802.

The method described above in conjunction with any module can alternatively be performed by any modules of the computing system 10 of FIG. 1 or by other devices. In addition, at least one memory section (e.g., a computer readable memory, a non-transitory computer readable storage medium, a non-transitory computer readable memory organized into a first memory element, a second memory element, a third memory element, a fourth element section, a fifth memory element etc.) that stores operational instructions can, when executed by one or more processing modules of one or more computing devices (e.g., one or more servers, one or more user devices) of the computing system 10, cause the one or more computing devices to perform any or all of the method steps described above.

Figure 13A:
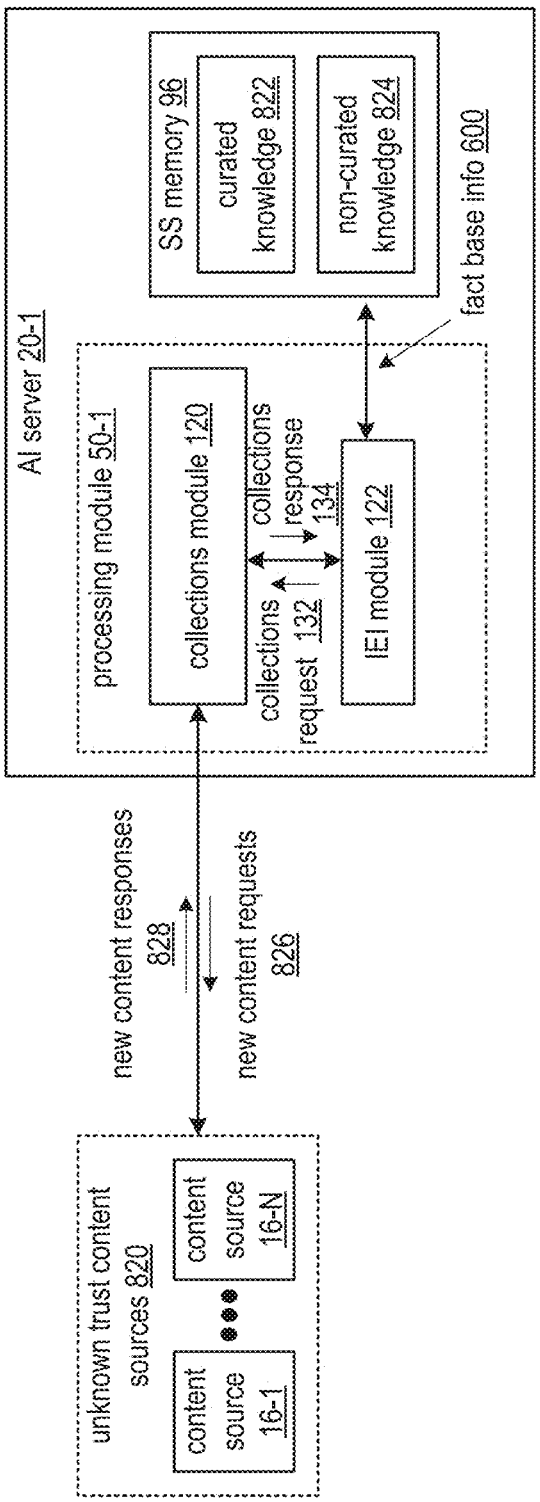
FIG. 13A is a schematic block diagram of another embodiment of a computing system in accordance with the present invention.

FIG. 13A is a schematic block diagram of another embodiment of a computing system that includes unknown trust content sources 820 and the AI server 20-1 of FIG. 1. The unknown trust content sources 820 includes the content sources 16-1 through 16-N of FIG. 1. The AI server 20-1 includes the processing module 50-1 of FIG. 2 and the SS memory 96 of FIG. 2. The processing module 50-1 includes the collections module 120 of FIG. 4A and the IEI module 122 of FIG. 4A. the SS memory 96 includes curated knowledge 822 and non-curated knowledge 824 Generally, an embodiment of this invention presents solutions where the computing system 10 supports curating of new knowledge.

The curating of the new knowledge includes a series of steps. For example, a first step includes IEI processing new content to produce incremental knowledge. As a specific example of the first step, the IEI module 122 issues a collections request 132 to the collections module 120, where the collections module 120 issues one or more new content request 826 to content sources 16-1 through 16-N of the unknown trust content sources 820. The collections module 120 receives one or more new content responses 828 from the unknown trust content sources 820, where the new content responses 828 includes the new content (e.g., content that has not been curated such that a correctness level is unknown, etc.).

The collections module 120 issues a collections response 134 to the IEI module 122, where the collections response 134 includes the new content. The IEI module 122 IEI processes the new content to produce the incremental knowledge.

A second step of the curating of the new knowledge includes, when the incremental knowledge is non-redundant with regards to a knowledge base, determining whether the incremental knowledge is true (e.g., verifiable), false (e.g., verified as false), or unknown (e.g., unverifiable). As a specific example of the second step, the IEI module 122 indicates that the incremental knowledge is non-redundant when a comparison of the incremental knowledge with knowledge of the knowledge base (e.g., fact base information 600 from the SS memory 96) is unfavorable (e.g., not the same). The IEI module 122 applies one or more verification tests to the incremental knowledge, indicates whether true, false, or unknown, where the verification tests may further include comparing to another knowledge base, inferring based on current knowledge of the knowledge base, and processing a response from a trusted content and/or knowledge source.

A third step of the curating of the new knowledge includes, when the incremental knowledge is true, integrating the incremental knowledge with the knowledge base as curated knowledge. As a specific example of the third step, the IEI module 122 modifies a portion of curated knowledge 822 to include the incremental knowledge when the incremental knowledge is true (e.g., recover curated knowledge 822 from the SS memory 96, integrate the incremental knowledge with the curated knowledge 822 to produce updated curated knowledge 822 for storage as fact base information 600 in the SS memory 96).

A fourth step of the curating of the new knowledge includes, when the incremental knowledge is unknown, determining whether the incremental knowledge conflicts with the knowledge base. As a specific example of the fourth step, the IEI module 122 compares a portion of the knowledge base to the incremental knowledge and indicates conflict when the comparison is unfavorable (e.g., conflicting facts etc.)). For instance, the IEI module 122 compares fact base information 600 recovered from the SS memory 96 to the incremental knowledge and indicates the conflict when the comparison indicates a contradiction.

A fifth step of the curating of the new knowledge includes, when the incremental knowledge does not conflict with the knowledge base, integrating the incremental knowledge with the knowledge base as curated knowledge. As a specific example of the first step, the IEI module 122 modifies a portion of curated knowledge 822 to include the incremental knowledge.

A sixth step of the curating of the new knowledge includes, when the incremental knowledge conflicts with the knowledge base, integrating the incremental knowledge with the knowledge base as non-curated knowledge. As a specific example of the sixth step, the IEI module 122 modifies a portion of non-curated knowledge 824 to include the incremental knowledge. For instance, the IEI module 122 recovers non-curated knowledge 824 from the SS memory 96, integrates the incremental knowledge with the non-curated knowledge 824 to produce updated non-curated knowledge 824 for storage as fact base information 600 in the SS memory 96.

Figure 13B:
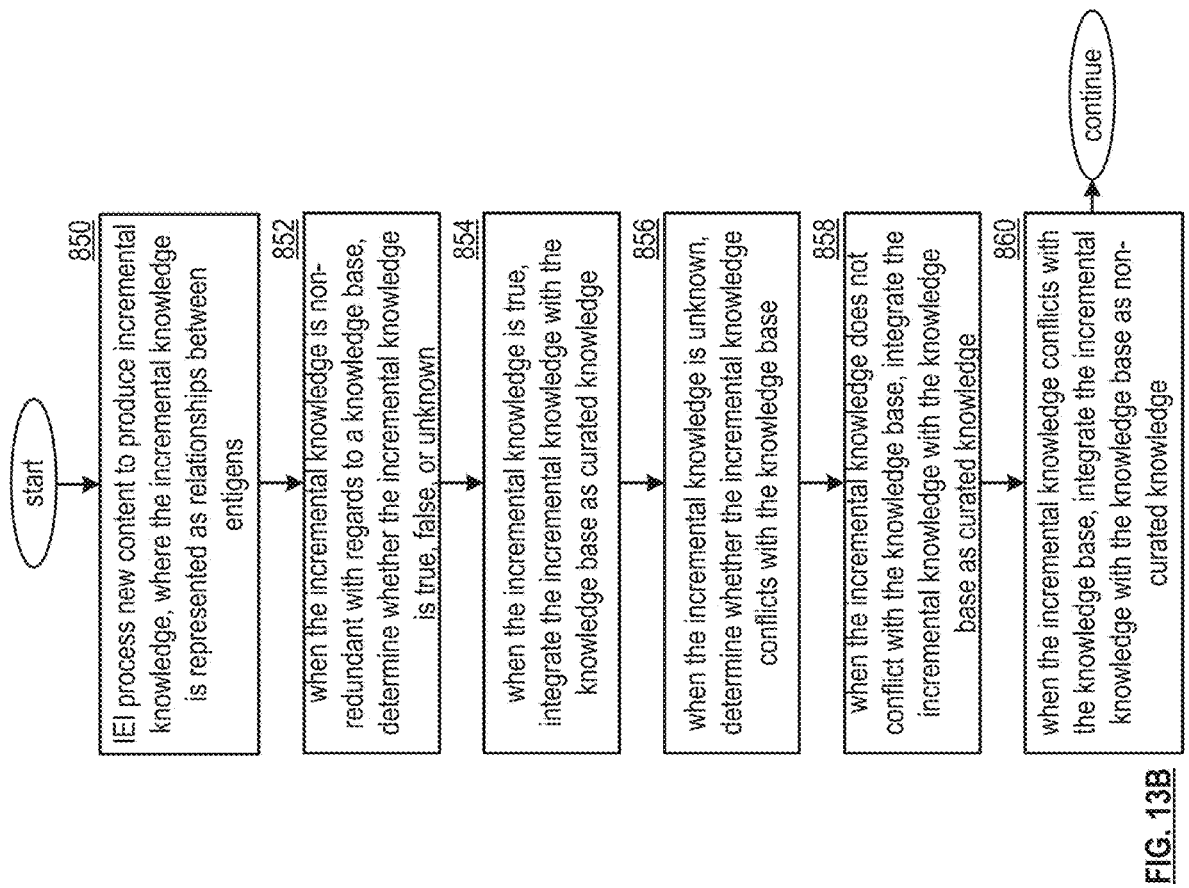
FIG. 13B is a logic diagram of an embodiment of a method for curating new knowledge within a computing system in accordance with the present invention.

FIG. 13B is a logic diagram of an embodiment of a method for curating new knowledge within a computing system. In particular, a method is presented for use in conjunction with one or more functions and features described in conjunction with FIGS. 1-8D, and also FIG. 13A. The method includes step 850 where a processing module of one or more processing modules of one or more computing devices of the computing system IEI processes new content to produce incremental knowledge, where the incremental knowledge is represented as relationships between entigens. For example, the processing module obtains the new content from one or more unknown trust content sources and IEI processes the new content to produce incremental knowledge (e.g., of unknown trust).

When the incremental knowledge is non-redundant with regards to a knowledge base, the method continues at step 852 where the processing module determines whether the incremental knowledge is true, false, or unknown. For example, the processing module indicates that the incremental knowledge is non-redundant when a comparison of the incremental knowledge with knowledge of the knowledge base is unfavorable (e.g., not the same), applies one or more verification tests to the incremental knowledge and indicates whether true, false, or unknown. The verification tests include one or more of comparing to another knowledge base, inferring based on current knowledge of the knowledge base, and processing the response from a trusted content and/or knowledge source.

When the incremental knowledge is true, the method continues at step 854 where the processing module integrates the incremental knowledge with the knowledge base as curated knowledge. For example, the processing module modifies a portion of curated knowledge of the knowledge base to include the incremental knowledge.

When the incremental knowledge is unknown, the method continues at step 856 where the processing module determines whether the incremental knowledge conflicts with the knowledge base. For example, the processing module compares a portion of the knowledge base to the incremental knowledge and indicates the conflict when the comparison is unfavorable (e.g., conflicting facts, etc.).

When the incremental knowledge does not conflict with the knowledge base, the method continues at step 858 where the processing module integrates the incremental knowledge with the knowledge base as curated knowledge. For example, the processing module modifies a portion of curated knowledge of the knowledge base to include the incremental knowledge.

When the incremental knowledge conflicts with the knowledge base, the method continues at step 860 where the processing module integrates the incremental knowledge with the knowledge base as non-curated knowledge. For example, the processing module modifies a portion of non-curated knowledge of the knowledge base to include the incremental knowledge.

The method described above in conjunction with the processing module can alternatively be performed by other modules of the computing system 10 of FIG. 1 or by other devices. In addition, at least one memory section (e.g., a computer readable memory, a non-transitory computer readable storage medium, a non-transitory computer readable memory organized into a first memory element, a second memory element, a third memory element, a fourth element section, a fifth memory element etc.) that stores operational instructions can, when executed by one or more processing modules of one or more computing devices (e.g., one or more servers, one or more user devices) of the computing system 10, cause the one or more computing devices to perform any or all of the method steps described above.

Figure 14A:
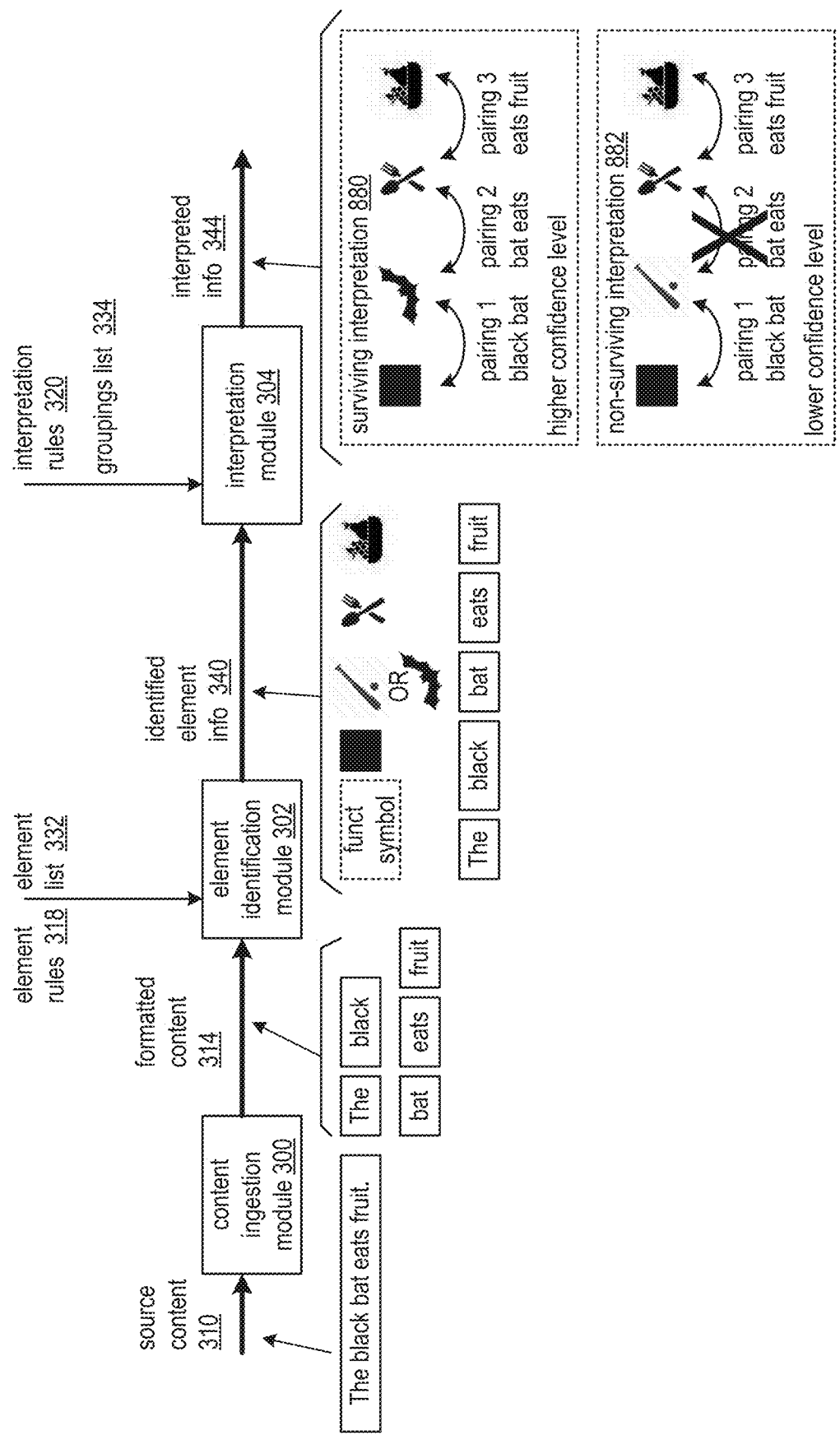
FIGS. 14A and 14B are schematic block diagrams of another embodiment of a computing system in accordance with the present invention.
Figure 14B:
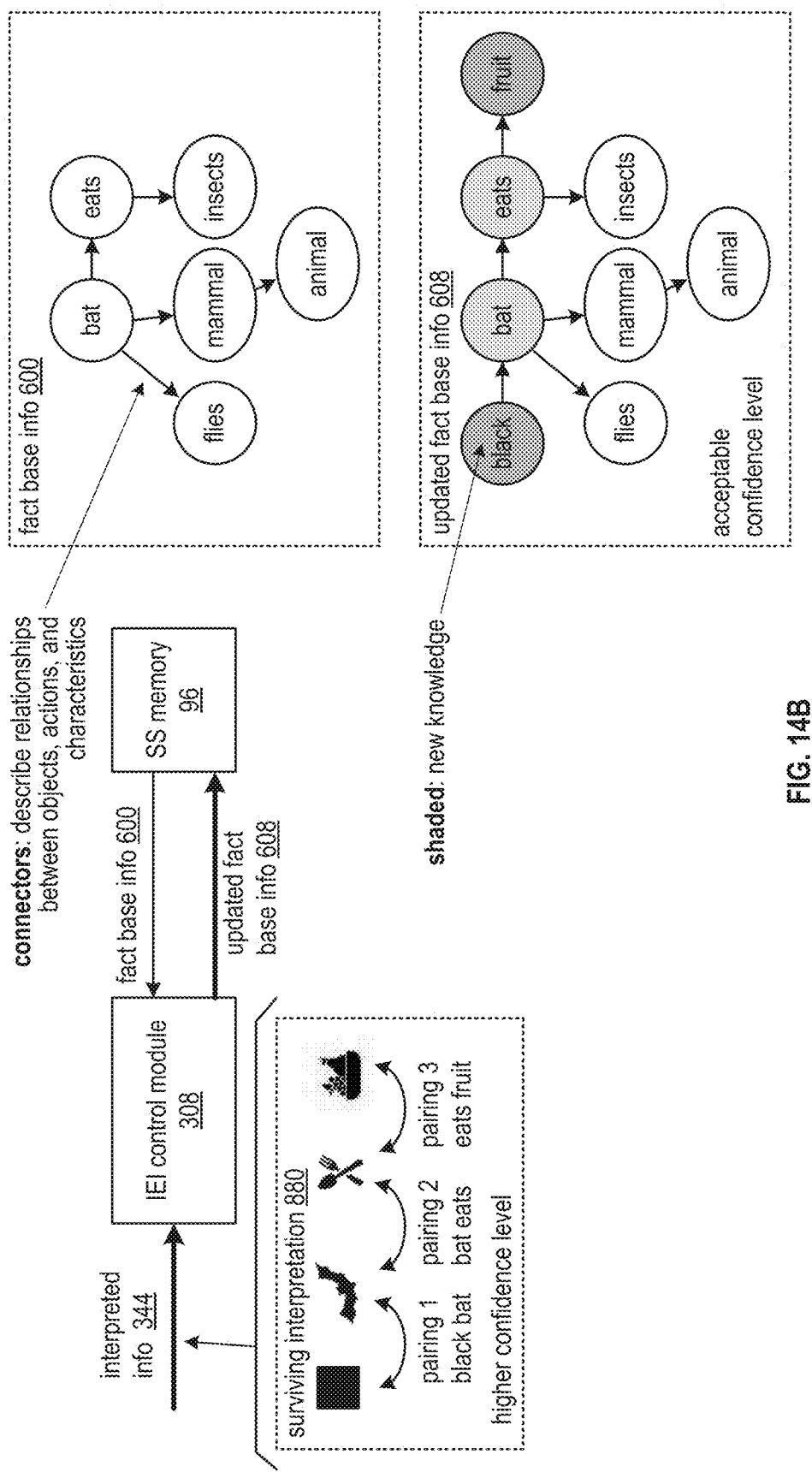

FIGS. 14A and 14B are schematic block diagrams of another embodiment of a computing system that includes the content ingestion module 300 of FIG. 5E, the element identification module 302 of FIG. 5E, the interpretation module 304 of FIG. 5E, the IEI control module 308 of FIG. 5E, and the SS memory 96 of FIG. 2. Generally, an embodiment of this invention presents solutions where the computing system 10 supports processing content to produce knowledge utilizing a confidence level.

The processing of the content to produce the knowledge utilizing the confidence level includes a series of steps. For example, a first step includes identifying words of an ingested phrase to produce tokenized words. As depicted in FIG. 14A, a specific example of the first step includes the content ingestion module 300 comparing words of source content 310 to dictionary entries to produce formatted content 314 that includes identifiers of known words. For instance, the content ingestion module 300 identifies words "the", "black", "bat", "eats", and "fruit" when the ingested phrase includes "The black bat eats fruit."

A second step of the processing of the content to produce the knowledge utilizing the confidence level includes, for each tokenized word, identifying one or more identigens that correspond the tokenized word, where each identigen describes one of an object, a characteristic, and an action. As depicted in FIG. 14A, a specific example of the second step includes the element identification module 302 performing a look up of identigen identifiers, utilizing an element list 332 and in accordance with element rules 318, of the one or more identigens associated with each tokenized word of the formatted content 314 to produce identified element information 340.

A unique identifier is associated with each of the potential object, the characteristic, and action (OCA) associated with a particular tokenized word. For instance, the element identification module 302 identifies a functional symbol for "the", identifies a single identigen for "black", identifies two identigens for "bat" (e.g., baseball bat and flying bat), identifies a single identigen for "eats", and identifies a single identigen for "fruit."

A third step of the processing of the content to produce the knowledge utilizing the confidence level includes, for each permutation of sequential combinations of identigens, generating a corresponding equation package (i.e., candidate interpretation), where the equation package includes a sequential linking of pairs of identigens. Each sequential linking pairs a preceding identigen to a next identigen. An equation element describes a relationship between paired identigens (OCAs) such as describes, acts on, is a, belongs to, did, did to, etc.

Multiple OCAs occur for a common word when the word has multiple meanings (e.g., a baseball bat, a flying bat). As depicted in FIG. 14A, a specific example of the third step includes the interpretation module 304, for each permutation of identigens of each tokenized word of the identified element information 340, including with all other permutations of all other tokenized words to generate the equation packages in accordance with interpretation rules 320 and a groupings list 334. For instance, the interpretation module 304 produces a first equation package that includes a first pairing of a black bat (e.g., flying bat), the second pairing of bat eats (e.g., the flying bat eats), and a third pairing of eats fruit, and the interpretation module 304 produces a second equation package that includes a first pairing of a black bat (e.g., baseball bat), the second pairing of bat eats (e.g., the baseball bat eats), and a third pairing of eats fruit.

A fourth step of the processing of the content to produce the knowledge utilizing the confidence level includes selecting a surviving equation package associated with a most favorable confidence level. As depicted in FIG. 14A, a specific example of the fourth step includes the interpretation module 304 applying interpretation rules 320 (i.e., inference, pragmatic engine, utilizing the identifiers of the identigens to match against known valid combinations of identifiers of entigens) to reduce the number of permutations of the sequential combinations of identigens to produce interpreted information 344 that includes identification of at least one equation package as a surviving interpretation 880 (e.g., higher confidence level).

Non-surviving equation packages are eliminated that compare unfavorably to pairing rules and/or are associated with an unfavorable confidence level to produce a non-surviving interpretation 882 (e.g., lower confidence level), where a confidence level is assigned to each equation package such that a higher confidence level indicates that the equation package includes equation elements that are substantially the same as in other equation packages (i.e., more consistency). For instance, the interpretation module 304 eliminates the equation package that includes the second pairing indicating that the "baseball bat eats" which is inconsistent with one or more of the groupings list 334 and the interpretation rules 320 and selects the equation package associated with the "flying bat eats" which is favorably consistent with the one or more of the groupings list 334 and the interpretation rules 320.

A fifth step of the processing of the content to produce the knowledge utilizing the confidence level includes integrating knowledge of the surviving equation package into a knowledge base. For example, integrating at least a portion of the reduced OCA combinations into a graphical database to produce updated knowledge. As another example, the portion of the reduced OCA combinations may be translated into rows and columns entries when utilizing a rows and columns database rather than a graphical database.

As depicted in FIG. 14B, a specific example of the fifth step includes the IEI control module 308 recovering fact base information 600 from SS memory 96 to identify a portion of the knowledge base for potential modification utilizing the OCAs of the surviving equation package (i.e., compare a pattern of relationships between the OCAs of the surviving equation package from the interpreted information 344 to relationships of OCAs of the portion of the knowledge base including new confidence levels). The steps further includes the IEI control module 308 determining modifications (e.g., additions, subtractions, further clarifications required when information is complex, etc.) to the portion of the knowledge base based on the new confidence levels (i.e., add the element "black" as a "describes" relationship of an existing bat OCA and add the element "fruit" as a eats "does to" relationship), and implement the modifications to the portion of the fact base information 600 to produce updated fact base information 608 for storage in the SS memory 96.

Figure 14C:
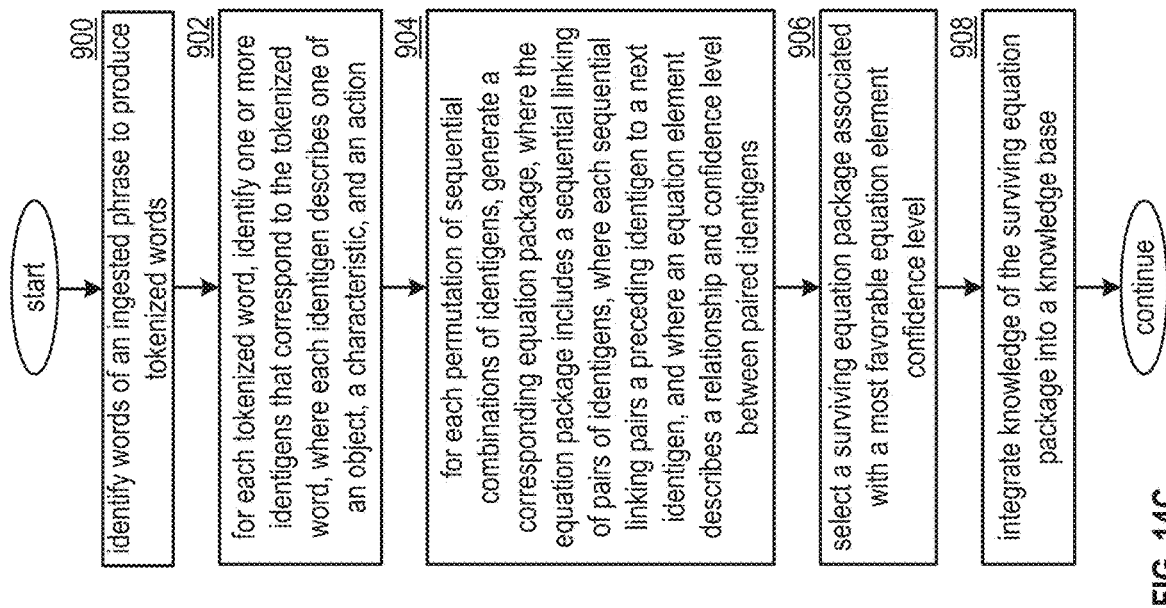
FIG. 14C is a logic diagram of an embodiment of a method for processing content to produce knowledge utilizing a confidence level within a computing system in accordance with the present invention.

FIG. 14C is a logic diagram of an embodiment of a method for processing content to produce knowledge utilizing a confidence level within a computing system. In particular, a method is presented for use in conjunction with one or more functions and features described in conjunction with FIGS. 1-8D, 14A, and also FIG. 14B. The method includes step 900 where a processing module of one or more processing modules of one or more computing devices of the computing system identifies words of an ingested phrase to produce tokenized words. The identified includes comparing words to known words of dictionary entries to produce identifiers of known words.

For each tokenized word, the method continues at step 902 where the processing module identifies one or more identigens that corresponds to the tokenized word, where each identigen describes one of an object, a characteristic, and an action. The identifying includes performing a lookup of identifiers of the one or more identigens associated with each tokenized word, where the different identifiers associated with each of the potential object, the characteristic, and the action associated with the tokenized word.

For each permutation of sequential combinations of identigens, the method continues at step 904 where the processing module generates a corresponding equation package, where the equation package includes a sequential linking of pairs of identigens. Each sequential linking pairs a preceding identigen to a next identigen. An equation element describes a relationship and confidence level between paired identigens. For example, for each permutation of identigens of each tokenized word, the processing module includes with all other permutations of all other tokenized words to generate the equation packages. A confidence level is assigned to each equation package such that a higher confidence level indicates that the equation package is associated with equation elements that are substantially the same as in other equation packages (i.e., more consistency).

The method continues at step 906 where the processing module selects a surviving equation package associated with a most favorable equation element confidence level. For example, the processing module applies rules (i.e., inference, pragmatic engine, utilizing the identifiers of the identigens to match against known valid combinations of identifiers of entigens) to reduce the number of permutations of the sequential combinations of identigens to identify at least one equation package. Non-surviving equation packages are eliminated that compare unfavorably to pairing rules and/or are associated with an unfavorable confidence level.

The method continues at step 908 where the processing module integrates knowledge of the surviving equation package into a knowledge base. For example, the processing module integrates at least a portion of the reduced OCA combinations into a graphical database to produce updated knowledge. For instance, the processing module recovers fact base information from storage of the knowledge base to identify a portion of the knowledge base for potential modification utilizing the OCAs of the surviving equation package (i.e., compare a pattern of relationships between the OCAs of the surviving equation package to relationships of OCAs of the portion of the knowledge base). The processing module determines modifications (e.g., additions, subtractions, further clarifications required when information complex, etc.) to the portion of the knowledge base and implements the modifications to the portion of the fact base information to produce updated fact base information for storage in the portion of the knowledge base.

The method described above in conjunction with the processing module can alternatively be performed by other modules of the computing system 10 of FIG. 1 or by other devices. In addition, at least one memory section (e.g., a computer readable memory, a non-transitory computer readable storage medium, a non-transitory computer readable memory organized into a first memory element, a second memory element, a third memory element, a fourth element section, a fifth memory element etc.) that stores operational instructions can, when executed by one or more processing modules of one or more computing devices (e.g., one or more servers, one or more user devices) of the computing system 10, cause the one or more computing devices to perform any or all of the method steps described above.

Figure 15A:
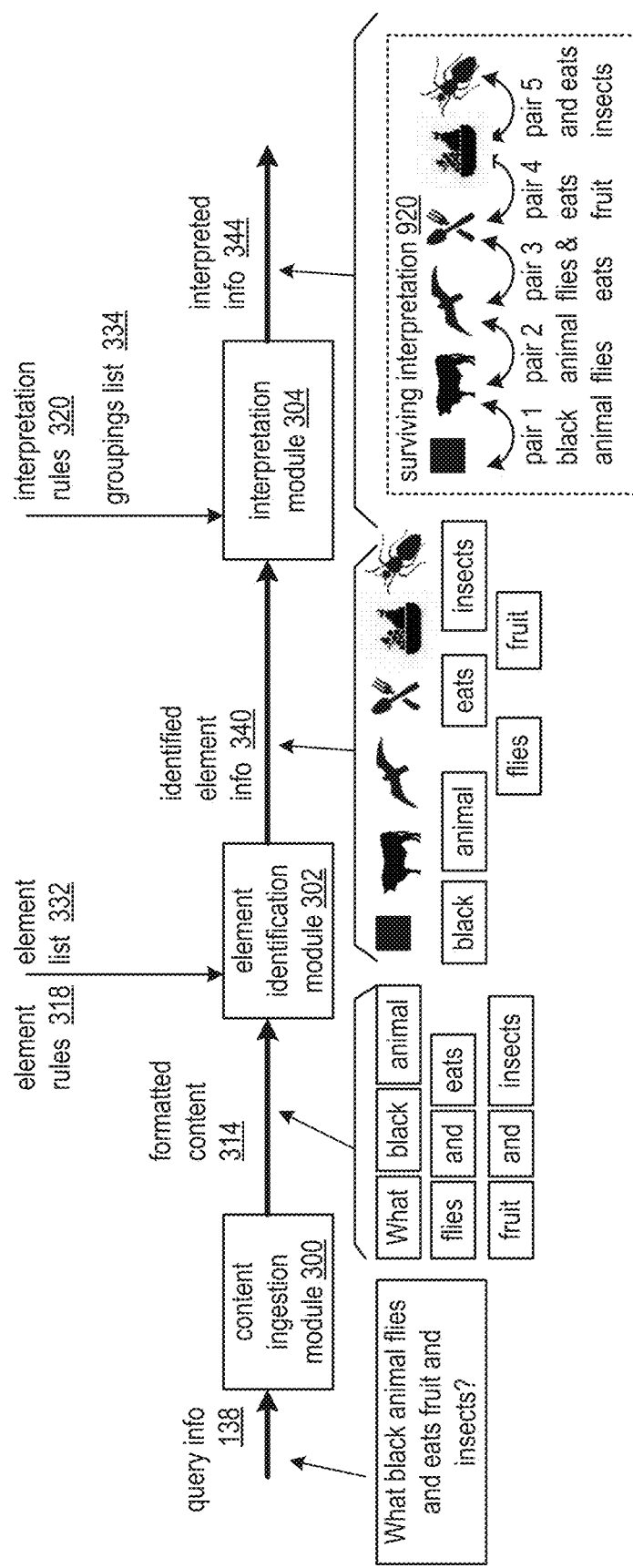
FIGS. 15A and 15B are schematic block diagrams another embodiment of a computing system in accordance with the present invention.
Figure 15B:
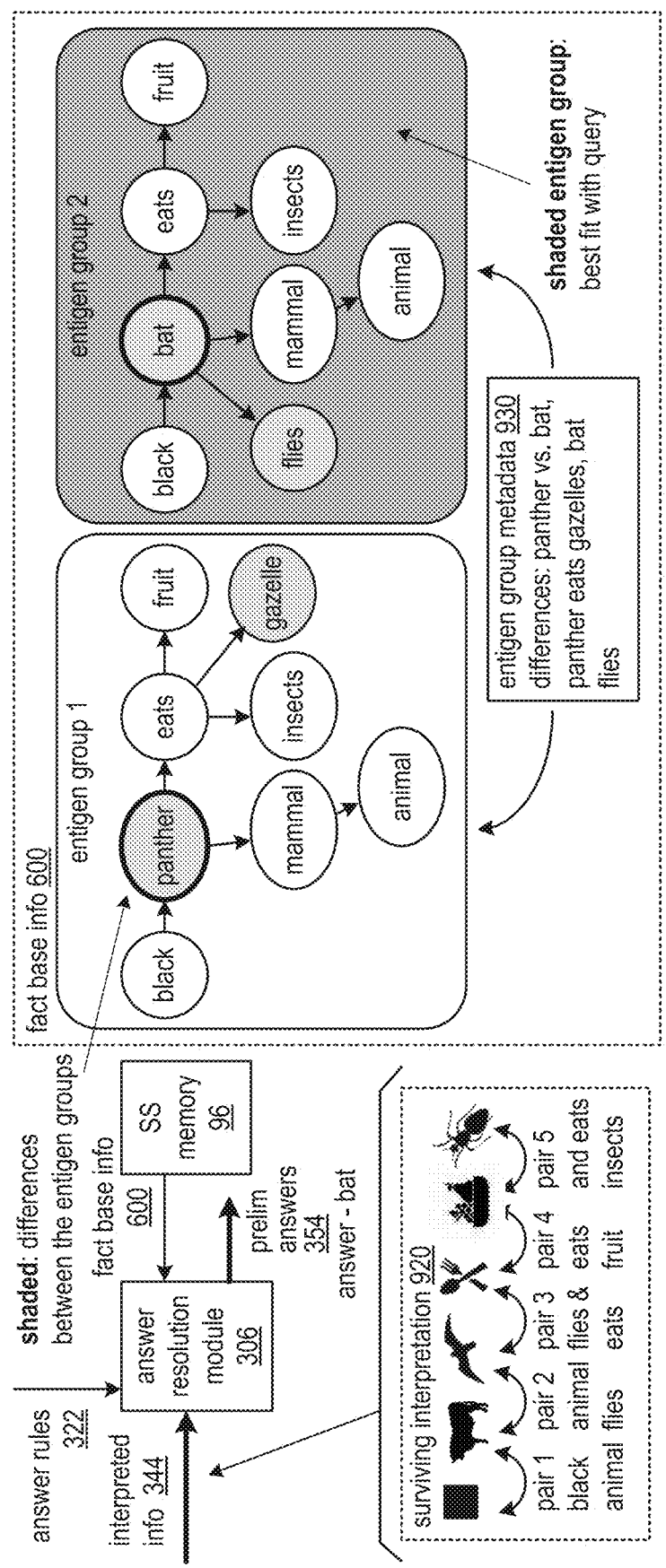

FIGS. 15A and 15B are schematic block diagrams of another embodiment of a computing system that includes the content ingestion module 300 of FIG. 5E, the element identification module 302 of FIG. 5E, the interpretation module 304 of FIG. 5E, the answer resolution module 306 of FIG. 5E, and the SS memory 96 of FIG. 2. Generally, an embodiment of this invention presents solutions where the computing system 10 supports for generating a query response to a query.

The generating of the query response to the query includes a series of steps. For example, a first step includes identifying words of an ingested query to produce tokenized words. As depicted in FIG. 15A, a specific example of the first step includes the content ingestion module 300 comparing words of query info 138 to dictionary entries to produce formatted content 314 that includes identifiers of known words. For instance, the content ingestion module 300 produces identifiers for each word of the query "what black animal flies and eats fruit and insects?"

A second step of the generating of the query response to the query includes, for each tokenized word, identifying one or more identigens that correspond the tokenized word, where each identigen describes one of an object, a characteristic, and an action. As depicted in FIG. 15A, a specific example of the second step includes the element identification module 302 performing a look up of identifiers, utilizing an element list 332 and in accordance with element rules 318, of the one or more identigens associated with each tokenized word of the formatted content 314 to produce identified element information 340. A unique identifier is associated with each of the potential object, the characteristic, and action associated with a particular tokenized word. For instance, the element identification module 302 produces a single identigen identifier for each of the black color, an animal, flies, eats, fruit, and insects.

A third step of the generating of the query response to the query includes, for each permutation of sequential combinations of identigens, generating a corresponding equation package (i.e., candidate interpretation), where the equation package includes a sequential linking of pairs of identigens. Each sequential linking pairs a preceding identigen to a next identigen. An equation an element describes a relationship between paired identigens (OCAs) such as describes, acts on, is a, belongs to, did, did to, etc.

As depicted in FIG. 15A, a specific example of the third step includes the interpretation module 304, for each permutation of identigens of each tokenized word of the identified element information 340, generating the equation packages in accordance with interpretation rules 320 and a groupings list 334 to produce a series of equation elements that include pairings of identigens. For instance, the interpretation module 304 generates a first pairing to describe a black animal, a second pairing to describe an animal that flies, a third pairing to describe flies and eats, a fourth pairing to describe eats fruit, and a fifth pairing to describe eats fruit and insects.

A fourth step of the generating the query response to the query includes selecting a surviving equation package associated with a most favorable interpretation. As depicted in FIG. 15A, a specific example of the fourth step includes the interpretation module 304 applying the interpretation rules 320 (i.e., inference, pragmatic engine, utilizing the identifiers of the identigens to match against known valid combinations of identifiers of entigens) to reduce the number of permutations of the sequential combinations of identigens to produce interpreted information 344.

The interpreted information 344 includes identification of at least one equation package as a surviving interpretation 920. Non-surviving equation packages, if any, are eliminated that compare unfavorably to pairing rules to produce a non-surviving interpretation.

A fifth step of the generating the query response to the query includes utilizing a knowledge base, generating a query response to the surviving equation package of the query, where attributes of the surviving equation package are compared to attributes of one or more portions of the knowledge base to identify a corresponding portion of the knowledge base associated with a favorable comparison. The comparison includes at least one of directly comparing attributes to find a favorable match and comparing the attributes of the surviving equation package to major attributes and/or reader attribute comparisons of one or more groups of entigens associated with the one or more portions of the knowledge base.

As depicted in FIG. 15B, a specific example of the fifth step includes the answer resolution module 306 interpreting the surviving interpretation 920 of the interpreted information 344 in accordance with answer rules 322 to generate the attributes of the surviving equation package, accessing fact base information 600 from the SS memory 96 to identify the one or more portions of the knowledge base associated with likely favorable comparisons of the attributes of the surviving equation package to attributes of the groups of entigens, and selecting one of the entigen groups based on comparing the attributes of the entigen group with the attributes of the surviving equation package (i.e., align favorable comparison entigens without conflicting entigens).

The fifth step further includes comparing differences of entigen group metadata 930 to quickly identify the entigen group with a most favorable comparison (i.e., while a black animal that eats fruits and insects, a panther does not fly, but a bat flies and eats fruit and insects). The fifth step further includes generating preliminary answers 354 to include a query response to the query (i.e., a bat is a black animal that flies and eats fruit and insects is associated with entigen group 2)).

Figure 15C:
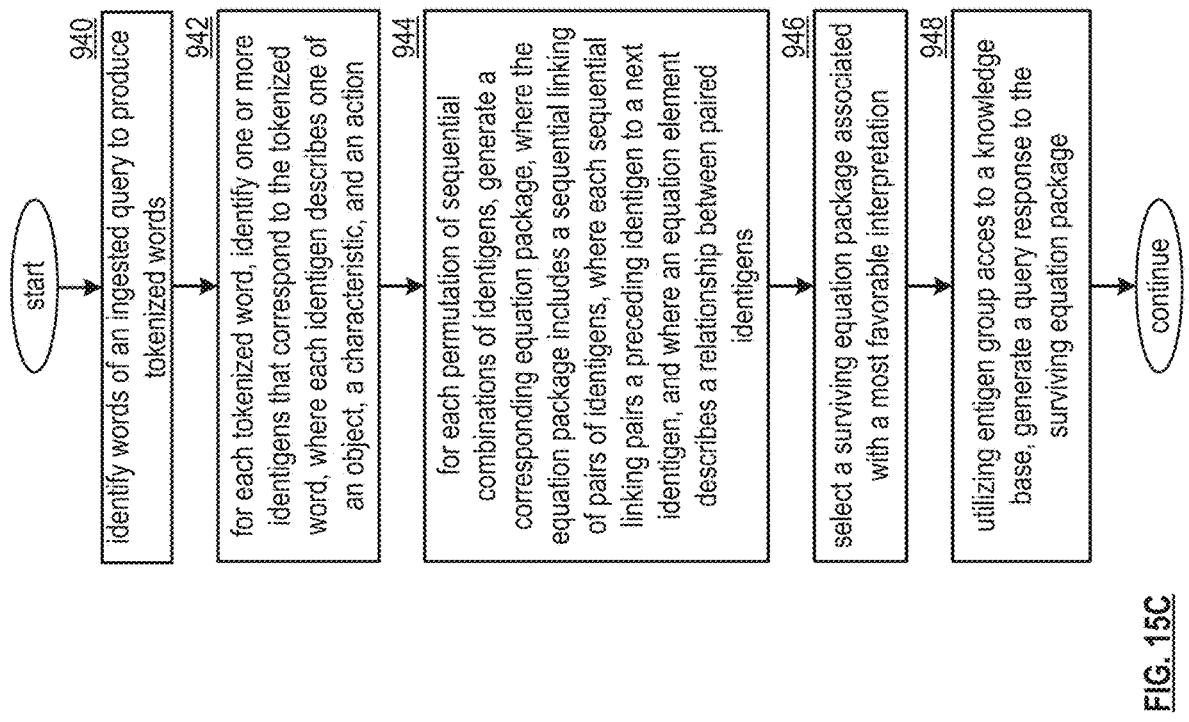
FIG. 15C is a logic diagram of an embodiment of a method for generating a query response to a query utilizing groupings within a knowledge base within a computing system in accordance with the present invention.

FIG. 15C is a logic diagram of an embodiment of a method for generating a query response to a query utilizing groupings within a knowledge base within a computing system. In particular, a method is presented for use in conjunction with one or more functions and features described in conjunction with FIGS. 1-8D, 15A, and also FIG. 15B. The method includes step 940 where a processing module of one or more processing modules of one or more computing devices of the computing system identifies words of an ingested query to produce tokenized words. For example, the processing module compares words to known words of dictionary entries to produce identifiers of known words.

For each tokenized word, the method continues at step 942 where the processing module identifies one or more identigens that correspond to the tokenized word, where each identigen describes one of an object, a characteristic, and an action. For example, the processing module performs a lookup of identifiers of the one or more identigens associated with each tokenized word, where different identifiers associated with each permutation of a potential object, characteristic, and action associated with the tokenized word.

For each permutation of sequential combinations of identigens, the method continues at step 944 where the processing module generates a corresponding equation package, where the equation package includes a sequential linking of pairs of identigens, where each sequential linking pairs a preceding identigen to a next identigen. An equation element describes a relationship between paired identigens. For example, for each permutation of identigens of each tokenized word, the processing module includes, with all other permutations of all other tokenized words, to generate the equation packages.

The method continues at step 946 where the processing module selects a surviving equation package associated with a most favorable interpretation. For example, the processing module applies rules (i.e., inference, pragmatic engine, utilizing the identifiers of the identigens to match against known valid combinations of identifiers of entigens) to reduce the number of permutations of the sequential combinations of identigens to identify at least one equation package. Non-surviving equation packages are eliminated the compare unfavorably to pairing rules.

The method continues at step 948 where the processing module, utilizing entigen group access to a knowledge base, generates a query response to the surviving equation package (e.g., the query). Attributes of the surviving equation package are compared to attributes of one or more portions of the knowledge base to identify a corresponding portion of the knowledge base associated with a favorable comparison. The comparison includes at least one of directly comparing attributes to find a favorable match and comparing the attributes of the surviving equation package to major attributes and/or reader attribute comparisons of one or more groups of entigens associated with the one or more portions of the knowledge base.

As an example of generating the query response, the processing module interprets the surviving the equation package in accordance with answer rules to generate the attributes of the surviving equation package, accesses fact base information of the knowledge base to identify the one or more portions of the knowledge base associated with likely favorable comparisons of the attributes of the surviving equation package to attributes of the groups of entigens, and selects one of the entigen groups based on comparing the attributes of the entigen group with the attributes of the surviving equation package (i.e., align favorable comparison entigens without conflicting entigens). The example further includes comparing differences of entigen group metadata to quickly identify the entigen group with a most favorable comparison, and generates preliminary answers to include a query response to the query.

The method described above in conjunction with the processing module can alternatively be performed by other modules of the computing system 10 of FIG. 1 or by other devices. In addition, at least one memory section (e.g., a computer readable memory, a non-transitory computer readable storage medium, a non-transitory computer readable memory organized into a first memory element, a second memory element, a third memory element, a fourth element section, a fifth memory element etc.) that stores operational instructions can, when executed by one or more processing modules of one or more computing devices (e.g., one or more servers, one or more user devices) of the computing system 10, cause the one or more computing devices to diverse content sources 960

Figure 16A:
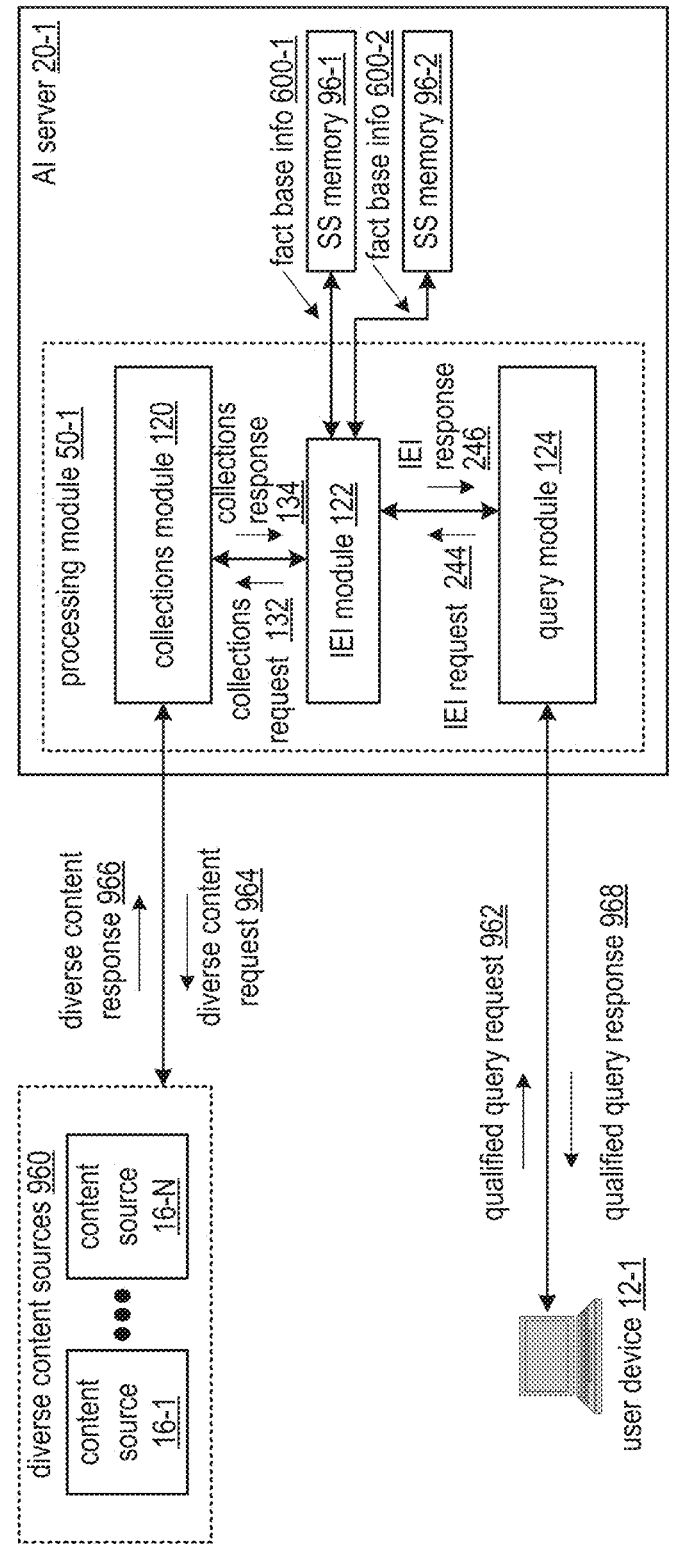
FIG. 16A is a schematic block diagram of another embodiment of a computing system in accordance with the present invention.

FIG. 16A is a schematic block diagram of another embodiment of a computing system that includes diverse content sources 960, the AI server 20-1 of FIG. 1, and the user device 12-1 of FIG. 1. The diverse content sources 960 includes the content sources 16-1 through 16-N of FIG. 1. The AI server 20-1 includes the processing module 50-1 of FIG. 2 and the SS memory 96 of FIG. 2. The processing module 50-1 includes the collections module 120 of FIG. 4A, the IEI module 122 of FIG. 4A, and the query module 124 of FIG. 4A. Generally, an embodiment of this invention presents solutions where the computing system 10 supports generating a query response to a query utilizing a confidence level.

The generating of the query response to the query utilizing the confidence level includes a series of steps. For example, the first step includes determining an approach to generating a query response to a query, where the query response is generated utilizing knowledge contained in two or more knowledge bases. Diverse content is ingested to produce knowledge stored in the two for more knowledge bases.

As a specific example of the first step, based on one or more of a predetermination, historical quality levels of query responses, and extracting guidance from the query, where when extracting the guidance from the query, the IEI module 122 receives an IEI request 244 from the query module 124. The IEI module 122 extracts the approach from a query of the IEI request 244, where the query module 124 receives a qualified query request 962 from the user device 12-1. The qualified query request 962 includes one or more of a desired minimum confidence level and identifier of a query response selection approach (i.e., a highest confidence level, a blended response, etc.).

When the diverse content is ingested, further steps includes the IEI module 122 issuing a collections request 132 to the collections module 120, where the collections module 120 issues one or more diverse content requests 964 to content sources 16-1 through 16-N of the diverse content sources 960. The collections module 120 issues a collections response 134 to the IEI module 122 based on received diverse content responses 966 that include the diverse content.

The IEI module 122 extracts the diverse content from the collections response 134. The IEI module 122 IEI processes the source content to produce incremental knowledge for storage as fact base information 600-1 and/or 600-2 in one or more of the SS memories 96-1 and 96-2 (i.e., mostly a first type of knowledge stored in a first memory and mostly a second type of knowledge stored in a second memory where the first type of knowledge and a second type of knowledge may overlap).

A second step of the generating of the query response to the query utilizing the confidence level includes generating, for each knowledge base of the two or more knowledge bases, a corresponding query response utilizing the approach to generating the query response. As a specific example of the second step, for each knowledge base, the IEI module 122 IEI processes the query from the qualified query request 962 to produce query knowledge. The IEI module 122 accesses a portion of the knowledge base corresponding to the query knowledge to produce a corresponding query response (i.e., the IEI module 122 recovers fact base information 600-1 from the SS memory 96-1 for a first knowledge base for locating of the first portion of the first knowledge base that corresponds favorably to the query knowledge, etc.).

A third step of generating the query response to the query utilizing the confidence level includes generating, for each query response, a corresponding confidence level. As a specific example of the third step, the IEI module 122 compares each query response to each other query response to generate comparisons and indicates a higher confidence level for a particular query response when a comparison of the particular query response to other query responses are more favorable (e.g., more similar responses).

A fourth step of the generating the query response to the query utilizing the confidence level includes generating a qualified query response utilizing the query responses and based on the approach to generating the query response and based on the corresponding confidence levels. As a specific example of the fourth step, the IEI module 122 generates the qualified query response in accordance with the approach (i.e., selecting a query response with the highest confidence level, combining query responses when confidence levels are favorable and subtle differences exists in two or more query responses of the combination, etc.). The IEI module 122 issues an IEI response 246 to the query module 124, where the IEI response 246 includes the qualified query response 968. The query module 124 sends the qualified query response 968 to the user device 12-1.

Figure 16B:
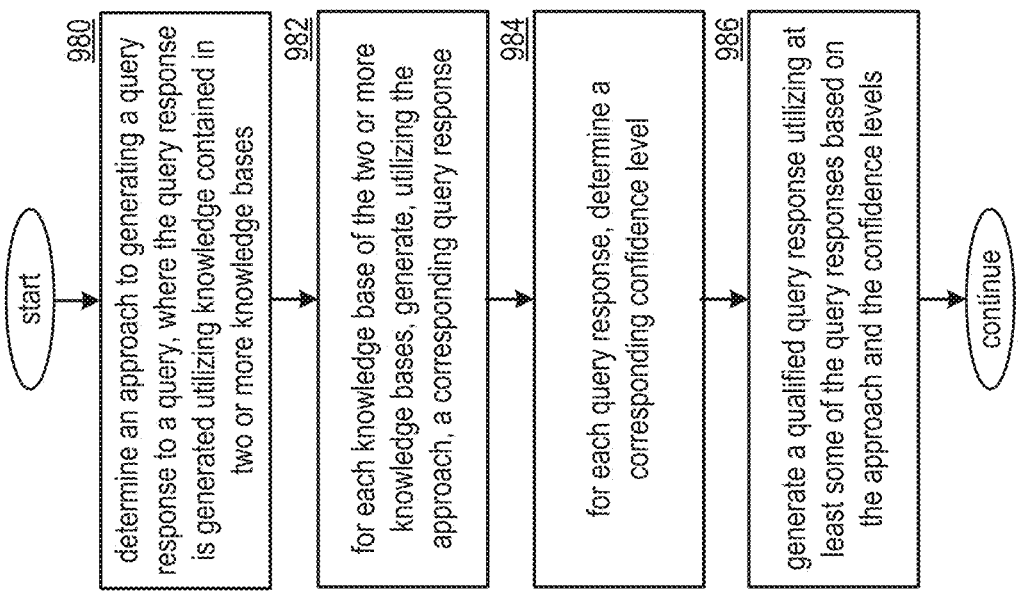
FIG. 16B is a logic diagram of an embodiment of a method for generating a query response to a query utilizing a confidence level within a computing system in accordance with the present invention.

FIG. 16B is a logic diagram of an embodiment of a method for generating a query response to a query utilizing a confidence level within a computing system. In particular, a method is presented for use in conjunction with one or more functions and features described in conjunction with FIGS. 1-8D, and also FIG. 16A. The method includes step 980 where a processing module of one or more processing modules of one or more computing devices of the computing system determines an approach to generating a query response to a query.

The query response is generated utilizing knowledge contained in two or more knowledge bases. Diverse content may be ingested to produce knowledge stored in the two or more knowledge bases. For example, the processing module, based on one or more of a predetermination, historical quality levels of query responses, and extracting guidance from the query, where when extracting the guidance from the query, receives a qualified query request. The processing module extracts the approach, where the qualified query request includes one or more of the query, a desired minimum confidence level, an identifier of a query response selection approach (i.e., a highest confidence level, a blended response, etc.).

When the diverse content is ingested, the processing module causes issuing of one or more diverse content requests to content sources of diverse content sources and receives diverse content responses that include the diverse content. The processing module extracts the diverse content from diverse content responses and IEI processes the diverse content to produce incremental knowledge for storage as fact base information in storage of the two or more knowledge bases (i.e., mostly a first type of knowledge stored in a first portion of the storage and mostly a second type of knowledge stored in a second portion of the storage where the first type of knowledge and a second type of knowledge may overlap).

For each knowledge base of the two or more knowledge bases, the method continues at step 982 where the processing module generates, utilizing the approach, a corresponding query response. For example, for each knowledge base, the processing module IEI processes the query from the qualified query request to produce query knowledge and accesses a portion of the knowledge base corresponding to the query knowledge to produce a corresponding query response (i.e., processing module recovers fact base information from a first portion of storage of a first knowledge base for locating of the first portion of the first knowledge base that corresponds favorably to the query knowledge, etc.).

For each query response, the method continues at step 984 where the processing module determines a corresponding confidence level. For example, the processing module compares each query response to each other query response to generate comparisons and indicates a higher confidence level for a particular query response when a comparison of the particular query response to other query responses are more favorable (e.g., more similar responses).

The method continues at step 986 for the processing module generates a qualified query response utilizing at least some of the query responses based on the approach and the confidence levels. For example, the processing module generates the qualified query response in accordance with the approach (i.e., selecting a query response with a highest confidence level, combining query responses one confidence levels are favorable and subtle differences exist in two or more query responses of the combinations, etc.), and issues the qualified query response to a query response recipient.

The method described above in conjunction with the processing module can alternatively be performed by other modules of the computing system 10 of FIG. 1 or by other devices. In addition, at least one memory section (e.g., a computer readable memory, a non-transitory computer readable storage medium, a non-transitory computer readable memory organized into a first memory element, a second memory element, a third memory element, a fourth element section, a fifth memory element etc.) that stores operational instructions can, when executed by one or more processing modules of one or more computing devices (e.g., one or more servers, one or more user devices) of the computing system 10, cause the one or more computing devices to perform any or all of the method steps described above.

Figure 17A:
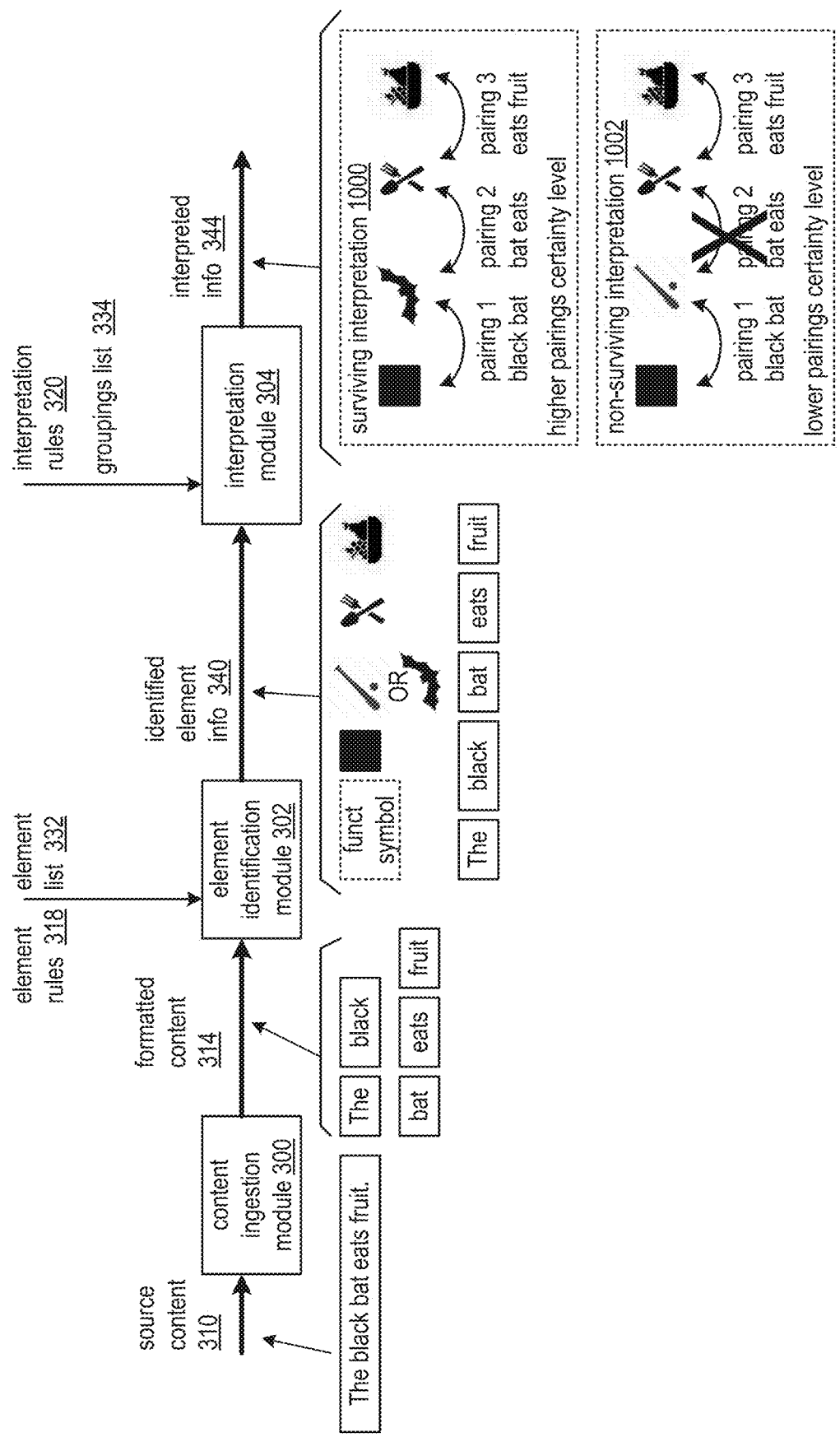
FIGS. 17A and 17B are schematic block diagrams of another embodiment of a computing system in accordance with the present invention.
Figure 17B:
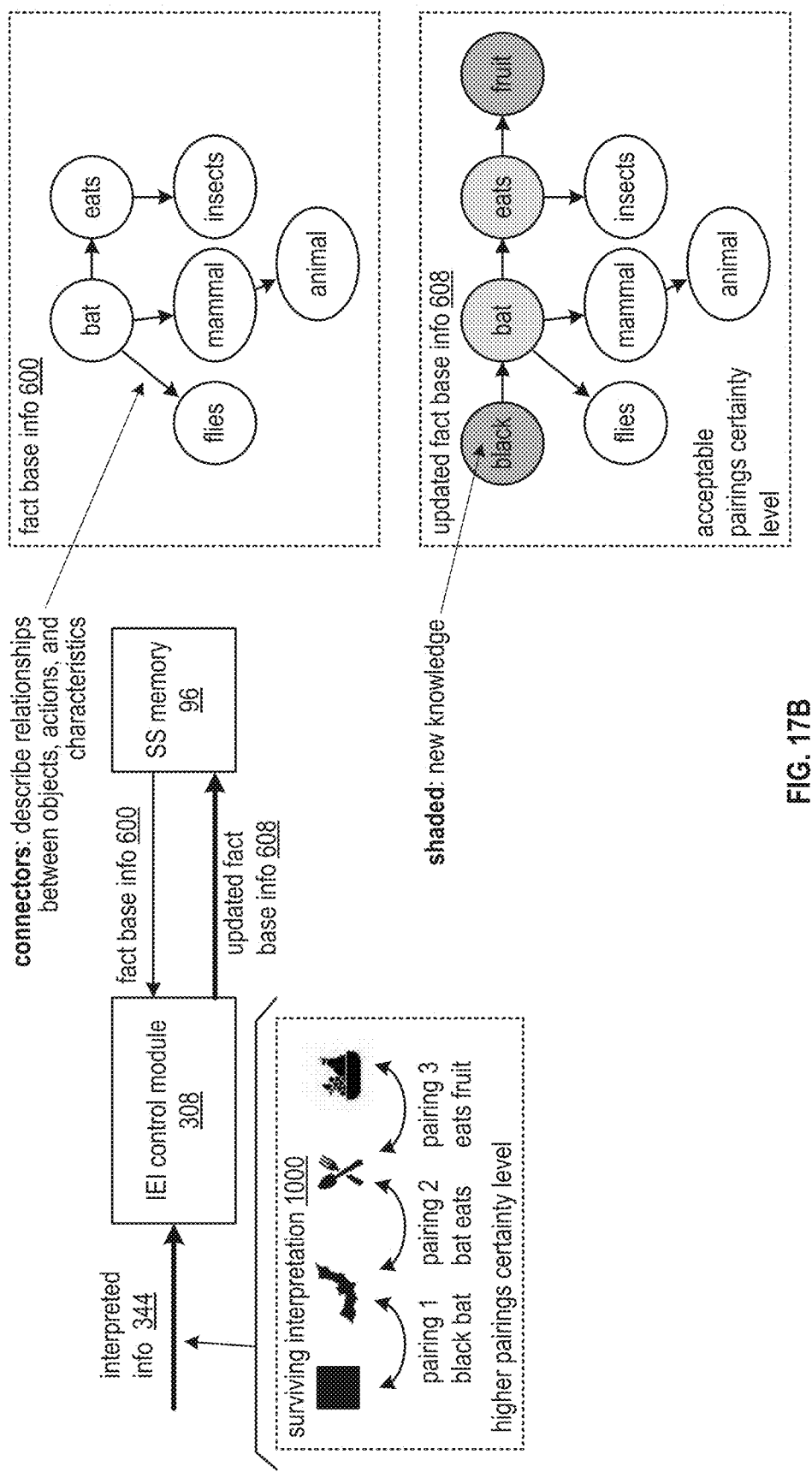

FIGS. 17A and 17B are schematic block diagrams of another embodiment of a computing system that includes the content ingestion module 300 of FIG. 5E, the element identification module 302 of FIG. 5E, the interpretation module 304 of FIG. 5E, the IEI control module 308 of FIG. 5E, and the SS memory 96 of FIG. 2. Generally, an embodiment of this invention presents solutions where the computing system 10 supports processing content to produce knowledge utilizing a certainty level.

The processing of the content to produce the knowledge utilizing the certainty level includes a series of steps. For example, a first step includes identifying words of an ingested phrase to produce tokenized words. As depicted in FIG. 17A, a specific example of the first step includes the content ingestion module 300 comparing words of source content 310 to dictionary entries to produce formatted content 314 that includes identifiers of known words. For instance, the content ingestion module 300 identifies words "the", "black", "bat", "eats", and "fruit" when the ingested phrase includes "The black bat eats fruit."

A second step of the processing of the content to produce the knowledge utilizing the certainty level includes, for each tokenized word, identifying one or more identigens that correspond the tokenized word, where each identigen describes one of an object, a characteristic, and an action. As depicted in FIG. 17A, a specific example of the second step includes the element identification module 302 performing a look up of identigen identifiers, utilizing an element list 332 and in accordance with element rules 318, of the one or more identigens associated with each tokenized word of the formatted content 314 to produce identified element information 340.

A unique identifier is associated with each of the potential object, the characteristic, and action (OCA) associated with a particular tokenized word. For instance, the element identification module 302 identifies a functional symbol for "the", identifies a single identigen for "black", identifies two identigens for "bat" (e.g., baseball bat and flying bat), identifies a single identigen for "eats", and identifies a single identigen for "fruit."

A third step of the processing of the content to produce the knowledge utilizing the certainty level includes, for each permutation of sequential combinations of identigens, generating a corresponding equation package (i.e., candidate interpretation). The equation package includes a sequential linking of pairs of identigens (e.g., relationships, probability level of accuracy of the relationship to provide the certainty level of the relationship).

Each sequential linking pairs a preceding identigen to a next identigen. An equation element describes a relationship between paired identigens (OCAs) such as describes, acts on, is a, belongs to, did, did to, etc. Multiple OCAs occur for a common word when the word has multiple meanings (e.g., a baseball bat, a flying bat).

As depicted in FIG. 17A, a specific example of the third step includes the interpretation module 304, for each permutation of identigens of each tokenized word of the identified element information 340, including with all other permutations of all other tokenized words to generate the equation packages. The packages include pairings certainty levels, in accordance with interpretation rules 320, and a groupings list 334. For instance, the interpretation module 304 produces a first equation package that includes a first pairing of a black bat (e.g., flying bat with a higher pairing certainty level), the second pairing of bat eats (e.g., the flying bat eats, with a higher pairing certainty level), and a third pairing of eats fruit. The interpretation module 304 produces a second equation package that includes a first pairing of a black bat (e.g., baseball bat, with a neutral pairing certainty level), the second pairing of bat eats (e.g., the baseball bat eats, with a lower pairing certainty level), and a third pairing of eats fruit.

A fourth step of the processing of the content to produce the knowledge utilizing the certainty level includes selecting a surviving equation package associated with a most favorable confidence level. As depicted in FIG. 17A, a specific example of the fourth step includes the interpretation module 304 applying interpretation rules 320 (i.e., inference, pragmatic engine, utilizing the identifiers of the identigens to match against known valid combinations of identifiers of entigens) to reduce the number of permutations of the sequential combinations of identigens to produce interpreted information 344.

The interpreted information 344 includes identification of at least one equation package as a surviving interpretation 1000 (e.g., higher pairings certainty level), where non-surviving equation packages are eliminated that compare unfavorably to pairing rules and/or are associated with an unfavorable pairings certainty levels to produce a non-surviving interpretation 1002 (e.g., lower pairings certainty level). An overall pairings certainty level is assigned to each equation package based on pairing certainty levels of each pairing, such that a higher pairing certainty level indicates that equation package with a higher probability of correctness. For instance, the interpretation module 304 eliminates the equation package that includes the second pairing indicating that the "baseball bat eats" which is inconsistent with a pairings certainty level of one or more of the groupings list 334 and the interpretation rules 320 and selects the equation package associated with the "flying bat eats" which is favorably consistent with the one or more of the pairing certainty level of the groupings list 334 and the interpretation rules 320.

A fifth step of the processing of the content to produce the knowledge utilizing the confidence level includes integrating knowledge of the surviving equation package into a knowledge base. For example, integrating at least a portion of the reduced OCA combinations into a graphical database to produce updated knowledge. As another example, the portion of the reduced OCA combinations may be translated into rows and columns entries when utilizing a rows and columns database rather than a graphical database.

As depicted in FIG. 17B, a specific example of the fifth step includes the IEI control module 308 recovering fact base information 600 from SS memory 96 to identify a portion of the knowledge base for potential modification utilizing the OCAs of the surviving interpretation 1000 (i.e., compare a pattern of relationships between the OCAs of the surviving interpretation 1000 from the interpreted information 344 to relationships of OCAs of the portion of the knowledge base including potentially new pairings certainty levels). The fifth step further includes determining modifications (e.g., additions, subtractions, further clarifications required when information is complex, etc.) to the portion of the knowledge base based on the new pairings certainty levels. For instance, the IEI control module 308 causes adding the element "black" as a "describes" relationship of an existing bat OCA and adding the element "fruit" as a eats "does to" relationship to implement the modifications to the portion of the fact base information 600 to produce updated fact base information 608 for storage in the SS memory 96.

Figure 17C:
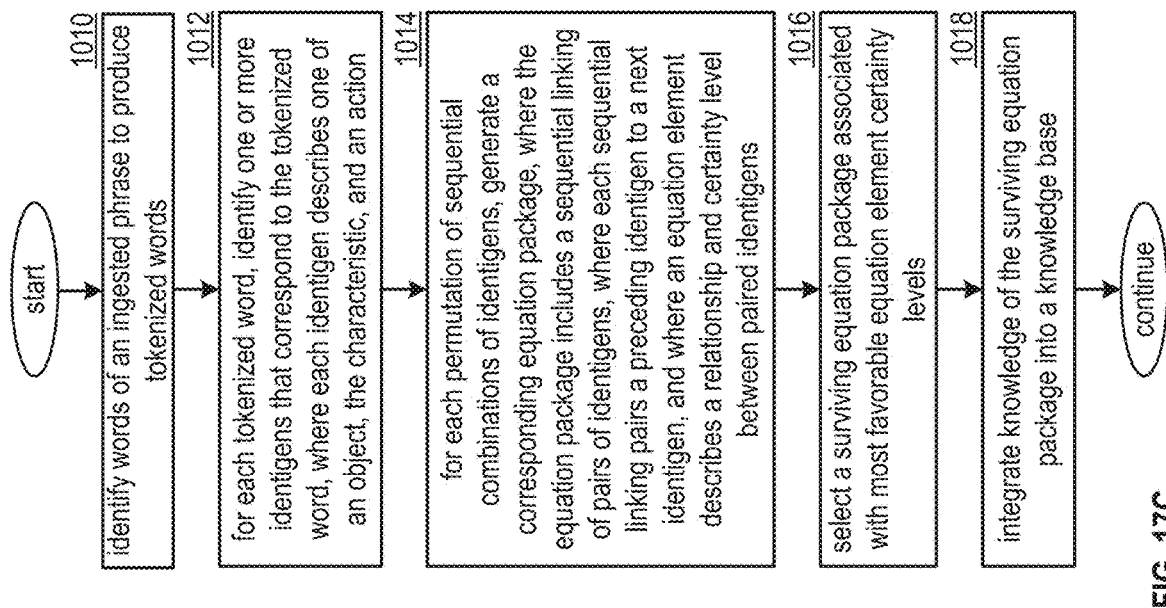
FIG. 17C is a logic diagram of an embodiment of a method for processing content to produce knowledge utilizing a certainty level within a computing system in accordance with the present invention.

FIG. 17C is a logic diagram of an embodiment of a method for processing content to produce knowledge utilizing a certainty level within a computing system. In particular, a method is presented for use in conjunction with one or more functions and features described in conjunction with FIGS. 1-8D, 17A, and also FIG. 17B. The method includes step 1010 where a processing module of one or more processing modules of one or more computing devices of the computing system identifies words of an ingested phrase to produce tokenized words. The identifying includes comparing words to known words of dictionary entries to produce identifiers of known words.

For each tokenized word, the method continues at step 1012 where the processing module identifies one or more identigens that corresponds to the tokenized word, where each identigen describes one of an object, a characteristic, and an action. The identifying includes performing a lookup of identifiers of the one or more identigens associated with each tokenized word, where the different identifiers associated with each of the potential object, the characteristic, and the action associated with the tokenized word.

The method continues at step 1014 where the processing module, for each permutation of sequential combinations of identigens, generates a corresponding equation package. The equation package includes a sequential linking of pairs of identigens, where each sequential linking pairs a preceding identigen to a next identigen, and where an equation element describes a relationship and certainty level between paired identigens. For example, for each permutation of identigens of each tokenized word, the processing module includes, with all other permutations of all other tokenized words to generate the equation packages, where the equation elements include probability of correctness based on certainty levels of pairings of identigens.

The method continues at step 1016 where the processing module selects a surviving equation package associated with most favorable equation element certainty levels. For example, the processing module applies rules (i.e., inference, pragmatic engine) utilizing the identifiers of the identigens to match against known valid combinations of identifiers of entigens, to reduce the number of permutations of the sequential combinations of identigens. This identifies at least one equation package, where non-surviving equation packages are eliminated the compare favorably to pairing rules and/or are associated with an unfavorable pairings certainty level to produce a non-surviving interpretation. An overall certainty level is assigned to each equation package based on certainty levels of each pairing, such that a higher certainty level indicates an equation package with a higher probability of correctness.

The method continues at step 1018 where the processing module integrates knowledge of the surviving equation package into a knowledge base. For example, the processing module integrates at least a portion of the reduced OCA combinations into a graphical database to produce updated knowledge. The integrating may include recovering fact base information from storage of the knowledge base to identify a portion of the knowledge base for potential modifications utilizing the OCs of the surviving equation package (i.e., compare a pattern of relationships between the OCs of the surviving equation package to relationships of the OCs of the portion of the knowledge base including potentially new pairing certainty levels).

The integrating further includes determining modifications (e.g., additions, subtractions, further clarifications required when complex information is presented, etc.) to produce the knowledge base that is based on fit of acceptable pairing certainty levels. The integrating further includes implementing the modifications to the portion of the fact base information to produce the updated fact base information for storage in the portion of the knowledge base.

The method described above in conjunction with the processing module can alternatively be performed by other modules of the computing system 10 of FIG. 1 or by other devices. In addition, at least one memory section (e.g., a computer readable memory, a non-transitory computer readable storage medium, a non-transitory computer readable memory organized into a first memory element, a second memory element, a third memory element, a fourth element section, a fifth memory element etc.) that stores operational instructions can, when executed by one or more processing modules of one or more computing devices (e.g., one or more servers, one or more user devices) of the computing system 10, cause the one or more computing devices to perform any or all of the method steps described above.

Figure 18A:
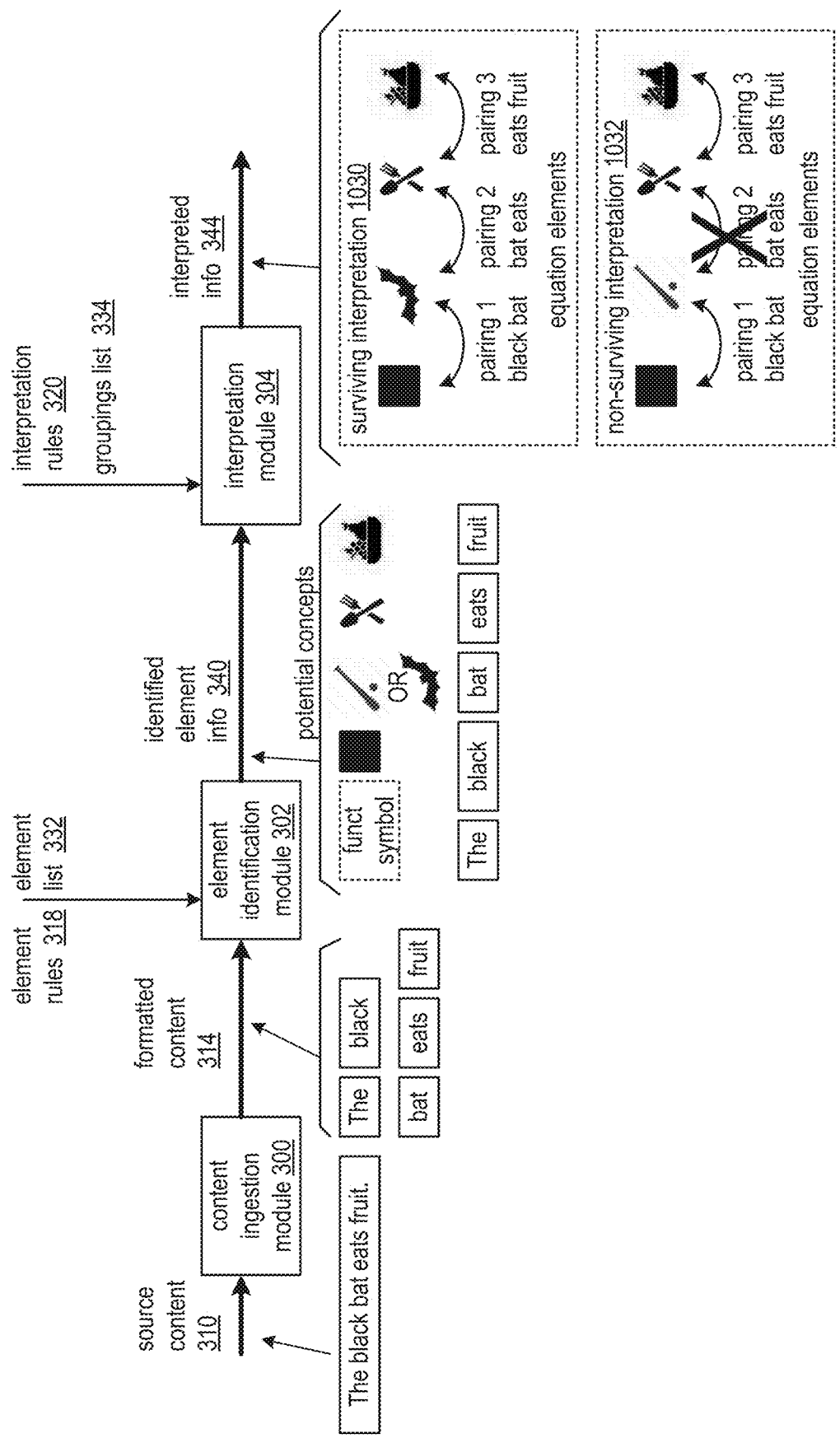
FIGS. 18A and 18B are schematic block diagrams of another embodiment of a computing system in accordance with the present invention.
Figure 18B:
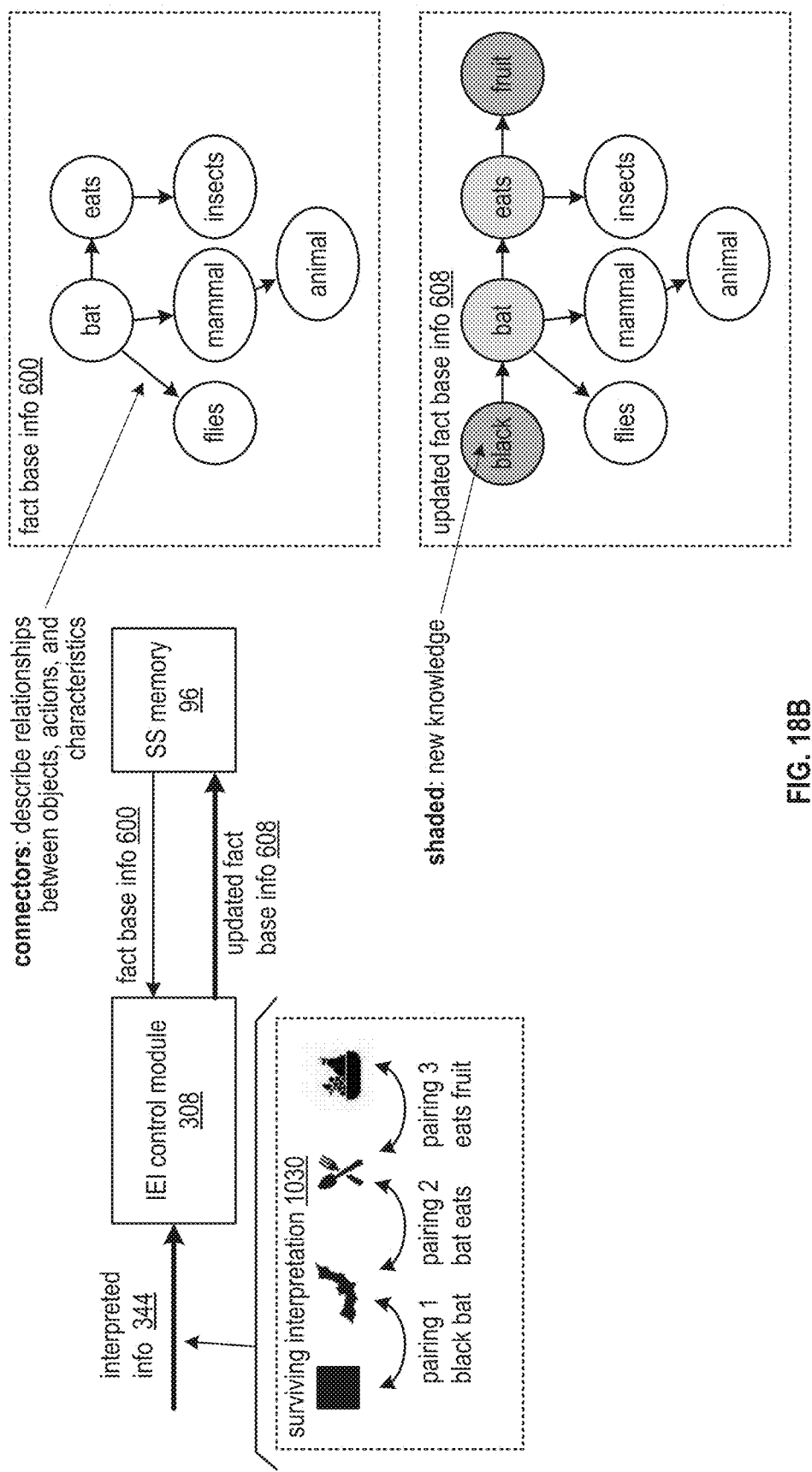

FIGS. 18A and 18B are schematic block diagrams of another embodiment of a computing system that includes the content ingestion module 300 of FIG. 5E, the element identification module 302 of FIG. 5E, the interpretation module 304 of FIG. 5E, the IEI control module 308 of FIG. 5E, and the SS memory 96 of FIG. 2. Generally, an embodiment of this invention presents solutions where the computing system 10 supports processing content to produce knowledge.

The processing of the content to produce the knowledge includes a series of steps. For example, a first step includes identifying words of an ingested phrase to produce tokenized words. As depicted in FIG. 18A, a specific example of the first step includes the content ingestion module 300 comparing words of source content 310 to dictionary entries to produce formatted content 314 that includes identifiers of known words. Alternatively, when a comparison is unfavorable, the temporary identifier may be assigned to an unknown word. For instance, the content ingestion module 300 produces identifiers associated with the words "the", "black", "bat", "eats", and "fruit" when the ingested phrase includes "The black bat eats fruit", and generates the formatted content 314 to include the identifiers of the words.

A second step of the processing of the content to produce the knowledge includes, for each tokenized word, identifying one or more identigens that correspond the tokenized word. Each identigen describes one of an object, a characteristic, and an action. As depicted in FIG. 18A, a specific example of the second step includes the element identification module 302 performing a look up of identigen identifiers, utilizing an element list 332 and in accordance with element rules 318, of the one or more identigens associated with each tokenized word of the formatted content 314 to produce identified element information 340.

A unique identifier is associated with each of the potential object, the characteristic, and the action (OCA) associated with the tokenized word. For instance, the element identification module 302 identifies a functional symbol for "the", identifies a single identigen for "black", identifies two identigens for "bat" (e.g., baseball bat and flying bat), identifies a single identigen for "eats", and identifies a single identigen for "fruit." When at least one tokenized word is associated with multiple identigens, two or more permutations of sequential combinations of identigens for each tokenized word result. For example, when "bat" is associated with two identigens, two permutations of sequential combinations of identigens result for the ingested phrase.

A third step of the processing of the content to produce the knowledge includes, for each permutation of sequential combinations of identigens, generating a corresponding equation package (i.e., candidate interpretation). The equation package includes a sequential linking of pairs of identigens (e.g., relationships), where each sequential linking pairs a preceding identigen to a next identigen. An equation element describes a relationship between paired identigens (OCAs) such as describes, acts on, is a, belongs to, did, did to, etc. Multiple OCAs occur for a common word when the word has multiple potential meanings (e.g., a baseball bat, a flying bat).

As depicted in FIG. 18A, a specific example of the third step includes the interpretation module 304, for each permutation of identigens of each tokenized word of the identified element information 340, generating, in accordance with interpretation rules 320 and a groupings list 334, the equation package. The package includes one or more of the identifiers of the tokenized words, a list of identifiers of the identigens of the equation package, a list of pairing identifiers for sequential pairs of identigens, and a quality metric associated with each sequential pair of identigens (e.g., likelihood of a proper interpretation).

For instance, the interpretation module 304 produces a first equation package that includes a first identigen pairing of a black bat (e.g., flying bat with a higher quality metric level), the second pairing of bat eats (e.g., the flying bat eats, with a higher quality metric level), and a third pairing of eats fruit. The interpretation module 304 produces a second equation package that includes a first pairing of a black bat (e.g., baseball bat, with a neutral quality metric level), the second pairing of bat eats (e.g., the baseball bat eats, with a lower quality metric level), and a third pairing of eats fruit.

A fourth step of the processing of the content to produce the knowledge includes selecting a surviving equation package associated with a most favorable confidence level. As depicted in FIG. 18A, a specific example of the fourth step includes the interpretation module 304 applying interpretation rules 320 (i.e., inference, pragmatic engine) utilizing the identifiers of the identigens to match against known valid combinations of identifiers of entigens to reduce a number of permutations of the sequential combinations of identigens to produce interpreted information 344.

The interpreted information 344 includes identification of at least one equation package as a surviving interpretation 1030 (e.g., higher quality metric level). Non-surviving equation packages are eliminated that compare unfavorably to pairing rules and/or are associated with an unfavorable quality metric levels to produce a non-surviving interpretation 1032 (e.g., lower quality metric level).

In an embodiment, an overall quality metric level is assigned to each equation package based on quality metric levels of each pairing, such that a higher quality metric level of an equation package indicates a higher probability of a most favorable interpretation. For instance, the interpretation module 304 eliminates the equation package that includes the second pairing indicating that the "baseball bat eats" which is inconsistent with a desired quality metric level of one or more of the groupings list 334 and the interpretation rules 320 and selects the equation package associated with the "flying bat eats" which is favorably consistent with the one or more of the quality metric levels of the groupings list 334 and the interpretation rules 320.

A fifth step of the processing of the content to produce the knowledge utilizing the confidence level includes integrating knowledge of the surviving equation package into a knowledge base. For example, integrating at least a portion of the reduced OCA combinations into a graphical database to produce updated knowledge. As another example, the portion of the reduced OCA combinations may be translated into rows and columns entries when utilizing a rows and columns database rather than a graphical database. When utilizing the rows and columns approach for the knowledge base, subsequent access to the knowledge base may utilize structured query language (SQL) queries.

As depicted in FIG. 18B, a specific example of the fifth step includes the IEI control module 308 recovering fact base information 600 from SS memory 96 to identify a portion of the knowledge base for potential modification utilizing the OCAs of the surviving interpretation 1030 (i.e., compare a pattern of relationships between the OCAs of the surviving interpretation 1030 from the interpreted information 344 to relationships of OCAs of the portion of the knowledge base including potentially new quality metric levels). The fifth step further includes determining modifications (e.g., additions, subtractions, further clarifications required when information is complex, etc.) to the portion of the knowledge base based on the new quality metric levels. For instance, the IEI control module 308 causes adding the element "black" as a "describes" relationship of an existing bat OCA and adding the element "fruit" as a eats "does to" relationship to implement the modifications to the portion of the fact base information 600 to produce updated fact base information 608 for storage in the SS memory 96.

Figure 18C:
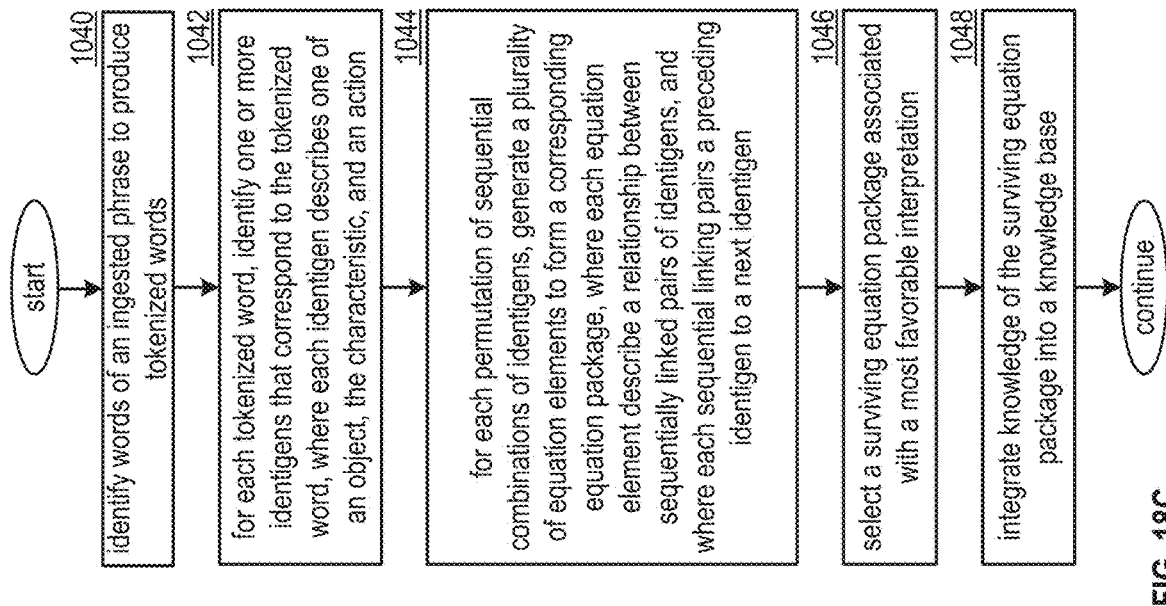
FIG. 18C is a logic diagram of an embodiment of a method for processing content to produce knowledge within a computing system in accordance with the present invention.

FIG. 18C is a logic diagram of an embodiment of a method for processing content to produce knowledge within a computing system. In particular, a method is presented for use in conjunction with one or more functions and features described in conjunction with FIGS. 1-8D, 18A, and also FIG. 18B. The method includes step 1040 where a processing module of one or more processing modules of one or more computing devices of the computing system identifies words of an ingested phrase to produce tokenized words. The identified includes comparing words to known words of dictionary entries to produce identifiers of known words.

For each tokenized word, the method continues at step 1042 where the processing module identifies one or more identigens that corresponds to the tokenized word, where each identigen describes one of an object, a characteristic, and an action (e.g., OCA). The identifying includes performing a lookup of identifiers of the one or more identigens associated with each tokenized word, where the different identifiers associated with each of the potential object, the characteristic, and the action associated with the tokenized word.

The method continues at step 1044 where the processing module, for each permutation of sequential combinations of identigens, generates a plurality of equation elements to form a corresponding equation package. Each equation element describes a relationship between sequentially linked pairs of identigens, where each sequential linking pairs a preceding identigen to a next identigen. For example, for each permutation of identigens of each tokenized word, the processing module generates the equation package to include a plurality of equation elements.

Each equation element describes the relationship (e.g., describes, acts on, is a, belongs to, did, did too, etc.) between sequentially adjacent identigens of a plurality of sequential combinations of identigens. Each equation element may be further associated with a quality metric to evaluate a favorability level of an interpretation in light of the sequence of identigens of the equation package.

The method continues at step 1046 where the processing module selects a surviving equation package associated with most favorable interpretation. For example, the processing module applies rules (i.e., inference, pragmatic engine, utilizing the identifiers of the identigens to match against known valid combinations of identifiers of entigens), to reduce the number of permutations of the sequential combinations of identigens to identify at least one equation package.

Non-surviving equation packages are eliminated the compare unfavorably to pairing rules and/or are associated with an unfavorable quality metric levels to produce a non-surviving interpretation. An overall quality metric level is assigned to each equation package based on quality metric levels of each pairing, such that a higher quality metric level indicates an equation package with a higher probability of favorability of correctness.

The method continues at step 1048 where the processing module integrates knowledge of the surviving equation package into a knowledge base. For example, the processing module integrates at least a portion of the reduced OCA combinations into a graphical database to produce updated knowledge. The integrating may include recovering fact base information from storage of the knowledge base to identify a portion of the knowledge base for potential modifications utilizing the OCAs of the surviving equation package (i.e., compare a pattern of relationships between the OCAs of the surviving equation package to relationships of the OCAs of the portion of the knowledge base including potentially new quality metric levels).

The integrating further includes determining modifications (e.g., additions, subtractions, further clarifications required when complex information is presented, etc.) to produce the updated knowledge base that is based on fit of acceptable quality metric levels. The integrating further includes implementing the modifications to the portion of the fact base information to produce the updated fact base information for storage in the portion of the knowledge base.

The method described above in conjunction with the processing module can alternatively be performed by other modules of the computing system 10 of FIG. 1 or by other devices. In addition, at least one memory section (e.g., a computer readable memory, a non-transitory computer readable storage medium, a non-transitory computer readable memory organized into a first memory element, a second memory element, a third memory element, a fourth element section, a fifth memory element etc.) that stores operational instructions can, when executed by one or more processing modules of one or more computing devices (e.g., one or more servers, one or more user devices) of the computing system 10, cause the one or more computing devices to perform any or all of the method steps described above.

Figure 19A:
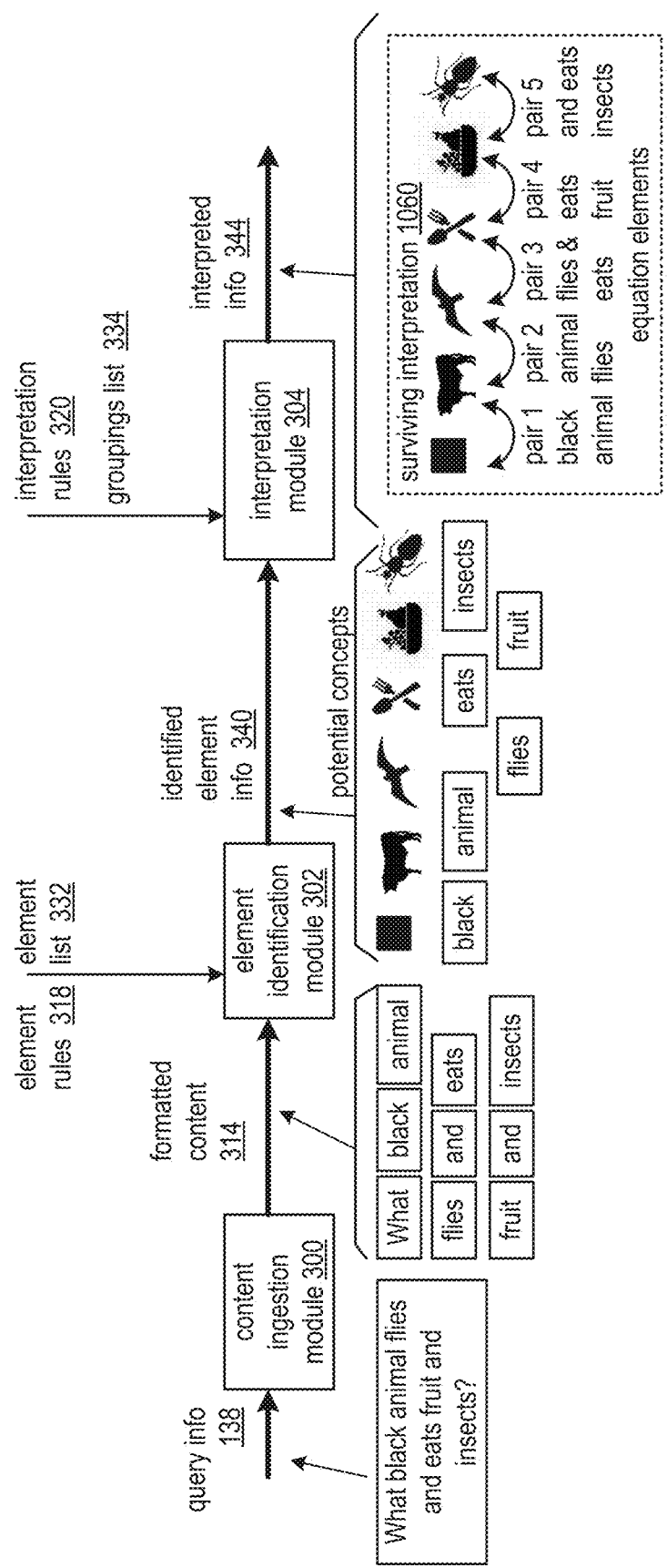
FIGS. 19A and 19B are schematic block diagrams another embodiment of a computing system in accordance with the present invention.
Figure 19B:
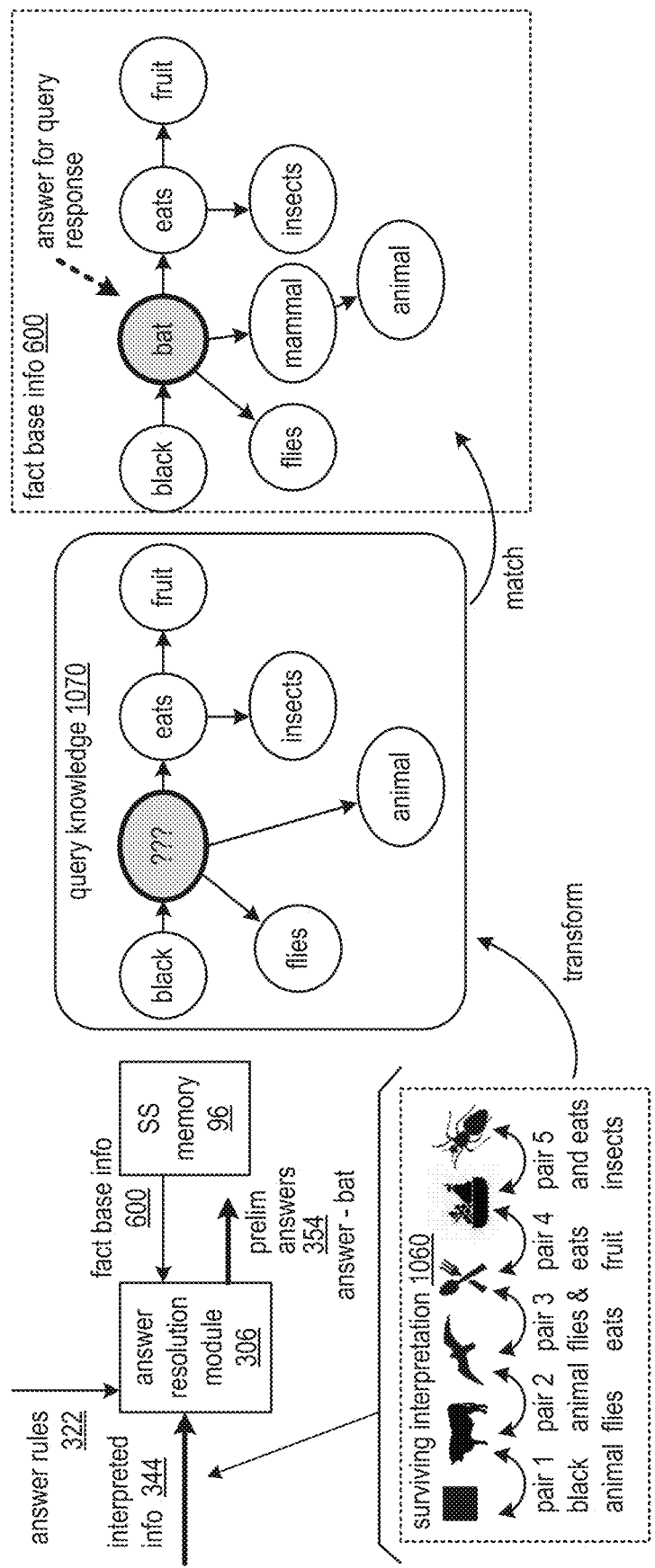

FIGS. 19A and 19B are schematic block diagrams of another embodiment of a computing system that includes that includes the content ingestion module 300 of FIG. 5E, the element identification module 302 of FIG. 5E, the interpretation module 304 of FIG. 5E, the answer resolution module 306 of FIG. 5E, and the SS memory 96 of FIG. 2. Generally, an embodiment of this invention presents solutions where the computing system 10 supports for generating a query response to a query.

The generating of the query response to the query includes a series of steps. For example, a first step includes identifying words of an ingested query to produce tokenized words. As depicted in FIG. 19A, a specific example of the first step includes the content ingestion module 300 comparing words of query info 138 to dictionary entries to produce formatted content 314 that includes identifiers of known words. For instance, the content ingestion module 300 produces identifiers for each word of the query "what black animal flies and eats fruit and insects?"

A second step of the generating of the query response to the query includes, for each tokenized word, identifying one or more identigens that correspond the tokenized word, where each identigen describes one of an object, a characteristic, and an action (OCA). As depicted in FIG. 19A, a specific example of the second step includes the element identification module 302 performing a look up of identifiers, utilizing an element list 332 and in accordance with element rules 318, of the one or more identigens associated with each tokenized word of the formatted content 314 to produce identified element information 340. A unique identifier is associated with each of the potential object, the characteristic, and the action associated with a particular tokenized word. For instance, the element identification module 302 produces a single identigen identifier for each of the black color, an animal, flies, eats, fruit, and insects.

A third step of the generating of the query response to the query includes, for each permutation of sequential combinations of identigens, generating a corresponding equation package (i.e., candidate interpretation), where the equation package includes a sequential linking of pairs of identigens. Each sequential linking pairs a preceding identigen to a next identigen. An equation element describes a relationship between paired identigens (OCAs) such as describes, acts on, is a, belongs to, did, did to, etc.

As depicted in FIG. 19A, a specific example of the third step includes the interpretation module 304, for each permutation of identigens of each tokenized word of the identified element information 340, generating the equation packages in accordance with interpretation rules 320 and a groupings list 334 to produce a series of equation elements that include pairings of identigens. For instance, the interpretation module 304 generates a first pairing to describe a black animal, a second pairing to describe an animal that flies, a third pairing to describe flies and eats, a fourth pairing to describe eats fruit, and a fifth pairing to describe eats fruit and insects.

A fourth step of the generating the query response to the query includes selecting a surviving equation package associated with a most favorable interpretation. As depicted in FIG. 19A, a specific example of the fourth step includes the interpretation module 304 applying the interpretation rules 320 (i.e., inference, pragmatic engine, utilizing the identifiers of the identigens to match against known valid combinations of identifiers of entigens) to reduce the number of permutations of the sequential combinations of identigens to produce interpreted information 344 that includes identification of at least one equation package as a surviving interpretation 1060. Non-surviving equation packages, if any, are eliminated that compare unfavorably to pairing rules to produce a non-surviving interpretation.

A fifth step of the generating the query response to the query includes utilizing a knowledge base, generating a query response to the surviving equation package of the query. The surviving equation package of the query is transformed to produce query knowledge for comparison to a portion of the knowledge base, and where an answer is extracted from the portion of the knowledge base to produce the query response.

As depicted in FIG. 19B, a specific example of the fifth step includes the answer resolution module 306 interpreting the surviving interpretation 1060 of the interpreted information 344 in accordance with answer rules 322 to produce query knowledge 1070 (i.e., a graphical representation of knowledge when the knowledge base utilizes a graphical database). The fifth step further includes accessing fact base information 600 from the SS memory 96 to identify the portion of the knowledge base associated with a favorable comparison of the query knowledge (e.g., by comparing attributes of the query knowledge 1072 attributes of the fact base information 600). The fifth step further includes generating preliminary answers 354 that includes the answer to the query. For instance, the answer is bat when the associated OCAs of bat, such as black, eats fruit, eats insects, is an animal, and flies, aligns with OCAs of the query knowledge.

Figure 19C:
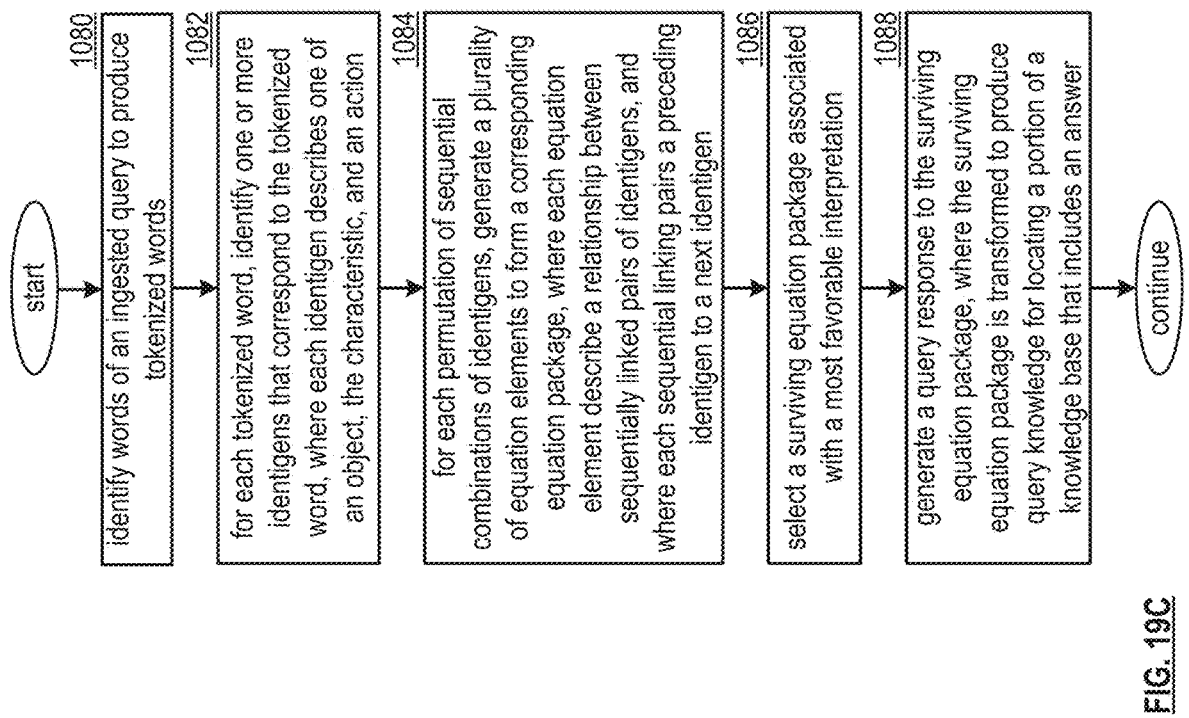
FIG. 19C is a logic diagram of an embodiment of a method for generating a query response to a query within a computing system in accordance with the present invention.

FIG. 19C is a logic diagram of an embodiment of a method for generating a query response to a query utilizing groupings within a knowledge base within a computing system. In particular, a method is presented for use in conjunction with one or more functions and features described in conjunction with FIGS. 1-8D, 19A, and also FIG. 19B. The method includes step 1080 where a processing module of one or more processing modules of one or more computing devices of the computing system identifies words of an ingested query to produce tokenized words. For example, the processing module compares words to known words of dictionary entries to produce identifiers of known words.

For each tokenized word, the method continues at step 1082 where the processing module identifies one or more identigens that correspond to the tokenized word, where each identigen describes one of an object, a characteristic, and an action. For example, the processing module performs a lookup of identifiers of the one or more identigens associated with each tokenized word, where different identifiers associated with each permutation of a potential object, characteristic, and action associated with the tokenized word.

For each permutation of sequential combinations of identigens, the method continues at step 1084 where the processing module generates a plurality of equation elements to form a corresponding equation package. Each equation element describes a relationship between sequentially linked pairs of identigens. Each sequential linking pairs a preceding identigen to a next identigen. For example, for each permutation of identigens of each tokenized word, the processing module includes, with all other permutations of all other tokenized words, to generate the equation packages, where each equation package includes a plurality of equation elements describing the relationships between sequentially adjacent identigens of a plurality of sequential combinations of identigens.

The method continues at step 1086 where the processing module selects a surviving equation package associated with a most favorable interpretation. For example, the processing module applies rules (i.e., inference, pragmatic engine, utilizing the identifiers of the identigens to match against known valid combinations of identifiers of entigens) to reduce the number of permutations of the sequential combinations of identigens to identify at least one equation package. Non-surviving equation packages are eliminated the compare unfavorably to pairing rules.

The method continues at step 1088 where the processing module generates a query response to the surviving equation package, where the surviving equation package is transformed to produce query knowledge for locating the portion of a knowledge base that includes an answer. As an example of generating the query response, the processing module interprets the surviving the equation package in accordance with answer rules to produce the query knowledge (e.g., a graphical representation of knowledge when the knowledge base utilizes a graphical database format).

The processing module accesses fact base information from the knowledge base to identify the portion of the knowledge base associated with a favorable comparison of the query knowledge (e.g., favorable comparison of attributes of the query knowledge to the portion of the knowledge base, aligning favorably comparing entigens without conflicting entigens). The processing module extracts an answer from the portion of the knowledge base to produce the query response.

The method described above in conjunction with the processing module can alternatively be performed by other modules of the computing system 10 of FIG. 1 or by other devices. In addition, at least one memory section (e.g., a computer readable memory, a non-transitory computer readable storage medium, a non-transitory computer readable memory organized into a first memory element, a second memory element, a third memory element, a fourth element section, a fifth memory element etc.) that stores operational instructions can, when executed by one or more processing modules of one or more computing devices (e.g., one or more servers, one or more user devices) of the computing system 10, cause the one or more computing devices to perform any or all of the method steps described above.

It is noted that terminologies as may be used herein such as bit stream, stream, signal sequence, etc. (or their equivalents) have been used interchangeably to describe digital information whose content corresponds to any of a number of desired types (e.g., data, video, speech, text, graphics, audio, etc. any of which may generally be referred to as 'data').

As may be used herein, the terms "substantially" and "approximately" provides an industry-accepted tolerance for its corresponding term and/or relativity between items. For some industries, an industry-accepted tolerance is less than one percent and, for other industries, the industry-accepted tolerance is 10 percent or more. Other examples of industry-accepted tolerance range from less than one percent to fifty percent. Industry-accepted tolerances correspond to, but are not limited to, component values, integrated circuit process variations, temperature variations, rise and fall times, thermal noise, dimensions, signaling errors, dropped packets, temperatures, pressures, material compositions, and/or performance metrics. Within an industry, tolerance variances of accepted tolerances may be more or less than a percentage level (e.g., dimension tolerance of less than +/−1%). Some relativity between items may range from a difference of less than a percentage level to a few percent. Other relativity between items may range from a difference of a few percent to magnitude of differences.

As may also be used herein, the term(s) "configured to", "operably coupled to", "coupled to", and/or "coupling" includes direct coupling between items and/or indirect coupling between items via an intervening item (e.g., an item includes, but is not limited to, a component, an element, a circuit, and/or a module) where, for an example of indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to".

As may even further be used herein, the term "configured to", "operable to", "coupled to", or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item.

As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1. As may be used herein, the term "compares unfavorably", indicates that a comparison between two or more items, signals, etc., fails to provide the desired relationship.

As may be used herein, one or more claims may include, in a specific form of this generic form, the phrase "at least one of a, b, and c" or of this generic form "at least one of a, b, or c", with more or less elements than "a", "b", and "c". In either phrasing, the phrases are to be interpreted identically. In particular, "at least one of a, b, and c" is equivalent to "at least one of a, b, or c" and shall mean a, b, and/or c. As an example, it means: "a" only, "b" only, "c" only, "a" and "b", "a" and "c", "b" and "c", and/or "a", "b", and "c".

As may also be used herein, the terms "processing module", "processing circuit", "processor", "processing circuitry", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, processing circuitry, and/or processing unit may be, or further include, memory and/or an integrated memory element, which may be a single memory device, a plurality of memory devices, and/or embedded circuitry of another processing module, module, processing circuit, processing circuitry, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, processing circuitry, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, processing circuitry and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, processing circuitry and/or processing unit executes, hard coded and/or operational instructions corresponding to at least some of the steps and/or functions illustrated in one or more of the Figures. Such a memory device or memory element can be included in an article of manufacture.

One or more embodiments have been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality.

To the extent used, the flow diagram block boundaries and sequence could have been defined otherwise and still perform the certain significant functionality. Such alternate definitions of both functional building blocks and flow diagram blocks and sequences are thus within the scope and spirit of the claims. One of average skill in the art will also recognize that the functional building blocks, and other illustrative blocks, modules and components herein, can be implemented as illustrated or by discrete components, application specific integrated circuits, processors executing appropriate software and the like or any combination thereof.

In addition, a flow diagram may include a "start" and/or "continue" indication. The "start" and "continue" indications reflect that the steps presented can optionally be incorporated in or otherwise used in conjunction with one or more other routines. In addition, a flow diagram may include an "end" and/or "continue" indication. The "end" and/or "continue" indications reflect that the steps presented can end as described and shown or optionally be incorporated in or otherwise used in conjunction with one or more other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

The one or more embodiments are used herein to illustrate one or more aspects, one or more features, one or more concepts, and/or one or more examples. A physical embodiment of an apparatus, an article of manufacture, a machine, and/or of a process may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of one or more of the embodiments. A module implements one or more functions via a device such as a processor or other processing device or other hardware that may include or operate in association with a memory that stores operational instructions. A module may operate independently and/or in conjunction with software and/or firmware. As also used herein, a module may contain one or more sub-modules, each of which may be one or more modules.

As may further be used herein, a computer readable memory includes one or more memory elements. A memory element may be a separate memory device, multiple memory devices, or a set of memory locations within a memory device. Such a memory device may be a read-only memory, random access memory, volatile memory, non-volatile memory, static memory, dynamic memory, flash memory, cache memory, and/or any device that stores digital information. The memory device may be in a form a solid-state memory, a hard drive memory, cloud memory, thumb drive, server memory, computing device memory, and/or other physical medium for storing digital information.

While particular combinations of various functions and features of the one or more embodiments have been expressly described herein, other combinations of these features and functions are likewise possible. The present disclosure is not limited by the particular examples disclosed herein and expressly incorporates these other combinations.

What is claimed is:

1. A method for execution by a computing device, the method comprises:

detecting a defective entigen group, wherein a knowledge database includes the defective entigen group, wherein the defective entigen group includes a plurality of entigens and one or more entigen relationships between at least some of the plurality of entigens, wherein the defective entigen group represents knowledge of a topic;

issuing, via a user interface of the computing device, a corrective content query based on the defective entigen group;

obtaining, via the user interface of the computing device, corrective content for the topic based on the defective entigen group;

determining a set of identigens for each word of a plurality of words of the corrective content to produce a plurality of sets of identigens, wherein each identigen of the set of identigens includes a meaning identifier, an instance identifier, and a time reference, wherein each meaning identifier associated with a particular set of identigens represents a different meaning of one or more different meanings of a corresponding word of the plurality of words of the corrective content, wherein a first set of identigens of the plurality of sets of identigens is produced for a first word of the plurality of words of the corrective content;

interpreting, in accordance with identigen pairing rules of the knowledge database, the plurality of sets of identigens to determine a most likely meaning interpretation of the corrective content and produce a corrective entigen group comprising one or more entigens, wherein the corrective entigen group represents the most likely meaning interpretation of the corrective content, wherein each entigen of the corrective entigen group corresponds to a selected identigen of the set identigens having a selected meaning of the one or more different meanings of each word of the plurality of words, wherein each entigen of the corrective entigen group represents a single conceivable and perceivable thing in space and time that is independent of language and corresponds to a time reference of the selected identigen associated with the corrective entigen group, wherein the selected identigen favorably pairs with at least one corresponding sequentially adjacent identigen of another set of identigens of the plurality of sets of identigens based on the identigen pairing rules;

updating the defective entigen group utilizing the corrective entigen group to produce a curated entigen group; and outputting, via the user interface of the computing device, a representation of the curated entigen group.

2. The method of claim 1 further comprises:
storing the curated entigen group in the knowledge database.

3. The method of claim 1, wherein the detecting the defective entigen group comprises one or more of:
determining that a number of entigens of the defective entigen group compares unfavorably to a number of other entigens of another entigen group associated with other knowledge of another topic, wherein the knowledge database further includes the other entigen group;
identifying an incorrect entigen of the defective entigen group; and
identifying an incorrect entigen relationship between first and second entigens of the defective entigen group.

4. The method of claim 1, wherein the obtaining the corrective content for the topic based on the defective entigen group comprises:
identifying a defect of the defective entigen group;
identifying a content aspect based on the defect;
selecting a content source based on the content aspect;
generating the corrective content query based on the content aspect;
outputting, via the user interface of the computing device, the corrective content query; and
receiving, via the user interface of the computing device, the corrective content from the content source based on the content aspect in response to the corrective content query.

5. The method of claim 1, wherein the updating the defective entigen group utilizing the corrective entigen group to produce the curated entigen group comprises one or more of:
replacing an incorrect entigen of the defective entigen group with a correct entigen of the corrective entigen group;
updating an incorrect entigen relationship between first and second entigens of the defective entigen group with a correct entigen relationship between the first and second entigens of the corrective entigen group; and
augmenting the defective entigen group utilizing the corrective entigen group.

6. A computing device of a computing system, the computing device comprises:
an interface;
a user interface;
a local memory; and
a processing module operably coupled to the interface, the user interface, and the local memory, wherein the processing module functions to:
detect a defective entigen group, wherein a knowledge database includes the defective entigen group, wherein the defective entigen group includes a plurality of entigens and one or more entigen relationships between at least some of the plurality of entigens, wherein the defective entigen group represents knowledge of a topic;
issue, via the user interface, a corrective content query based on the defective entigen group;
obtain, via the user interface, corrective content for the topic based on the defective entigen group;
determine a set of identigens for each word of a plurality of words of the corrective content to produce a plurality of sets of identigens, wherein each identigen of the set of identigens includes a meaning identifier, an instance identifier, and a time reference, wherein each meaning identifier associated with a particular set of identigens represents a different meaning of one or more different meanings of a corresponding word of the plurality of words of the corrective content, wherein a first set of identigens of the plurality of sets of identigens is produced for a first word of the plurality of words of the corrective content;
interpret, in accordance with identigen pairing rules of the knowledge database, the plurality of sets of identigens to determine a most likely meaning interpretation of the corrective content and produce a corrective entigen group comprising one or more entigens, wherein the corrective entigen group represents the most likely meaning interpretation of the corrective content, wherein each entigen of the corrective entigen group corresponds to a selected identigen of the set identigens having a selected meaning of the one or more different meanings of each word of the plurality of words, wherein each entigen of the corrective entigen group represents a single conceivable and perceivable thing in space and time that is independent of language and corresponds to a time reference of the selected identigen associated with the corrective entigen group, wherein the selected identigen favorably pairs with at least one corresponding sequentially adjacent identigen of another set of identigens of the plurality of sets of identigens based on the identigen pairing rules;
update the defective entigen group utilizing the corrective entigen group to produce a curated entigen group; and
output, via the user interface, a representation of the curated entigen group.

7. The computing device of claim 6, wherein the processing module further functions to:
store, via the interface, the curated entigen group in the knowledge database.

8. The computing device of claim 6, wherein the processing module functions to detect the defective entigen group by one or more of:
determining that a number of entigens of the defective entigen group compares unfavorably to a number of other entigens of another entigen group associated with other knowledge of another topic, wherein the knowledge database further includes the other entigen group;
identifying an incorrect entigen of the defective entigen group; and
identifying an incorrect entigen relationship between first and second entigens of the defective entigen group.

9. The computing device of claim 6, wherein the processing module functions to obtain the corrective content for the topic based on the defective entigen group by:
identifying a defect of the defective entigen group;
identifying a content aspect based on the defect;
selecting a content source based on the content aspect;

generating the corrective content query based on the content aspect;
outputting, via the user interface, the corrective content query; and
receiving, via the user interface, the corrective content from the content source based on the content aspect in response to the corrective content query.

10. The computing device of claim 6, wherein the processing module functions to update the defective entigen group utilizing the corrective entigen group to produce the curated entigen group by one or more of:
replacing an incorrect entigen of the defective entigen group with a correct entigen of the corrective entigen group;
updating an incorrect entigen relationship between first and second entigens of the defective entigen group with a correct entigen relationship between the first and second entigens of the corrective entigen group; and
augmenting the defective entigen group utilizing the corrective entigen group.

11. A computer readable memory comprises:
a first memory element that stores operational instructions that, when executed by a processing module, causes the processing module to:
detect a defective entigen group, wherein a knowledge database includes the defective entigen group, wherein the defective entigen group includes a plurality of entigens and one or more entigen relationships between at least some of the plurality of entigens, wherein the defective entigen group represents knowledge of a topic;
a second memory element that stores operational instructions that, when executed by the processing module, causes the processing module to:
issue, via a user interface, a corrective content query based on the defective entigen group; and
obtain, via the user interface, corrective content for the topic based on the defective entigen group;
a third memory element that stores operational instructions that, when executed by the processing module, causes the processing module to:
determine a set of identigens for each word of a plurality of words of the corrective content to produce a plurality of sets of identigens, wherein each identigen of the set of identigens includes a meaning identifier, an instance identifier, and a time reference, wherein each meaning identifier associated with a particular set of identigens represents a different meaning of one or more different meanings of a corresponding word of the plurality of words of the corrective content, wherein a first set of identigens of the plurality of sets of identigens is produced for a first word of the plurality of words of the corrective content;
interpret, in accordance with identigen pairing rules of the knowledge database, the plurality of sets of identigens to determine a most likely meaning interpretation of the corrective content and produce a corrective entigen group comprising one or more entigens, wherein the corrective entigen group represents the most likely meaning interpretation of the corrective content, wherein each entigen of the corrective entigen group corresponds to a selected identigen of the set identigens having a selected meaning of the one or more different meanings of each word of the plurality of words, wherein each entigen of the corrective entigen group represents a single conceivable and perceivable thing in space and time that is independent of language and corresponds to a time reference of the selected identigen associated with the corrective entigen group, wherein the selected identigen favorably pairs with at least one corresponding sequentially adjacent identigen of another set of identigens of the plurality of sets of identigens based on the identigen pairing rules; and
a fourth memory element that stores operational instructions that, when executed by the processing module, causes the processing module to:
update the defective entigen group utilizing the corrective entigen group to produce a curated entigen group; and
output, via the user interface, a representation of the curated entigen group.

12. The computer readable memory of claim 11 further comprises:
a fifth memory element that stores operational instructions that, when executed by the processing module, causes the processing module to:
store the curated entigen group in the knowledge database.

13. The computer readable memory of claim 11, wherein the processing module functions to execute the operational instructions stored by the first memory element to cause the processing module to detect the defective entigen group by one or more of:
determining that a number of entigens of the defective entigen group compares unfavorably to a number of other entigens of another entigen group associated with other knowledge of another topic, wherein the knowledge database further includes the other entigen group;
identifying an incorrect entigen of the defective entigen group; and
identifying an incorrect entigen relationship between first and second entigens of the defective entigen group.

14. The computer readable memory of claim 11, wherein the processing module functions to execute the operational instructions stored by the second memory element to cause the processing module to obtain the corrective content for the topic based on the defective entigen group by:
identifying a defect of the defective entigen group;
identifying a content aspect based on the defect;
selecting a content source based on the content aspect;
generating the corrective content query based on the content aspect;
outputting, via the user interface, the corrective content query; and
receiving, via the user interface, the corrective content from the content source based on the content aspect in response to the corrective content query.

15. The computer readable memory of claim 11, wherein the processing module functions to execute the operational instructions stored by the fourth memory element to cause the processing module to update the defective entigen group utilizing the corrective entigen group to produce the curated entigen group by one or more of:
replacing an incorrect entigen of the defective entigen group with a correct entigen of the corrective entigen group;
updating an incorrect entigen relationship between first and second entigens of the defective entigen group with a correct entigen relationship between the first and second entigens of the corrective entigen group; and augmenting the defective entigen group utilizing the corrective entigen group.

\* \* \* \* \*